(12) United States Patent
Johnson et al.

(10) Patent No.: US 12,633,829 B2
(45) Date of Patent: May 19, 2026

(54) HYBRID ADAPTIVE CONTROL FOR THE DC-DC BOOST CONVERTER

(71) Applicant: The Regents of the University of California, Oakland, CA (US)

(72) Inventors: Ryan S. Johnson, Santa Cruz, CA (US); Berk Altin, Santa Cruz, CA (US); Ricardo G. Sanfelice, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 210 days.

(21) Appl. No.: 18/339,712

(22) Filed: Jun. 22, 2023

(65) Prior Publication Data

US 2024/0195299 A1     Jun. 13, 2024

Related U.S. Application Data

(60) Provisional application No. 63/354,466, filed on Jun. 22, 2022.

(51) Int. Cl.
H02M 3/158     (2006.01)
H02M 1/00     (2006.01)

(52) U.S. Cl.
CPC ......... H02M 3/158 (2013.01); H02M 1/0012 (2021.05)

(58) Field of Classification Search
CPC .... H02M 3/158; H02M 3/156; H02M 1/0009; H02M 1/0012
See application file for complete search history.

(56) References Cited

U.S. PATENT DOCUMENTS 8,159,203 B2 *   4/2012   Derksen ............... H02M 3/158
                                              323/284

FOREIGN PATENT DOCUMENTS

| CN | 108539975 A | * | 9/2018 | ............ H02M 3/156 |
| CN | 111371322 B | * | 1/2021 | .......... H02M 3/1582 |

OTHER PUBLICATIONS

J. Neely, S. Pekarek and R. DeCarlo, "Hybrid Optimal-Based Control of a Boost Converter, " 2009 Twenty-Fourth Annual IEEE Applied Power Electronics Conference and Exposition, Washington, DC, USA, 2009, pp. 1129-1137 (Year: 2009).*

(Continued)

*Primary Examiner* — Jue Zhang
*Assistant Examiner* — Jye-June Lee
(74) *Attorney, Agent, or Firm* — GATES & COOPER LLP

(57)     ABSTRACT

A hybrid active controller for practically asymptotically stabilizing the DC-DC boost converter under parameter uncertainty. The controller uses an estimation algorithm that identifies the input voltage and output load of the converter in finite time. Using these estimates, the control algorithm "unites" global and local control schemes. The global control scheme induces practical asymptotic stability of a desired output voltage and corresponding current, and the local control scheme maintains industry-standard PWM behavior during steady state. Stability properties for the resulting hybrid closed-loop system are established and simulation results illustrating the main results are provided.

22 Claims, 9 Drawing Sheets

(56) References Cited

OTHER PUBLICATIONS

F. M. Oettmeier, J. Neely, S. Pekarek, R. DeCarlo and K. Uthaichana, "MPC of Switching in a Boost Converter Using a Hybrid State Model With a Sliding Mode Observer," in IEEE Transactions on Industrial Electronics, vol. 56, No. 9, pp. 3453-3466, Sep. 2009 (Year: 2009).*

Johnson, R. S., Altin, B., and Sanfelice, R. G., "Hybrid Adaptive Control for the DC-DC Boost Converter," IFAC-PapersOnLine 54 (5), 73-78, 2021 (Year: 2021).*

S. Hadjeras, C. A. Sanchez and G. Garcia, "Hybrid adaptive control of the boost converter," 2017 IEEE 56th Annual Conference on Decision and Control (CDC), Melbourne, VIC, Australia, 2017, pp. 5720-5725 (Year: 2017).*

C. Prieur and A. Teel, "Uniting local and global output feedback controllers," IEEE Transactions on Automatic Control, (99):1-1, 2011 (Year: 2011).*

Buisson et al., "On the Stabilisation of Switching Electrical Power Converters". M. Morari and L. Thiele (Eds.): HSCC 2005, LNCS 3414, pp. 184-197, 2005.

Geyer et al., "On the Optimal Control of Switch-Mode DC-DC Converters". R. Alur and G.J. Pappas (Eds.): HSCC 2004, LNCS 2993, pp. 342-356, 2004.

Li et al., "Finite time stability of sets for hybrid dynamical systems". Automatica 100 (2019) 200-211.

Sanfelice et al., "A Toolbox for Simulation of Hybrid Systems in Matlab/Simulink". [Hybrid Equations (HyEQ) Toolbox], 6 pages.

Senesky et al., "Hybrid Modelling and Control of Power Electronics". O. Maler and A. Pnueli (Eds.): HSCC 2003, LNCS 2623, pp. 450-465, 2003.

Johnson et al., "Hybrid Adaptive Control for the DC-DC Boost Converter". Proceedings of the 7th Analysis and Design of Hybrid Systems, vol. 54, No. 5, pp. 73-78, 2021.

Johnson et al., "Hybrid Adaptive Control for the DC-DC Boost Converter". IFAC PapersOnLine 54-5 (2021) 73-78.

* cited by examiner

1

HYBRID ADAPTIVE CONTROL FOR THE DC-DC BOOST CONVERTER

CROSS REFERENCE TO RELATED APPLICATIONS

This application claims the benefit under 35 U.S.C. Section 119(e) of the following and commonly-assigned U.S. Provisional Application Ser. No. 63/354,466, filed on Jun. 22, 2022, by Ryan S. Johnson, Berk Altin, and Roberto G. Sanfelice, entitled "HYBRID ADAPTIVE CONTROL FOR THE DC-DC BOOST CONVERTER,", which application is incorporated by reference herein.

STATEMENT REGARDING FEDERALLY SPONSORED RESEARCH AND DEVELOPMENT

This invention was made with Government support under Grant nos. ECS-1710621 and CNS-1544396 awarded by the National Science Foundation (NSF) and Grant nos FA9550-16-1-0015, FA9550-19-1-0053, and FA9550-19-1-0169 awarded by Airforce Office of Scientific Research (AFOSR). The Government has certain rights in the invention.

BACKGROUND OF THE INVENTION

1. Field of the Invention

The present invention relates to DC-DC boost converter control.

2. Description of Related Art

The DC-DC boost converter is widely used in the power systems of electric vehicles [1]. These systems operate under constantly changing demands such as supplying energy during acceleration and storing it during braking, necessitating power conversion technology that is capable of adapting to these changes [2]. The industry standard control scheme for the boost converter is pulse-width modulation (PWM). However, since PWM controllers typically utilize a linearized model of the converter dynamics, the stability properties only hold locally near the set-point [3]. Recently, a renewed interest in power converters has originated from the rise of hybrid modeling paradigms [4-11] and new perspectives on their control, including time-based switching, state event triggered control, and optimization-based control, have been proposed. However, improved methods of stabilizing boost converters under parameter uncertainty are needed. The present disclosure satisfies this need.

SUMMARY OF THE INVENTION

A system comprising and implementing an adaptive control algorithm for a DC-DC boost converter, the algorithm estimating the input voltage and output load of the converter in finite time. Using these estimates, a control algorithm that "unites" global and local control schemes. The global control scheme induces practical asymptotic stability of a desired output voltage and corresponding current, and the local control scheme can maintains industry-standard Pulse Width Modulation (PWM) behavior during steady state. The control algorithm can be implemented with one or more computers or circuits.

Illustrative embodiments of the present invention include, but are not limited to, the following examples.

2

1. A boost converter, comprising:
   a boost converter circuit comprising a switch comprising a switch state (open or closed), a capacitor, an inductor, and a diode;
   a hybrid adaptive controller connected to the switch for applying a hybrid algorithm controlling the switch state when the hybrid algorithm is executed by the hybrid adaptive controller; wherein the hybrid adaptive controller further comprises:
   a global controller:
   determining a first switch state command (open or close) as a function of estimates of the input voltage and a load resistance received from a parameter estimator, a measurement of an output voltage across the capacitor and/or a measurement of the inductor current passing through the inductor, and
   outputting the first switch state command to the switch to set the switch state causing the output voltage to converge to a desired output voltage, thereby raising an input voltage E, inputted to the boost converter circuit, to the desired output voltage across the capacitor when a load comprising the load resistance is connected across the capacitor;
   a local controller:
   determining a second switch state command as a function of the estimates of the input voltage and the load resistance received from the parameter estimator, and the measurement of the output voltage and/or the measurement of the inductor current, and
   outputting the second switch state command to the switch to set the switch state maintaining the output voltage at or within a set range of the desired output voltage and maintaining the inductor current at or within a set range of a desired current, when the load is connected; and
   a supervisor determining whether to execute the global controller outputting the first switch state command, or the local controller outputting the second switch state command, depending on the measurement of the output voltage and the measurement of the inductor current.

2. The boost converter of example 1, wherein the hybrid adaptive controller further comprises the parameter estimator.

3. The boost converter of example 1, wherein the supervisor uses the output voltage and the inductor current as feedback to select:
   the global controller outputting the switch state command until the output voltage has converged to within a first voltage range of the desired output voltage and the inductor current has converged to within a first current range of a desired current, or
   the local controller to output the second switch state command so long as the desired output voltage is maintained within a second voltage range and the inductor current is maintained within a second current range.

4. The boost converter of example 1, wherein:
   the global controller induces asymptotic stability of the output voltage at the desired output voltage and the inductor current at the desired current, and
   the local controller maintains, in a the output voltage at the desired output voltage and the inductor current at the desired current.

5. The boost converter of example 1, wherein the hybrid adaptive controller comprises one or more processors and one or more applications or programs executed by the one or more processors execute the hybrid algorithm comprising:

a parameter estimating algorithm, expressed using an estimator hybrid system, outputting the estimated load resistance and estimated input voltage in response to a parameter input comprising an initial input voltage;

a global control algorithm, expressed as a global controller hybrid system; outputting the first switch state command as a function of the output voltage and the inductor current, a local control algorithm, expressed as a local controller hybrid system, outputting the second switch state command as a function of the output voltage and the inductor current; and a supervisor algorithm, expressed as a supervisor hybrid system, outputting:

a first state instructing the hybrid adaptive controller to output the first switch state command to the switch until the output voltage is within a first voltage range and the inductor current is within a second current range, at which point outputting a second state, or a second state instructing the hybrid controller to output the second switch state command so long as the output voltage is within a second voltage range and the inductor current is within a second current range.

6. The boost converter of example 5, wherein the first state and the second state comprise logic states 0 or 1.

7. The boost converter of example 5, wherein:

the parameter estimating algorithm is initialized with at least one of the current or the voltage set to zero, so that the first set of values N have converged to the desired output voltage and/or desired current, for any value and polarity of the desired output voltage or the desired current.

8. The boost converter of example 5, wherein the one or more applications or programs obtain or create a representation of the hybrid systems and determine the switch state commands by processing, in the hybrid systems, state variables representing the switch state commands as a function of the output voltage and/or desired current.

9. The boost converter of example 8, wherein the processing of the state variables comprises modifying the state variables via discrete jumps and continuous evolution in the hybrid systems.

10. The boost converter of example 8, wherein the hybrid systems determine the switch state commands from the estimates of the load resistance and the input voltage, and the measurements of the output voltage and the current, using ohm's law relationships between the inductor current, the output voltage, the input voltage, and the load resistance.

11. The boost converter of example 3, wherein:

the first voltage range and the first current range each comprise a first set of values N to which maximal solutions of the output voltage and the inductor current, respectively, converge in finite time in response to the first switch state command, and the second voltage range and the second current range each comprise a second set of values M to which the output voltage and the inductor current, respectively, remain in steady state in response to the second switch state command.

12. The boost converter of example 11, wherein the first set of values N comprises positive values of the output voltage across the capacitor and/or positive values of a current passing through the inductor.

13. The boost converter of example 1, wherein the local controller hybrid system implements a timer.

14. The boost converter of example 1, wherein at least one of the global controller, local controller, or the supervisor comprise one or more circuits comprising one or more application specific integrated circuits or one or more field programmable gate arrays.

15. The boost converter of example 1, wherein the parameter estimator is expressed using an estimator hybrid system.

16. A computer implemented method for controlling a boost converter, comprising:

obtaining a boost converter circuit comprising a switch comprising a switch state (open or closed), a capacitor, an inductor, and a diode;

applying a hybrid algorithm controlling the switch state, comprising:

using a global controller:

determining a first switch state command (open or close) as a function of estimates of the input voltage and a load resistance received from a parameter estimator, a measurement of an output voltage across the capacitor, and a measurement of the inductor current passing through the inductor, and outputting the first switch state command to the switch to set the switch state causing the output voltage to converge to a desired output voltage, thereby raising an input voltage E, inputted to the boost converter circuit, to the desired output voltage across the capacitor when a load comprising the load resistance is connected across the capacitor;

using a local controller:

determining a second switch state command as a function of the estimates of the input voltage and the load resistance received from the parameter estimator, and the measurement of the output voltage and the measurement of the inductor current, and outputting the second switch state command to the switch to set the switch state maintaining the output voltage at or within a set range of the desired output voltage and maintaining the inductor current at or within a set range of a desired current, when the load is connected; and determining, in a supervisor, whether to execute the global controller outputting the first switch state command, or the local controller outputting the second switch state command, depending on the measurement of the output voltage and the measurement of the inductor current.

17. A computer implemented system for controlling a boost converter circuit, comprising:

one or more processors, or a computer readable medium configured for:

receiving at least one of an desired output voltage or an inductor current for application to an output load using the boost converter circuit comprising a switch comprising a switch state (open or closed), a capacitor, an inductor, and a diode;

determining a first switch state command (open or closed) as a function of estimates of an input voltage and a load resistance received from a parameter estimator, a measurement of an output voltage across the capacitor, and a measurement of the inductor current passing through the inductor, wherein the first switch state command sets the switch state causing the output voltage to converge to a desired output voltage, thereby raising an input voltage E, inputted to the boost converter circuit, to the desired output voltage across the capacitor when a load comprising the load resistance is connected across the capacitor; and determining a second switch state command as a function of the estimates of the input voltage and the load resistance received from the parameter estimator, and the measurement of the output voltage and the measurement of the inductor current, wherein the second switch state command sets the switch state maintaining the output voltage at or within a set range of the desired output voltage and/or maintains the inductor current at or within a set range of a desired current, when the load is connected; and determining whether to output the first switch state command or the second switch state command to control the switch, depending on the measurement of the output voltage and the measurement of the inductor current.

18. The system of example 17 comprising the one or more processors and one or more applications or programs executed by the one or more processors for executing a hybrid algorithm performing the determining steps and outputting the switch state commands.

19. The system of example 17, wherein at least one of the global controller, local controller, or the supervisor comprise one or more circuits comprising one or more application specific integrated circuits or one or more field programmable gate arrays.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Embodiments of the present invention provide a system for controlling pulse width modulation of a DC-DC boost converter circuit using a control algorithm that induces practical asymptotic stability of a desired set point for the DC-DC boost converter even under uncertainty in the circuit input voltage and output load resistance. Further, the control algorithm maintains PWM behavior during steady-state operation.

1. Example Circuit

Figure 1:
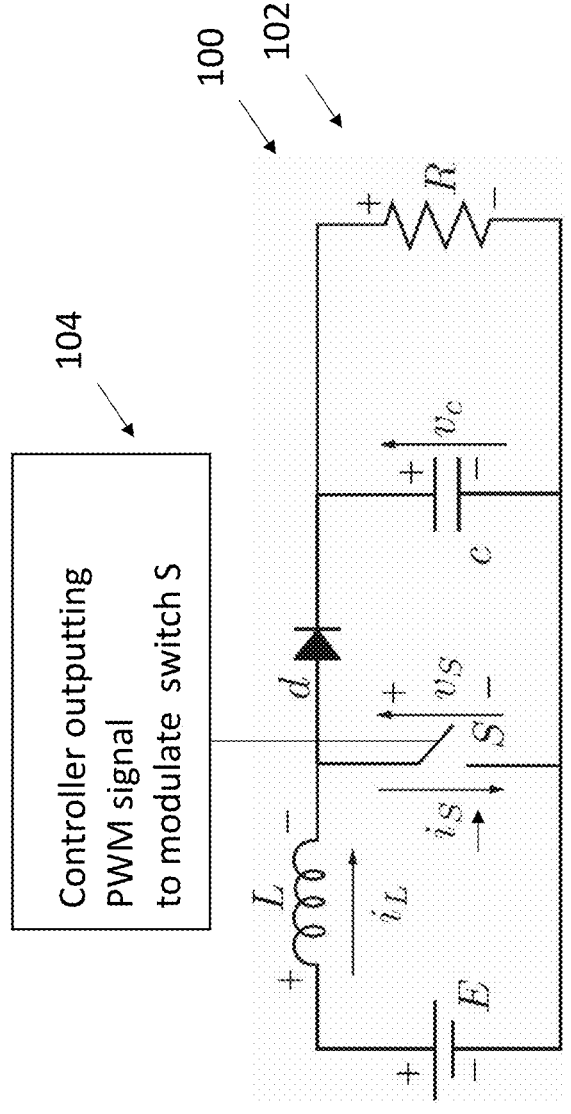
FIG. 1. Schematic of a boost converter circuit with hybrid adaptive control according to one or more embodiments of the present invention.
Figure 2:
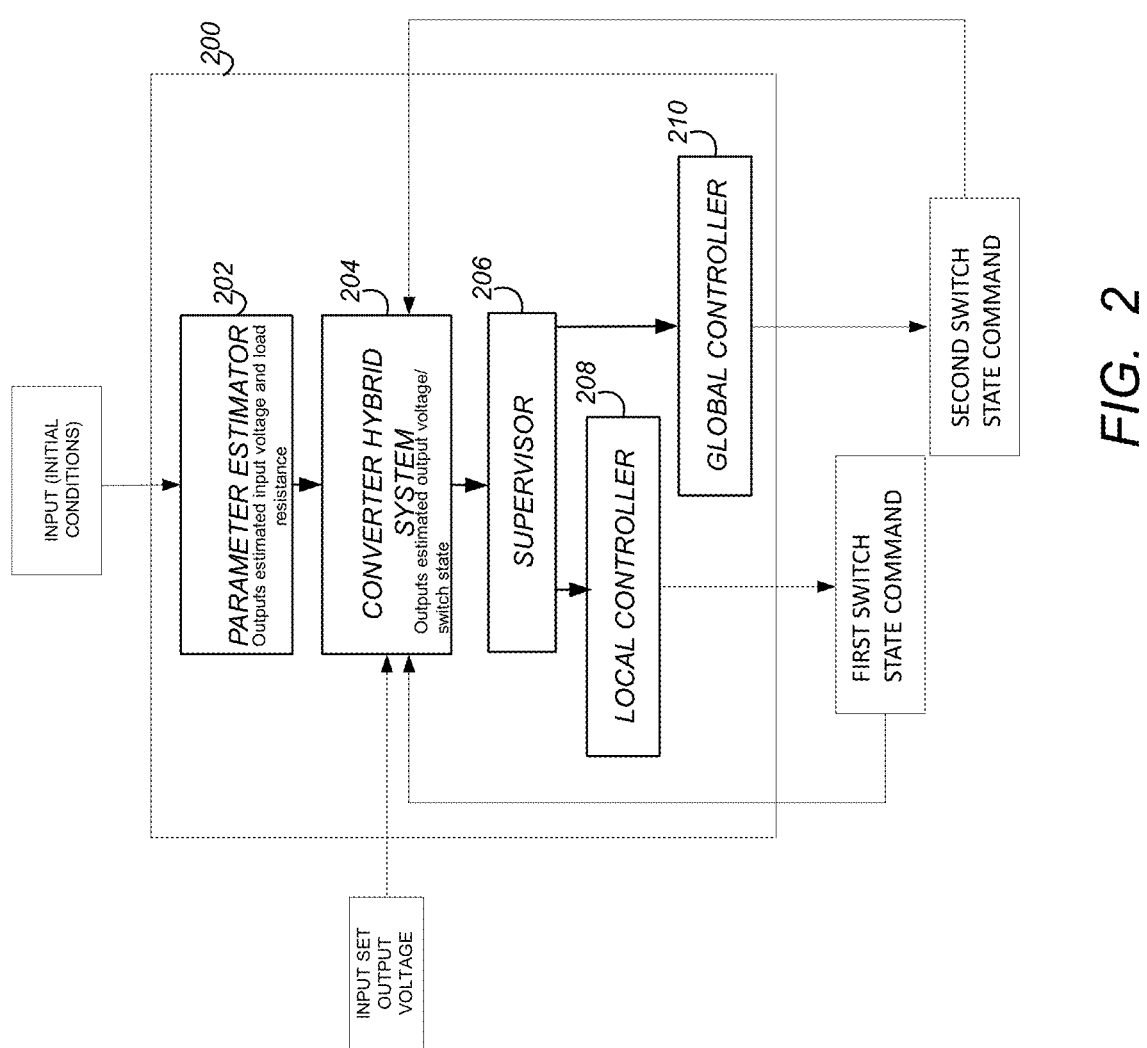
FIG. 2. Schematic of a hybrid adaptive controller according to one or more embodiments of the present invention.

FIG. 1 illustrates an example boost converter circuit, comprising an inductor, a switch, a diode, and a capacitor, coupled to a hybrid adaptive controller controlling the output voltage via pulse width modulation of the switch. FIG. 2 illustrates an example hybrid adaptive controller 200 comprising a parameter estimator 202; a converter estimator 202; a supervisor 204; a local controller 206; and a global controller 208. The parameter estimator estimates the input voltage and load resistance which are used by the converter estimator to estimate the output voltage. Depending on the output voltage, the supervisor selects the local controller or the global controller to control the position of the switch (open or closed) in the boost converter circuit.

The parameter estimator, converter estimator, global controller, local controller, and supervisor execute algorithms represented by hybrid systems, as discussed in the following sections.

2. Modeling of Circuit Using Hybrid Systems

2.1 Example Hybrid System

An example hybrid system $\mathcal{H}$ has data $(C, F, D, G, \kappa)$ and is given by [14,15]

$$\mathcal{H} = \begin{cases} (x, u) \in C & \dot{x} \in F(x, u) \\ (x, u) \in D & x^+ \in G(x, u) \\ \qquad y & = \kappa(x, u) \end{cases}$$

where $x \in \mathbb{R}^n$ is the state, $u \in \mathbb{R}^m$ is the input, $F: \mathbb{R}^n \times \mathbb{R}^m \rightrightarrows \mathbb{R}^n$ is a set-valued map defining the flow map of the differential inclusion capturing the continuous dynamics, and $C \subset \mathbb{R}^n \times \mathbb{R}^m$ defines the flow set on which flows are permitted. Similarly, $G: \mathbb{R}^n \times \mathbb{R}^m \rightrightarrows \mathbb{R}^n$ is a set-valued map defining the jump map of the difference inclusion modeling the discrete behavior, and $D \subset \mathbb{R}^n \times \mathbb{R}^m$ is the jump set on which jumps are permitted. The vector $y \in \mathbb{R}^n$ defines the output of the hybrid system.

Example Boost Converter Model

FIG. 1 illustrates a boost converter comprising is a class of switched-mode power supply that utilizes a switch S, inductor L, diode d, and capacitor c to raise the voltage at the output load R compared to the input voltage E. The state of the switch S (open or closed) represents the control input to the boost converter plant. When the switch is closed, current flows through the inductor and generates a magnetic field. When the switch is opened, the inductor magnetic field decays to maintain the current towards the load, causing a polarity reversal within the inductor. The primary voltage source in series with the inductor then charges the capacitor through the diode to a higher voltage than is attainable using the voltage source alone. If the switch is cycled fast enough, the inductor does not fully discharge between cycles and the load voltage remains higher than that of the source.

The boost converter dynamics may be expressed as a (continuous time) plant, $\mathcal{H}_P$, with discrete-valued input denoting the position of the switch S. We model it as $\mathcal{H}$ in (1) but with no jumps. That is, $\mathcal{H}_P$ with state $$x := (v_c, i_L), x \in \mathcal{X}_P := \tilde{M}_0 \cup \tilde{M}_1$$

which are defined below, input $q \in \{0, 1\}$, and output x. Following [12], its dynamics reduce to the differential inclusion with constraints $$\dot{x} \in F_P(x, q)(x, q) \in C_P$$

$$\text{where } C_P := (\tilde{M}_0 \times \{0\}) \cup (\tilde{M}_1 \times \{1\})$$

$$\tilde{M}_0 := \overline{M_1} \cup \overline{M_3} = \{x \in \mathbb{R}^2 : i_L \geq 0\},$$

$$\tilde{M}_1 := M_2 = \{x \in \mathbb{R}^2 : v_c \geq 0\}, \text{ with}$$

$$M_1 = \{x \in \mathbb{R}^2 : i_L > 0\} \cup \{x \in \mathbb{R}^2 : v_c \leq E, i_L = 0\}$$

$$M_2 = \{x \in \mathbb{R}^2 : v_c \geq 0\}$$

$$M_3 = \{x \in \mathbb{R}^2 : v_c > E, i_L = 0\}$$

and $F_P$ is the Krasovskii regularization of the vector fields and the corresponding constraint sets associated with each mode of circuit operation given by, for each $x \in \chi_P$, see [12] for details.

$$F_P(x, 0) := \begin{cases} \begin{bmatrix} -\dfrac{1}{Rc} v_c + \dfrac{1}{c} i_L \\[2mm] -\dfrac{1}{L} v_c + \dfrac{E}{L} \end{bmatrix} & \text{if } x \in \overline{M_1} \backslash \overline{M_3} \\[6mm] \left\{-\dfrac{1}{Rc} v_c\right\} \times \left[-\dfrac{1}{L} v_c + \dfrac{E}{L}, 0\right] & \text{if } x \in \overline{M_3} \end{cases}$$

$$F_P(x, 1) := \begin{bmatrix} -\dfrac{1}{Rc} v_c \\[2mm] \dfrac{E}{L} \end{bmatrix} \text{ if } x \in \tilde{M}_1.$$

3. Example Problem and Solution Solved Using the Hybrid Active Control

Since the supply voltage E and load resistance R for the converter may vary during operation, it is desirable to estimate these values so the chosen control algorithm can adapt accordingly. Furthermore, since the stability properties of boost converter PWM control algorithms typically only hold locally near the set-point, we design an algorithm that permits on-line estimation of the boost converter input voltage E and load resistance R and an adaptive control law whose closed-loop system induces practical asymptotic stability of a desired output voltage.

The framework combines two feedback controllers and a logic-based algorithm that selects which controller to apply. Uniting control strategies permit combining a global controller that renders a set-point stable but may not have good performance near the set point, and a local controller that induces satisfactory performance, but only locally [13].

The uniting control logic is implemented as follows. Given a plant $\mathcal{H}_P$ as in (2) interconnected with two separate control algorithms, $\mathcal{H}_0$, referred to as "global," and $\mathcal{H}_1$, referred to as "local," the choice of control algorithm is governed by a supervisory controller that selects between $\mathcal{H}_1$ and $\mathcal{H}_0$ based on the plant state in relation to a closed set $\mathcal{N}$ and an open set $\mathcal{M} \supset \mathcal{N}$ as follows:—Apply the global controller $\mathcal{H}_1$ until the solution to the plant enters $\mathcal{N}$. When any such point is reached, switch to the local controller $\mathcal{H}_0$ and apply the local controller $\mathcal{H}_0$ as long as the solution to the plant remains inside $\mathcal{M}$. If the state of the plant leaves $\mathcal{M}$, switch to the global controller $\mathcal{H}_1$.

Given $\mathcal{H}_1$ and $\mathcal{H}_0$, the uniting control sets $\mathcal{N}$ and $\mathcal{M}$ can be designed to satisfy the assumption that each maximal solution x to $\mathcal{H}_P$ with input q generated by $\mathcal{H}_1$ converges to $\mathcal{N}$ in finite (hybrid) time; and each solution x to $\mathcal{H}_P$ from $\mathcal{N}$ and input q generated by $\mathcal{H}_0$ remains in $\mathcal{M}$ for all (hybrid) time.

Hence, for the boost converter, the global controller drives the converter state into $\mathcal{N}$, from where solutions under the local PWM controller remain inside $\mathcal{M}$ for all future time.

4. Example Hybrid Parameter Estimation and Uniting Control

4.1 Parameter Estimation

Next we address Problem 1 from Example 3. Suppose that the unknown converter parameters R and E take values from $R \in [R_{min}, R_{max}]$ and $E \in [E_{min}, E_{max}]$ where $R_{min}, R_{max}, E_{min}, E_{max} > 0$ are known. Then, for the purpose of estimating R and E, we establish the following lemma that allows us to express the dynamics of maximal solutions to $\mathcal{H}_P$ in a convenient form.

Lemma 4.1. Each maximal solution $t \mapsto x(t)$ to $\mathcal{H}_P$, in (2) with input $t \mapsto q(t)$ satisfying $$\dot{x}(t) = f_1(x(t), q(t)) + f_2(x(t), q(t))\vartheta \tag{4}$$

Since $\mathcal{H}_P$ in (2) is a continuous-time system, its solutions are parameterized using only t. for all $t \in \text{dom}(x, q)$, where $\vartheta = (\vartheta_1, \vartheta_2) := (R^{-1}, E)$ and $$f_1(x, q) := \begin{cases} \begin{bmatrix} \dfrac{i_L}{c} \\[2mm] -\dfrac{v_c}{L} \end{bmatrix} & \text{if } q = 0, x \in \overline{M_1} \backslash \overline{M_3} \\[6mm] \begin{bmatrix} 0 \\ 0 \end{bmatrix} & \text{if } (q = 1, x \in \tilde{M}_1) \text{ or } (q = 0, x \in \overline{M_3}) \end{cases}$$

$$f_2(x, q) := \begin{cases} \begin{bmatrix} -\dfrac{v_c}{c} & 0 \\[2mm] 0 & \dfrac{1}{L} \end{bmatrix} & \text{if } \begin{array}{l} (q = 0, x \in \overline{M_1} \backslash \overline{M_3}) \\ \text{or } (q = 1, x \in \tilde{M}_1) \end{array} \\[6mm] \begin{bmatrix} -\dfrac{v_c}{c} & 0 \\[2mm] 0 & 0 \end{bmatrix} & \text{if } q = 0, x \in \overline{M_3} \end{cases}.$$

Estimating the parameters R and E is equivalent to estimating the parameter vector $\vartheta$ in (4). For this purpose, the finite-time parameter estimator in [16,17] is extended to classes of hybrid systems whose solutions satisfy (4). The algorithm is expressed as a hybrid system, denoted $\mathcal{H}_E$, and operates as follows. Let $z_E = (\hat{x}, \hat{\vartheta}, \omega, Q, \eta, \Gamma)$ be a solution to $\mathcal{H}_E$—hence, defined on a hybrid time domain—where $\hat{x}$ is the estimate of x, $\hat{\vartheta}$ is the estimate of $\vartheta$, and $\omega, Q, \eta, \Gamma$ are auxiliary variables. Consider the initial interval of flow $I^0 := \{t : (t, 0) \in \text{dom } z_E\}$ in dom $z_E$ with constant $\vartheta$ and initial conditions $\omega(0,0) = 0, Q(0,0) = 0, \eta(0,0) = 0, \Gamma(0,0) = 0$, and $\vartheta(0,$ $0)\in \mathbb{R}^2$ arbitrary. Omitting the $(t,j)$ of solutions, for the sake of making an argument, suppose that over this interval of flow, $Q$ and $\Gamma$ satisfy $$\dot{Q}=\omega^\top\omega, \dot{\Gamma}=\omega^\top\omega\vartheta$$

Then, if there exists a positive time $t_1 \in I^0$ such that $Q(t_1, 0)$ is invertible, resetting $\hat{\vartheta}$ to the value of $Q^{-1}\Gamma$ leads to $$\hat{\vartheta}(t_1, 1) = Q^{-1}(t_1, 0)\Gamma(t_1, 0) \tag{5}$$

$$= \left(\int_0^{t_1} \omega(t, 0)^\top \omega(t, 0)dt\right)^{-1}\left(\int_0^{t_1} \omega(t, 0)^\top \omega(t, 0)dt\vartheta\right) = \vartheta \tag{6}$$

However, since $\vartheta$ is unknown prior to hybrid time $(t_1, 1)$, a trajectory for $\Gamma$ satisfying (5) cannot be generated. Due to this, we rewrite the dynamics of $\Gamma$ as $$\dot{\Gamma} = \omega^\top\left(\omega\vartheta + \omega(\hat{\vartheta} - \hat{\vartheta}) + (x - x) + (\hat{x} - \hat{x})\right)$$

$$= \omega^\top\left(\omega\hat{\vartheta} + x - \hat{x} - \eta\right)$$

where $\eta = x - \hat{x} - \omega(\vartheta - \hat{\vartheta})$. Note that since $\omega(0,0)=0$, the initial condition $\eta(0,0)=0$ implies $\hat{x}(0,0)=x(0,0)$. Differentiating $\eta$ yields $$\dot{\eta} = \dot{x} - \dot{\hat{x}} - \dot{\omega}(\vartheta - \hat{\vartheta}) + \omega\dot{\hat{\vartheta}}$$

Next we define a matrix function $(x, q) \mapsto K(x, q)=K^\top(x, q)>0$ that is to be designed. The arguments of $K$ are omitted below for simplicity. Let $\hat{x}$, $\omega$, and $\hat{\vartheta}$ satisfy $$\dot{\hat{x}}=f_1(x,q)+f_2(x,q)\hat{\vartheta}+K(x-\hat{x})+\omega\dot{\hat{\vartheta}}$$

$$\dot{\omega}=f_2(x,q)-K\omega. \tag{35}$$

Plugging the expressions above into (7) yields $$\dot{\eta} = f_2(x, q)(\vartheta - \hat{\vartheta}) - K(x - \hat{x}) - \omega\dot{\hat{\vartheta}} - (f_2(x, q) - K\omega)(\vartheta - \hat{\vartheta}) + \omega\dot{\hat{\vartheta}} \tag{7}$$

$$= -K(x - \hat{x}) + K\omega(\vartheta - \hat{\vartheta}) = -K\eta$$

Hence, $\omega$, $Q$, $\eta$, and $\Gamma$ are now expressed in terms of known quantities and we can compute $\hat{\vartheta}$ as in (6).

Following [17], the estimation scheme outlined above can be implemented as a hybrid algorithm whose jump map imposes the initial conditions specified above (5) and computes $\hat{\vartheta}$ as in (6). The hybrid system, denoted by $$\mathcal{H}_E = \left(C_E, F_E, D_E, G_E, \theta\right), \text{ has state}$$

$$z_E := \left(\hat{x}, \hat{\vartheta}, \omega, Q, \eta, \Gamma\right) \in \mathcal{X}_E := \mathbb{R}^2 \times \mathbb{R}^2 \times \mathbb{R}^{2\times 2} \times \mathcal{SP}^{2\times 2} \times \mathbb{R}^2 \times \mathbb{R}^2,$$

inputs $(x, q) \in C_P$, output $\hat{\theta} \in \mathbb{R}^2_{>0}$, and dynamics and dynamics $$\dot{z}_E = F_E(x, q, z_E) \quad (x, q, z_E) \in C_E \tag{8}$$

$$z_E^+ = G_E(x, z_E) \quad (x, q, z_E) \in D_E$$

$$\hat{\theta} = h_E(\hat{\vartheta})$$

where $G_E(x,z_E):=(x, Q^{-1}\Gamma, 0,0,0,0)$, $$F_E(x, q, z_E) := \begin{bmatrix} f_1(x, q) + f_2(x, q)\hat{\vartheta} + K(x - \hat{x}) + \omega h(x, q, z_E) \\ h(x, q, z_E) \\ f_2(x, q) - K\omega \\ \omega^\top\omega \\ -K\eta \\ \omega^\top\left(\omega\hat{\vartheta} + x - \hat{x} - \eta\right) \end{bmatrix}$$

The matrix function $K$ and the parameter $\Omega=\Omega^\top>0$ modify the convergence rate of $\hat{x}$ and $\hat{\vartheta}$ during flows, and $\mu>0$ ensures that $Q^{-1}$ is well-defined in the jump map. The dynamics of $\mathcal{H}_E$ in (8) are similar to the estimator proposed in [17]. However, in [17], $f_1$ and $f_2$ are continuous functions of the state and input, compared to piecewise continuous functions in (4).

To ensure completeness of maximal solutions for the control algorithms discussed in the following subsections, we require that $$\left(\hat{R}, \hat{E}\right) \in \mathbb{R}^2_{>0}.$$

Hence, the output of $\mathcal{H}_E$ is computed as $$h_E(\hat{\vartheta}) := \begin{bmatrix} \varrho\left(\hat{R}^{-1}, R^{-1}_{max}, R^{-1}_{min}\right)^{-1} \\ \varrho\left(\hat{E}, E_{min}, E_{max}\right) \end{bmatrix}$$

where $$\varrho(s, s_{min}, s_{max}) := \begin{cases} s_{min} & \text{if} & s \leq s_{min} \\ s & \text{if} & s_{min} < s < s_{max} \\ s_{max} & \text{if} & s_{max} \leq s \end{cases}.$$

Similarly to [16,17], each maximal solution to $\mathcal{H}_E$ is guaranteed to jump for certain assumptions (see Appendix).

4.2 Example Global Control Algorithm

The hybrid control algorithm in [12] represents an ideal candidate for the global controller. Given a desired output voltage $v_c^*$, this algorithm renders the set $$\mathcal{A}_P := \left\{x \in \mathbb{R}^2 : v_c = v_c^*, i_L = i_L^* = \frac{v_c^{*2}}{RE}\right\}$$

globally asymptotically stable for the boost converter when the converter parameters $c$, $L$, $R$, $E>0$ are known.

However, in contrast to [12], the parameters $R$ and $E$ are unknown in this example. Hence, we employ the certainty equivalence principle and substitute the parameter estimates $\hat{R}$ and $\hat{E}$ from $\mathcal{H}_E$ in (8) for $R$ and $E$, respectively. Then, following the derivation in [12], given a desired voltage $$v_c^*,$$

the setpoint $$\hat{i}_L^* := \frac{v_c^{*2}}{\hat{R}\hat{E}}$$

is stabilized using the control Lyapunov function $$V(x, \hat{\theta}) = (x - x^*(\hat{\theta}))^\top P(x - x^*(\theta)),$$

where $$P = \begin{bmatrix} p_{11} & 0 \\ 0 & p_{22} \end{bmatrix} > 0$$

with $$\frac{p_{11}}{c} = \frac{p_{22}}{L}.$$

Since the interconnection of $\mathcal{H}_P$ and $\mathcal{H}_E$ is a hybrid system, the input and state of $\mathcal{H}_P$ are now parameterized by (t,j). We define a hybrid system $\mathcal{H}_1$ with state $$z_1 := q \in \mathcal{X}_1 := \{0,1\}, \text{ inputs } x \in \mathcal{X}_P \text{ and } \hat{\theta} \in \mathbb{R}^2_{>0},$$

and dynamics $$\dot{q} = 0 =: F_1(z_1) \quad (x, z_1, \hat{\theta}) \in C_1 \tag{12}$$

$$q^+ = 1 - q =: G_1(z_1) \quad (x, z_1, \hat{\theta}) \in D_1$$

$$\kappa_1(x, z_1, \hat{\theta}) := q$$

where $\kappa_1$ represents the input q of $\mathcal{H}_P$ $$C_1 := \{(x, z_1, \hat{\theta}) \in \mathcal{X}_P \times \mathcal{X}_1 \times \mathbb{R}^2_{>0} : \tilde{\gamma}_0(x, \hat{\theta}) \le \rho, q = 0\}$$

$$\bigcup \{(x, z_1, \hat{\theta}) \in \mathcal{X}_P \times \mathcal{X}_1 \times \mathbb{R}^2_{>0} : \tilde{\gamma}_1(x, \hat{\theta}) \le \rho, q = 1\}$$

$$D_1 := \{(x, z_1, \hat{\theta}) \in \mathcal{X}_P \times \mathcal{X}_1 \times \mathbb{R}^2_{>0} : \tilde{\gamma}_0(x, \hat{\theta}) \ge \rho, q = 0\}$$

$$\bigcup \{(x, z_1, \hat{\theta}) \in \mathcal{X}_P \times \mathcal{X}_1 \times \mathbb{R}^2_{>0} : \tilde{\gamma}_1(x, \hat{\theta}) \ge \rho, q = 1\},$$

and $\rho \in \mathbb{R}_{>0}$ is a design parameter that, as in [12], spatially regularizes the closed-loop global controller by modifying the separation between the functions $\tilde{\gamma}_0$ and $\tilde{\gamma}_1$ to avoid Zeno behavior. The functions $\tilde{\gamma}_0$ and $\tilde{\gamma}_1$ are $$a_0 = -\frac{p_{11}}{\hat{R}c} \qquad a_1 = -\frac{p_{11}}{\hat{R}c}$$

$$b_0 = \frac{p_{11}v_c^*}{\hat{R}c} + \frac{p_{22}\hat{i}_L^*}{L} \qquad b_1 = \frac{p_{11}v_c^*}{\hat{R}c}$$

$$c_0 = -\frac{p_{11}v_c^*}{c} + \frac{p_{22}\hat{E}}{L} \qquad c_1 = \frac{p_{22}\hat{E}}{L}$$

$$d_0 = -\frac{p_{22}\hat{i}_L^*\hat{E}}{L} \qquad d_1 = -\frac{p_{22}\hat{i}_L^*\hat{E}}{L}$$

and $$K_0 = k_0\frac{2p_{11}}{\hat{R}c}, K_1 = k_1\frac{2p_{11}}{\hat{R}c},$$

where $k_0$, $k_1 \in (0,1)$ are design parameters that ensure $K_0$, $K_1 \in (0, 2p_{11}/(\hat{R}c))$.

Given $(t,j) \mapsto x(t,j)$ and $(t,j) \mapsto \hat{\theta}(t,j)$, each solution q to $\mathcal{H}_1$ maintains a constant switch state until $x(t,j)$ intersects with the $\rho$ level-set of $\tilde{\gamma}_q$, at which point the value of q is toggled.

Note that the jump set $D_1$ below (12) has been modified compared to the model in [12]. In particular, the conditions $\tilde{\gamma}_0(x, \hat{\theta})=\rho$ and $\tilde{\gamma}_1(x, \hat{\theta})=\rho$ in (12) are instead $\tilde{\gamma}_0(x, \hat{\theta})\ge\rho$ and $\tilde{\gamma}_1(x, \hat{\theta})\ge\rho$, respectively. This change ensures completeness of maximal solutions for the closed-loop uniting control algorithm discussed in Example 4.4.

Appendix D establishes the maximal solutions form a complete set and Appendix E establishes convergence.

4.3 Example Local Control Algorithm

In this example, the local control algorithm for the uniting control framework is described. Recall from Example 3 that we desire to maintain PWM behavior near the setpoint. Assuming the converter operates only in the continuous conduction mode, we design the PWM controller by averaging the converter dynamics as in [18]. The average system for the steady-state converter is $$\dot{x} = A_0(\hat{\theta})x + B_0(\hat{\theta}) + d(x, \hat{\theta})(A_1(\hat{\theta}) - A_0(\hat{\theta}))x$$

where d represents the PWM duty cycle, which is to be designed, and $$A_0(\hat{\theta}) := \begin{bmatrix} -\frac{1}{\hat{R}c} & \frac{1}{c} \\ -\frac{1}{L} & 0 \end{bmatrix}, A_1(\hat{\theta}) := \begin{bmatrix} -\frac{1}{\hat{R}c} & 0 \\ 0 & 0 \end{bmatrix}, B_0(\hat{\theta}) := \begin{bmatrix} 0 \\ \frac{\hat{E}}{L} \end{bmatrix}$$

Next, we linearize (16) about $x^*(\hat{\theta})$ (see [3, 19] for details) and denote the region of the state-space where the linearization holds as $\mathcal{L} \subset \mathbb{R}^2$. Expressing the linearized average model in error coordinates yields $$\dot{\tilde{x}} = A_{avg}(\hat{\theta})x + B_{avg}(\hat{\theta})\tilde{d}(x, \hat{\theta}) \text{ where} \tag{17}$$

$$\tilde{x} := x - x^*(\hat{\theta}) \text{ and } \tilde{d}(x, \hat{\theta}) := d(x, \hat{\theta}) - d^*(\hat{\theta}), \text{ with}$$

$$d^*(\hat{\theta}) := 1 - \hat{E}/v_c^*$$

where $\tilde{x}:=x-x^*(\hat{\theta})$ and $\tilde{d}(x, \hat{\theta}):=d(x, \hat{\theta})-d^*(\hat{\theta})$, with $d^*(\hat{\theta}):=1-\hat{E}/v^*_c$ being the steady-state duty cycle for the linearized average model, and $$A_{avg}(\hat{\theta}) := \begin{bmatrix} -\frac{1}{\hat{R}c} & \frac{\hat{E}}{v_c^*c} \\ -\frac{\hat{E}}{v_c^*L} & 0 \end{bmatrix}, B_{avg}(\hat{\theta}) := \begin{bmatrix} \frac{v_c^{*2}}{\hat{R}\hat{E}c} \\ \frac{v_c^*}{L} \end{bmatrix}$$

Since the pair $(A_{avg}, B_{avg})$ is controllable for all $\hat{R}$, $\hat{E} > 0$, we apply a full state-feedback controller of the form $$\tilde{d}(x,\hat{\theta}) = -\tilde{K}(\hat{\theta})\tilde{x}$$

yielding the closed-loop dynamics $$\dot{\tilde{x}} = A_{cl}(\hat{\theta})\tilde{x}$$

where, for each $$\hat{\theta} \in \mathbb{R}^2_{>0},$$

$\tilde{K}$ is chosen so that the matrix $A_{cl}(\hat{\theta}) := A_{avg}(\hat{\theta}) - B_{avg}(\hat{\theta})\tilde{K}(\hat{\theta})$ is Hurwitz. Then, the PWM duty cycle is computed as $$d(x,\hat{\theta}) := \psi(d^*(\hat{\theta}) - \tilde{K}(\hat{\theta})\tilde{x})$$

where $\psi(s) := \min\{\max\{0, s\}, 1\}$ is a saturation function.

Then, we define the hybrid system $\mathcal{H}_0$ with state $z_0 := (q, \tau) \in \chi_0 := \{0,1\} \times [0,1]$, inputs $x \in \chi_P$ and $$\hat{\theta} \in \mathbb{R}^2_{>0},$$

and dynamics $$\dot{z}_0 = F_0(z_0) \quad (x, z_0, \hat{\theta}) \in C_0$$

$$z_0^+ = G_0(z_0) \quad (x, z_0, \hat{\theta}) \in D_0$$

$$\kappa_0(x, z_0, \hat{\theta}) := q$$

where $$F_0(z_0) := \begin{bmatrix} 0 \\ 1/\varepsilon \end{bmatrix}$$

$$G_0(z_0) := \begin{cases} \begin{bmatrix} 0 \\ \tau \end{bmatrix} & \text{if } (x, z_0, \theta) = D_0^0 \\ \begin{bmatrix} 1 \\ 0 \end{bmatrix} & \text{if } (x, z_0, \theta) = D_0^1 \end{cases}$$

with $C_0 := \chi_P \times \chi_0 \times \mathbb{R}^2_{>0}$ and $D_0 := D_0^0 \cup D_0^1$, where $$D_0^0 := \{(x, z_0, \hat{\theta}) \in \chi_P \times \chi_0 \times \mathbb{R}^2_{>0} : \tau = d(x, \hat{\theta}), q = 1\}$$

$$D_0^1 := \{(x, z_0, \hat{\theta}) \in \chi_P \times \chi_0 \times \mathbb{R}^2_{>0} : \tau = 1\}$$

and $\varepsilon > 0$ is a design parameter representing the PWM period.

For each solution $(q, \tau)$ to $\mathcal{H}_0$, the state component $r$ represents a timer that counts with a rate of $1/\varepsilon$, and resets to zero each time $\tau = 1$. The state component $q$ is a square wave representing the PWM signal that determines the converter switch state.

To ensure validity of the linearization in (17), and that the converter operates only in the continuous conduction mode under the local controller, we define the set $\chi_L := \mathcal{L} \cap \Pi$. Then, since the matrix $A_{cl}(\hat{\theta})$ in (19) is Hurwitz for each $\hat{\theta}$, there exists an open set $^3 \mathcal{B} \mathcal{A}_p \subset \chi_L$ containing a neighborhood of $\mathcal{A}_P$ that is forward invariant for [19]. The set $\mathcal{B} \mathcal{A}_p$ is the basin of attraction for [19 14, Definition 7.3].

Appendix F establishes that every maximal solution to the closed-loop local controller is complete. Appendix G establishes convergence.

4.4 Example Uniting Control Algorithm

To implement the uniting control framework, the supervisor logic outlined in Example 3 is applied to the interconnection of the boost converter plant $\mathcal{H}_P$ using the global and local control algorithms $\mathcal{H}_1$ and $\mathcal{H}_0$, respectively. Recall that $z_0$ is the state of $\mathcal{H}_0$, $z_1$ is the state of $\mathcal{H}_1$, and the output $\kappa$ of the selected controller is mapped to the input $q$ of $\mathcal{H}_P$. Then, we define the hybrid system $\mathcal{H}_U$ with state $z_U = (x, z_0, z_1, p) \in \chi_U := \chi_P \times \chi_0 \times \chi_1 \times \{0,1\}$ input $$\hat{\theta} \in \mathbb{R}^2_{>0},$$

and dynamics $$\dot{z}_U \in F_U(z_U, \hat{\theta}) \quad (z_U, \hat{\theta}) \in C_U \tag{23}$$

$$z_U^+ = G_U(z_U) \quad (z_U, \hat{\theta}) \in D_U.$$

The logic variable $p \in \{0,1\}$ is set to 0 when the global controller is selected and to 1 when the local controller is selected. The flow map $F_U$ is equal to $(F_P, F_0, 0, 0)$ when $p = 0$ and to $(F_P, 0, F_1, 0)$ when $p = 1$. It is written concisely as $$F_U(z_U, \hat{\theta}) := \begin{bmatrix} F_P(x, \kappa_p(x, z_p, \hat{\theta})) \\ (1-p)F_0(z_0) \\ pF_1(z_1) \\ 0 \end{bmatrix}$$

The flow set $C_U$ is $$C_U := \{(z_U, \hat{\theta}) \in \chi_U \times \mathbb{R}^2_{>0} : (x, \kappa_p(x, z_p, \hat{\theta})) \in C_P(x, z_0, \hat{\theta}) \in C_0,$$

$$(x, z_1, \hat{\theta}) \in C_1, (x, p) \in (\overline{\mathcal{M}} \times \{0\}) \cup (\overline{\mathbb{R}^n \backslash \mathcal{N}} \times \{1\})\}.$$

where the sets $\mathcal{N}$ and $\mathcal{M}$ are to be designed.

The jump map $G_U$ permits jumps by $G_0$ when $p=0$ and by $G_1$ when $p=1$, and toggles the value of $p$ based on the converter state $x$ in relation to the sets $\mathcal{N}$ and $\mathcal{M}$. This is expressed as $$G_U(z_U) := \begin{cases} G^0(z_U) & (z_U, \hat{\theta}) \in D^0 \backslash D^2 \\ G^1(z_U) & (z_U, \hat{\theta}) \in D^1 \backslash D^2 \\ G^2(z_U) & (z_U, \hat{\theta}) \in D^2 \backslash (D^0 \cup D^1) \\ \{G^0(z_U), G^2(z_U)\} & (z_U, \hat{\theta}) \in D^0 \cap D^2 \\ \{G^1(z_U), G^2(z_U)\} & (z_U, \hat{\theta}) \in D^1 \cap D^2 \end{cases}$$

where $$G^0(z_U) := (x, G_0(z_0), z_1, p)$$

$$G^1(z_U) := (x, z_0, G_1(z_1), p)$$

$$G^2(z_U) := (x, z_0, z_1, 1-p)$$

and the jump set is $D_U := D^0 \subset D^1 \subset D^2$ with $$D^0 := \{(z_U, \theta) \in \mathcal{X}_U \times \mathbb{R}^2_{>0} : (x, z_0, \theta) \in D_0, \, p = 0\}$$

$$D^1 := \{(z_U, \theta) \in \mathcal{X}_U \times \mathbb{R}^2_{>0} : (x, z_1, \theta) \in D_1, \, p = 1\}$$

$$D^2 := \{(z_U, \theta) \in \mathcal{X}_U \times \mathbb{R}^2_{>0} : (x, p) \in (\overline{\mathbb{R}^n \backslash M} \times \{0\}) \cup (\mathcal{N} \times \{1\})\}$$

The jump maps associated with the sets $D^0 \cap D^2$ and $D^1 \cap D^2$ are necessary to satisfy outer semicontinuity of G in Definition 2.1.

Finally, we interconnect the uniting control algorithm $\mathcal{H}_U$ in (23) and the estimation algorithm $\mathcal{H}_E$ in (8) to obtain a hybrid system, denoted by $\mathcal{H}$, with state $\xi := (z_U, z_E) \in \chi := \chi_U \times \chi_E$ and dynamics $$\dot{\xi} \in F(\xi) \quad \xi \in C \tag{24}$$

$$\xi^+ = G(\xi) \quad \xi \in D$$

With $$F(\xi) := (F_U(z_U, \theta), F_E(x, \kappa_p, z_E))$$

$$C := \{\xi \in \chi : (z_U, \theta) \in C_U, \, (x, \kappa_p, z_E) \in C_E\}$$

$$G(\xi) := \begin{cases} (G_U(z_U), z_E) & \text{if } (z_U, \theta) \in D_U, (x, \kappa_p, z_E) \notin D_E \\ (z_U, G_E(z_E)) & \text{if } (z_U, \theta) \notin D_U, (x, \kappa_p, z_E) \in D_E \\ (G_U(z_U), G_E(z_E)) & \text{if } (z_U, \theta) \in D_U, (x, \kappa_p, z_E) \in D_E \end{cases}$$

$$D := \{\xi \in \chi : (z_U, \theta) \in D_U \text{ or } (x, \kappa_p, z_E) \in D_E\}$$

where we have omitted the arguments of $\kappa_p$ for readability. Next we will design the uniting control sets $\mathcal{N}$ and $\mathcal{M}$.

5. Example Uniting Control Sets

Any sets $\mathcal{N}$ and $\mathcal{M}$ that satisfy Assumption 3.1 in the appendix are acceptable for the uniting control framework in (23). We provide one example of how these sets can be designed for the boost converter. We define the closed set $\mathcal{N}$ as $$\mathcal{N} := x^*(\theta) + r_{\mathcal{N}} \mathbb{B} \text{ where}$$

$$r_{\mathcal{N}} \in \mathbb{R}_{>0} \text{ is chosen such that } \mathcal{N} \subset \mathcal{B}_{\mathcal{A}_P}.$$

Then, we choose $\rho$ in (12) such that each maximal solution to the closed-loop global controller converges to $\mathcal{N}$. Note that since $\mathcal{N}$ is centered on the set-point $x^*$, it depends on the parameter estimate $\hat{\theta}$. The choice of a ball for $\mathcal{N}$ is arbitrary and was done for simplicity.

Figure 3A:
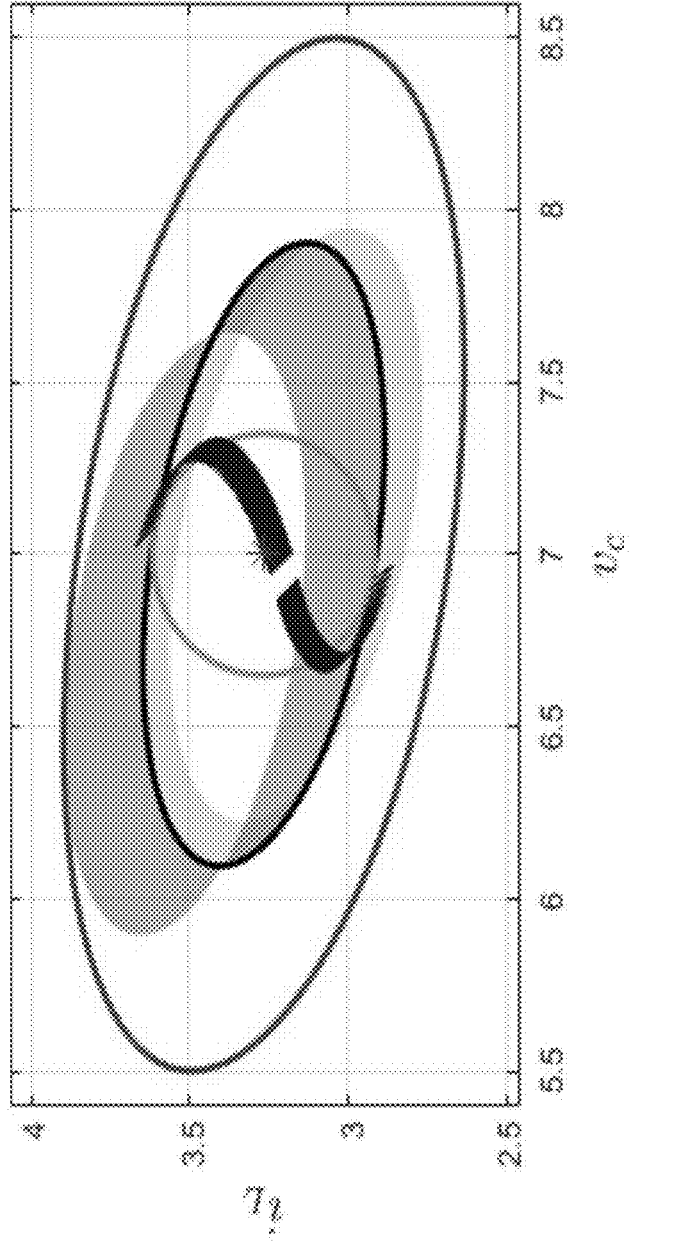
FIG. 3A: Example sets $\mathcal{N}$ (green circle), $\tilde{\mathcal{M}}$ (black ellipse), and $\mathcal{M}$ (red ellipse) are shown. Points reachable in time $\varepsilon$ from $\tilde{\mathcal{M}}$ are shown in magenta for q=1 and cyan for q=0. Example trajectories for the closed-loop system under $\mathcal{H}_0$ are shown in blue

The reachable set from $\mathcal{N}$ may be computed, for example, via Poisson analysis as in [20]. However, since this technique is computationally intensive for real-time implementation, we approximate M using the linearized model (19). A rigorous analysis of this approximation is beyond the scope of the paper. Using the Lyapunov function $V(x) := x^\top P x$, where $P = P^\top > 0$ solves $A_{cl}^\top(\theta) P + P A_{cl}(\theta) = -Q$ and $Q = Q^\top > 0$, we choose a parameter $r_0 \in \mathbb{R}_{>0}$ such that $L_{\tilde{V}}(r_0) \supset \mathcal{N}$. Then, solutions to 19) from $\mathcal{N}$ remain inside $\tilde{\mathcal{M}} := L_{\tilde{V}}(r_0)$ To bound the trajectories of the closed-loop local controller, points on the boundary of $\tilde{\mathcal{M}}$ are parameterized in a grid such that the variation in the vector field $F_P$ between adjacent points is small. We compute the finite-time reachable set from each point on the boundary of $\tilde{\mathcal{M}}$ by integrating $F_P$ for $\varepsilon$ seconds for each $q \in \{0,1\}$. Then, $\tilde{\mathcal{M}}$ is defined as $$\mathcal{M} := \text{int}(L_{\tilde{V}}(r \mathcal{M})) \tag{26}$$

where $r \mathcal{M} \in \mathbb{R}_{>0}$ is chosen such that $\mathcal{M}$ bounds the set reachable in $\varepsilon$ seconds from $\mathcal{M}$ for each switch state $q \in \{0,1\}$, as shown in FIG. 3A. Finally, we choose the matrix function $\check{K}$ in 18) and the parameter $\varepsilon > 0$ in (21) so that $$\mathcal{M} \subset \mathcal{X}_{\mathcal{L}}$$

6. Example Simulation Results

The following describes simulation results the hybrid system $\mathcal{H}$. Simulations are performed with c=0.1 F,L=0.2H, $$P = \begin{bmatrix} c/2 & 0 \\ 0 & L/2 \end{bmatrix},$$

$\varepsilon=0.0001$, $\beta=0.001$, $\mu=0.001$. The set $\mathcal{N}$ in (25) is defined with $r \mathcal{N} =0.05 v_c^*$, and a grid of 10 points is used to compute $\mathcal{M}$ in (26) from $\tilde{\mathcal{M}}$. Simulations are performed using the Hybrid Equations Toolbox [21].

(i) Simulating the Closed-Loop System

Figures 3B, 3C:
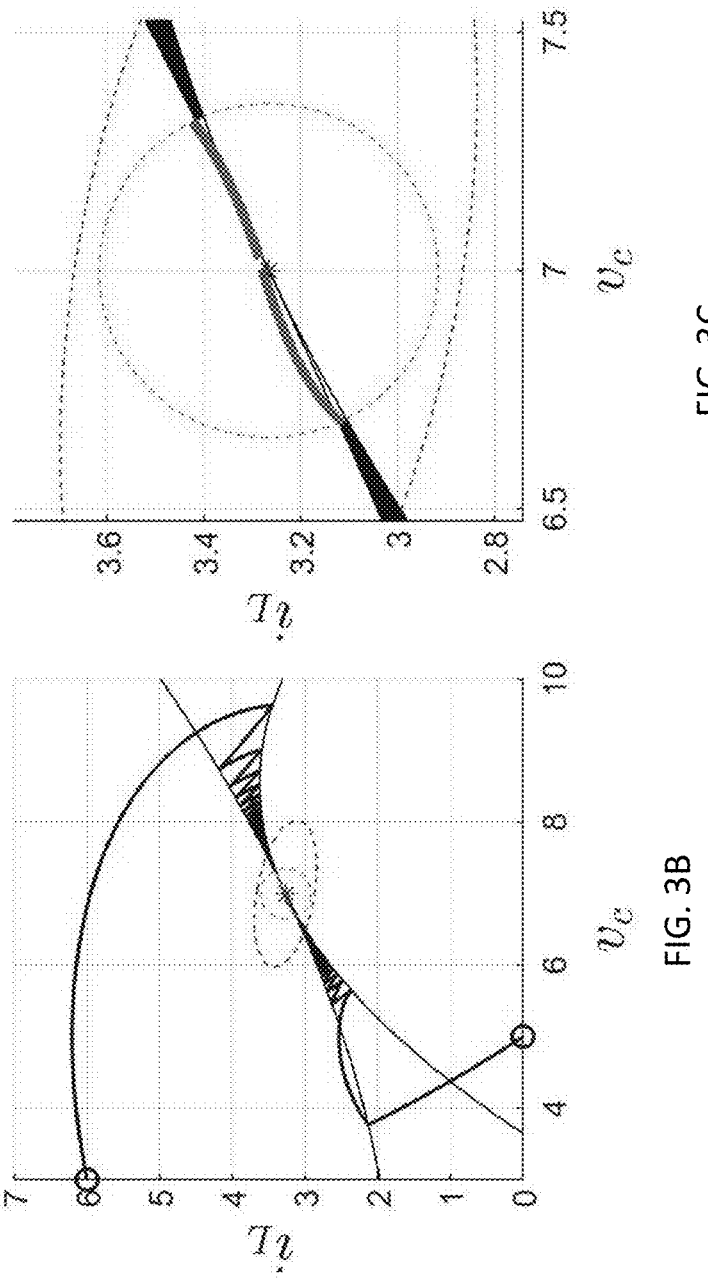
FIG. 3B shows trajectories under the global controller in blue.
FIG. 3C shows a zoomed in version of the plot in FIG. 3B with trajectories under the local controller in magenta. In both plots in FIGS. 3B and 3C, the set $\mathcal{N}$ is shown in dashed green and the set $\mathcal{M}$ is shown in dashed red.

Simulation results for $\mathcal{H}$ with $\hat{R}(0,0)=R=3$ and $\hat{E}(0,0)=E=5$ are shown in FIGS. 3B and 3C (Code at https://github.com/HybridSystemsLab/UnitingBoost, which is incorporated by reference herein) for two separate initial conditions: x(0,0)=(5,0) and x(0,0)=(3,6). In both cases, the plant state converges to a neighborhood of $\mathcal{A}_P=(7,3.27)$ in accordance with Theorem 5.3.

Figure 3D:
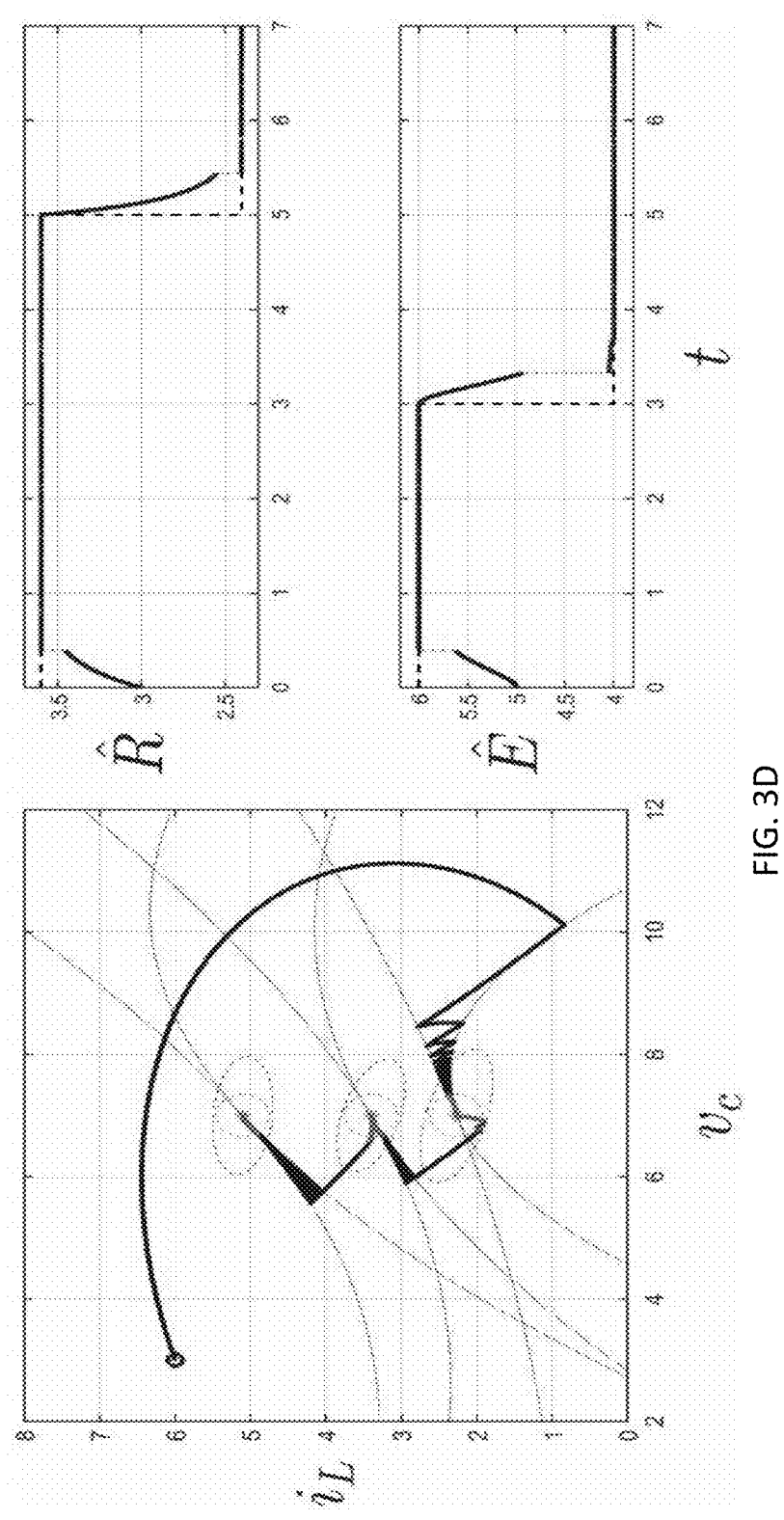
FIG. 3D. Simulation results with time-varying E and R.
Figure 4:
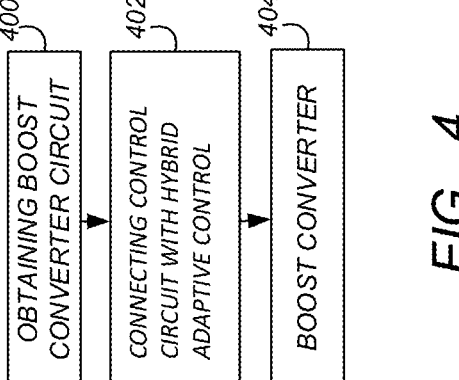
FIG. 4. Flowchart illustrating a method of making a boost converter circuit with hybrid adaptive control.

(ii) Simulation Results with Parameter Uncertainty $\mathcal{H}$ is simulated with uncertainty in the parameters R and E. Initial conditions are x(0,0)=(3,6), $\hat{R}(0,0)=3$, and $\hat{E}(0,0)=5$. The parameters R and E are initially equal to 3.6 and 6, respectively. Then, E changes to 4 at t=3 seconds, and R changes to 2.4 at t=5 seconds. The parameter estimate converges to the true value at 0.5 seconds, as shown in FIG. 3D (Code at https://github.com/HybridSystemsLab/UnitingBoost, which is incorporated by reference herein) The estimate converges again after E changes at t=3, and after R changes at t=5. The plant state converges to a neighborhood of $\mathcal{A}_P$ following each convergence of the parameter estimate to the true value, in accordance with Theorem 5.3 in the appendix Example Process Steps FIG. 4 is a flowchart illustrating a method of making a boost converter and/or control system for a boost converter.

Block 400 represents obtaining a boost converter circuit comprising a switch, a capacitor, an inductor, and a diode.

Block 402 represents connecting a hybrid adaptive controller circuit controlling a state (open or closed) of the switch so as to control raising of an input voltage E, inputted to the boost converter circuit, to an output voltage applied to an output load across the capacitor. The hybrid adaptive controller modulates a current flow through the inductor so as to control charging of the capacitor via the diode. The hybrid adaptive controller raises the input voltage to a desired output voltage by controlling the state of the switch FIG. 2 illustrates the hybrid adaptive controller 200 comprises a parameter estimator 202 estimating the input voltage and the output load; and a converter estimator 204 estimating an output voltage across the capacitor using the input voltage and the output load, and the pulse width modulation as inputs. The controller further comprises a global controller 210 outputting a first signal that controls a state of the switch to converge the output voltage to the desired output voltage; and a local controller 208 outputting a second signal that controls the state of the switch to maintain the output voltage at the desired output voltage. The controller further comprises a supervisor 206 using the estimate of the output voltage as feedback to select:

the global controller outputting a signal (first switch state command) to control a state of the switch until the output voltage and/or inductor current have converged to within predetermined ranges.

the local controller to output a signal (second switch state command) controlling a state of the switch so long as the desired output voltage and/or inductor current are maintained within predetermined ranges.

Block 404 represents the end result, a boost converter system with hybrid adaptive control. Examples include, but are not limited to, the following (referring also to FIGS. 1-7).

1. A boost converter 100, comprising:
a boost converter circuit 102 comprising a switch S (e.g., transistor) comprising a switch state (open or closed), a capacitor c, an inductor L, and a diode d;
a hybrid adaptive controller 104, 200, 602 connected to the switch for applying a hybrid algorithm controlling the switch state when the hybrid algorithm is executed by the hybrid adaptive controller; wherein the hybrid adaptive controller further comprises:
a global controller 210:
determining a first switch state command (open or close) as a function of estimates of the input voltage and a load resistance received from a parameter estimator, a measurement of an output voltage across the capacitor, and/or a measurement of the inductor current passing through the inductor, and
outputting the first switch state command (e.g., fixed state or changing with time) to the switch to set the switch state causing the output voltage to converge to a desired output voltage, thereby raising an input voltage E, inputted to the boost converter circuit, to the desired output voltage across the capacitor when a load comprising the load resistance is connected across the capacitor;
a local controller 208:
determining a second switch state command as a function of the estimates of the input voltage and the load resistance received from the parameter estimator, and the measurement of the output voltage and/or the measurement of the inductor current, and
outputting the second switch state command (e.g., pulse width modulation, fixed state or changing with time according to wave/signal) to the switch to set the switch state maintaining the output voltage at or within a set range of the desired output voltage and/or maintaining the inductor current at or within a set range of a desired current, when the load is connected; and
a supervisor 206 determining whether to execute the global controller outputting the first switch state command, or the local controller outputting the second switch state command, depending on the measurement of the output voltage and/or the measurement of the inductor current.

2. The boost converter of example 1, wherein the hybrid adaptive controller further comprises the parameter estimator 202.

3. The boost converter of example 1 or 2, wherein the supervisor uses the output voltage vs and/or the inductor current iL as feedback to select:
the global controller 210 outputting the switch state command until the output voltage has converged to within a first voltage range of the desired output voltage and/or the inductor current has converged to within a first current range of a desired current, or
the local controller 208 to output the second switch state command so long as the desired output voltage is maintained within a second voltage range and/or the inductor current is maintained within a second current range.

4. The boost converter of any of the examples 1-3, wherein:
the global controller induces asymptotic stability of the output voltage at the desired output voltage and/or the inductor current at the desired current, and
the local controller maintains, in a the output voltage at the desired output voltage and/or the inductor current at the desired current.

5. The boost converter of any of the examples 1-4, wherein the hybrid adaptive controller comprises one or more processors and one or more applications or programs executed by the one or more processors execute the hybrid algorithm comprising:
a parameter estimating algorithm, expressed using an estimator hybrid system, outputting the estimated load resistance and estimated input voltage in response to a parameter input comprising an initial input voltage;
a global control algorithm, expressed as a global controller hybrid system; outputting the first switch state command as a function of the output voltage and/or the inductor current,
a local control algorithm, expressed as a local controller hybrid system, outputting the second switch state command as a function of the output voltage and/or the inductor current; and
a supervisor algorithm, expressed as a supervisor hybrid system, outputting:
a first state instructing the hybrid adaptive controller to output the first switch state command to the switch until the output voltage is within a first voltage range and/or the inductor current is within a second current range, at which point outputting a second state, or
a second state instructing the hybrid controller to output the second switch state command so long as the output voltage is within a second voltage range and/or the inductor current is within a second current range.

6. The boost converter of example 5, wherein the first state and the second state comprise logic states 0 or 1.

7. The boost converter of example 5, wherein:

the parameter estimating algorithm is initialized with at least one of the current or the voltage set to zero, so that the first set of values $\mathcal{N}$ have converged to the desired output voltage and/or desired current, for any value and polarity of the desired output voltage or the desired current.

8. The boost converter of example 5, wherein the one or more applications or programs obtain or create a representation of the hybrid systems and determine the switch state commands by processing, in the hybrid systems, state variables representing the switch state commands as a function of the output voltage and/or desired current.

9. The boost converter of example 8, wherein the processing of the state variables comprises modifying the state variables via discrete jumps and continuous evolution in the hybrid systems.

10. The boost converter of example 8 or 9, wherein the hybrid systems determine the switch state commands from the estimates of the load resistance and the input voltage, and the measurements of the output voltage and the current, using ohm's law relationships between the inductor current, the output voltage, the input voltage, and the load resistance.

11. The boost converter of any of the examples 1-10, wherein:

the first voltage range and the first current range each comprise a first set of values $\mathcal{N}$ to which maximal solutions of the output voltage and the inductor current, respectively, converge in finite time in response to the first switch state command, and the second voltage range and the second current range each comprise a second set of values M to which the output voltage and the inductor current, respectively, remain in steady state in response to the second switch state command.

12. The boost converter of example 11, wherein the first set of values N comprises positive values of the output voltage across the capacitor and/or positive values of a current passing through the inductor.

13. The boost converter of any of the examples 1-12, wherein the local controller hybrid system implements a timer.

14. The boost converter of any of the examples 1-13, wherein at least one of the global controller, local controller, or the supervisor comprise one or more circuits comprising one or more application specific integrated circuits or one or more field programmable gate arrays.

15. The boost converter of any of the examples, wherein the parameter estimator is expressed using an estimator hybrid system.

16. The boost converter of any of the examples 1-15, wherein the controller comprises one or more processors; one or more memories; and one or more applications or programs stored in the one or more memories, wherein the one or more applications or programs executed by the one or more processors execute one or more algorithms, comprising:

a parameter estimating algorithm, expressed using an estimator hybrid system in the parameter estimator, outputting estimated load resistance and estimated input voltage in response to a parameter input comprising an initial input voltage;

a voltage estimating algorithm, expressed as a converter hybrid system in the convertor estimator 204, outputting the estimate of the output voltage, using the estimated load resistance and the estimated input voltage, in response to a converter input comprising the pulse modulation signal (e.g., whether the switch is on or off), a global control algorithm, expressed as a global controller hybrid system in the global controller 210; outputting a first commanded switch state as a function of the output voltage, a local control algorithm, expressed as a local controller hybrid system in the local controller 208, outputting the second commanded switch state as a function of the output voltage; and a supervisor algorithm, expressed as a supervisor hybrid system in the supervisor 206, outputting:

a first state instructing the controller to output the first modulation signal to the switch until the estimate is within the first range, at which point outputting the second state, or a second state instructing the controller to output the second modulation signal so long as the estimate is within the second range.

17. A boost converter, comprising:

a boost converter circuit comprising a switch, a capacitor, an inductor, and a diode;

an adaptive controller applying a switch state command to the switch so as to control:

raising of an input voltage E, inputted to the boost converter circuit, to a desired output voltage applied to an output load across the capacitor, and/or flow of the current through the inductor, wherein the switch state modulates a flow of the current through the inductor so as to control charging of the capacitor via the diode; and the hybrid adaptive controller comprises:

a parameter estimator estimating the input voltage and the output load;

a converter estimator estimating at least one of an output voltage across the capacitor, or the current through the inductor, using the input voltage, the output load, and the pulse width modulation as inputs;

a global controller outputting a first switch state command to converge at least one of the output voltage to the desired output voltage, or the current to a desired current;

a local controller outputting a second switch state command to maintain the output voltage at the desired output voltage, or the current at a desired current; and a supervisor using the estimate of the output voltage or the current as feedback to select:

the global controller outputting the first switch state command until the output voltage or the current has converged to within a first voltage range of the desired output voltage, and/or to within a first current range of the desired current, respectively, or the local controller to output the second switch state command so long as the desired output voltage or the current is maintained within a second voltage range and/or second current range, respectively.

18. The boost converter of any of the examples, wherein the controller comprises one or more processors and one or more applications or programs executed by the one or more processors execute one or more algorithms, comprising:

a parameter estimating algorithm, expressed using an estimator hybrid system, outputting estimated load resistance and estimated input voltage in response to a parameter input comprising an initial input voltage;

an estimating algorithm, expressed as a converter hybrid system, outputting the estimate of the output voltage and/or the current, using the estimated load resistance and the estimated input voltage, in response to a converter input comprising the pulse modulation signal, a global control algorithm, expressed as a global controller hybrid system; outputting the first modulation signal as a function of the estimate of the output voltage and/or the current, a local control algorithm, expressed as a local controller hybrid system, outputting the second modulation signal as a function of the estimate of the output voltage and/or the current; and a supervisor algorithm, expressed as a supervisor hybrid system, outputting:

a first state instructing the controller to output the first switch state command to the switch until the voltage estimate is within the first voltage range and/or the current estimate is within the second current range, at which point outputting the second state, or a second state instructing the controller to output the second switch state command so long as the voltage estimate is within the second voltage range and/or the current estimate is within the second current range.

19. A computer implemented method for controlling a boost converter, comprising:

obtaining a boost converter circuit comprising a switch comprising a switch state (open or closed), a capacitor, an inductor, and a diode;

applying a hybrid algorithm controlling the switch state, comprising:

using a global controller:

determining a first switch state command (open or close) as a function of estimates of the input voltage and a load resistance received from a parameter estimator, a measurement of an output voltage across the capacitor, and a measurement of the inductor current passing through the inductor, and outputting the first switch state command to the switch to set the switch state causing the output voltage to converge to a desired output voltage, thereby raising an input voltage E, inputted to the boost converter circuit, to the desired output voltage across the capacitor when a load comprising the load resistance is connected across the capacitor;

using a local controller:

determining a second switch state command as a function of the estimates of the input voltage and the load resistance received from the parameter estimator, and the measurement of the output voltage and the measurement of the inductor current, and outputting the second switch state command to the switch to set the switch state maintaining the output voltage at or within a set range of the desired output voltage and maintaining the inductor current at or within a set range of a desired current, when the load is connected; and determining, in a supervisor, whether to execute the global controller outputting the first switch state command, or the local controller outputting the second switch state command, depending on the measurement of the output voltage and the measurement of the inductor current.

20. A computer implemented system 600 for controlling a boost converter circuit, comprising:

one or more processors 604A-B, or a computer readable medium configured for:

receiving at least one of an desired output voltage or an inductor current for application to an output load using the boost converter circuit comprising a switch comprising a switch state (open or closed), a capacitor, an inductor, and a diode;

determining a first switch state command (open or closed) as a function of estimates of an input voltage and a load resistance received from a parameter estimator, a measurement of an output voltage across the capacitor, and a measurement of the inductor current passing through the inductor, wherein the first switch state command sets the switch state causing the output voltage to converge to a desired output voltage, thereby raising an input voltage E, inputted to the boost converter circuit, to the desired output voltage across the capacitor when a load comprising the load resistance is connected across the capacitor; and determining a second switch state command as a function of the estimates of the input voltage and the load resistance received from the parameter estimator, and the measurement of the output voltage and the measurement of the inductor current, wherein the second switch state command sets the switch state maintaining the output voltage at or within a set range of the desired output voltage and/or maintains the inductor current at or within a set range of a desired current, when the load is connected; and determining whether to output the first switch state command or the second switch state command to control the switch, depending on the measurement of the output voltage and the measurement of the inductor current.

21. The system of example 20 comprising the one or more processors and one or more applications or programs executed by the one or more processors for executing a hybrid algorithm performing the determining steps and outputting the switch state commands.

22. The system of example 20 or 21, wherein at least one of the global controller, local controller, or the supervisor comprise one or more circuits comprising one or more application specific integrated circuits or one or more field programmable gate arrays.

23. The system or method of any of the examples 19-22 implemented using the circuit of any of the examples 1-18.

24. A control system for a boost converter circuit comprising a model that captures the transient behavior and every possible state of the converter system; a modular "uniting" control framework (e.g., as described in example 3) that switches between global and local control schemes, implemented using a hybrid system tool (e.g., as presented in example 2); and an estimator (e.g., as in example 3) permitting finite-time estimation of the converter input voltage and load resistance. Example 5 shows that the closed-loop uniting framework and finite-time estimator induce global practical asymptotic stability of a desired voltage value. The hybrid systems tools developed in [14,15] form the enabling techniques to achieve these results.

25. A control system comprising an estimator that permits finite-time estimation of the converter input voltage and load resistance; a modular uniting framework/module that combines global and local control algorithms, and global and local control module implementing a global and local control scheme that induces the desired stability properties, wherein the closed-loop adaptive control scheme induces global practical asymptotic stability of the set-point while offering industry-standard PWM control performance near the set point even under parameter uncertainty. This is a substantial/significant improvement over PWM control alone.

26. A control system comprising a parameter estimator estimating input voltage and load resistance; a global controller outputting a first switch state command (fixed state or changing state with time) to converge the output voltage to desired output voltage and determining switch state using estimated input voltage, estimated load resistance from parameter estimator, and measured output voltage and measured inductor current, and a hybrid system analysis; and local controller outputting second switch state command (fixed state or varying switch state with time) to maintain the output voltage at the desired output voltage and determining switch state using estimated input voltage, estimated load resistance from parameter estimator, and measured output voltage and measured inductor current, and a hybrid system analysis.

27. The controller of any of the examples, wherein the processing performed by each controller (global controller, local controller, supervisor) is an algorithm, a method/methodology, or a function or one or more circuits. The global controller and the local controller, estimator, and supervisor may each comprise one or more components, modules, systems, units, etc. The combined set of elements within the controller and each controller may processes input using one or more algorithms or circuits to generate/produce an output.

28. The boost converter or system of any of the examples wherein the controller 104, 200 (e.g., comprising global controller, local controller, supervisor) comprises one or more processors; one or more memories; and one or more applications or programs stored in the one or more memories, wherein the one or more applications or programs executed by the one or more processors execute the one or more algorithms described herein.

29. The boost converter can be a converter circuit that converts direct current (DC) to DC.

In one or more examples, the controller 104 can also be used to control the output voltage by lowering or raising or otherwise changing the input voltage.

7. Example Method of Operation

Figure 5:
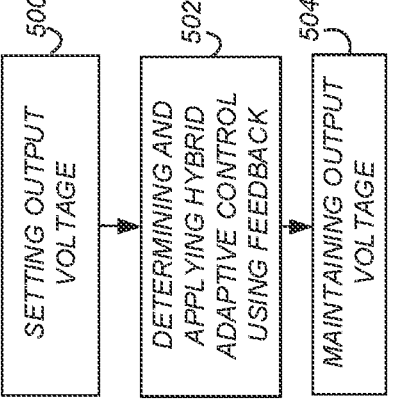
FIG. 5. Flowchart illustrating a method of performing hybrid adaptive control.

FIG. 5 illustrates a method of controlling a boost converter circuit.

Block 500 represents obtaining a desired output voltage for a boost converter circuit comprising a switch, a capacitor, an inductor, and a diode.

Block 502 represents determining and applying, using the output voltage as feedback, a hybrid algorithm for controlling raising of an input voltage E, inputted to the boost converter circuit, to an output voltage comprising the desired output voltage applied to an output load across the capacitor. The hybrid algorithm modulates a current flow through the inductor so as to control charging of the capacitor via the diode.

As illustrated in FIG. 2, the controlling comprises:

estimating, using a parameter estimator hybrid system, an estimated load resistance and estimated input voltage in response to an input comprising an initial input voltage, controlling the output voltage and/or current, using a converter hybrid system receiving the estimated load resistance, the estimated input voltage and the switch state commands as inputs.

determining, using a global controller hybrid system, a first commanded switch state (for controlling a switch state of the switch) as a function of the output voltage and the current, determining, using a local controller hybrid system, a second commanded switch state (for controlling a switch state of the switch, e.g. using pulse width modulation) as a function of the output voltage and current, selecting, using a supervisor hybrid system:

the global controller hybrid system to output the first commanded switch state until the output voltage has converged to within a first range of the desired output voltage and/or current, or the local controller hybrid system to output the second commanded switch state so long as the desired output voltage and/or current is maintained within a second range.

Block 504 represents obtaining the desired output voltage/inductor current.

8. Example Hardware Environment

Figure 6:
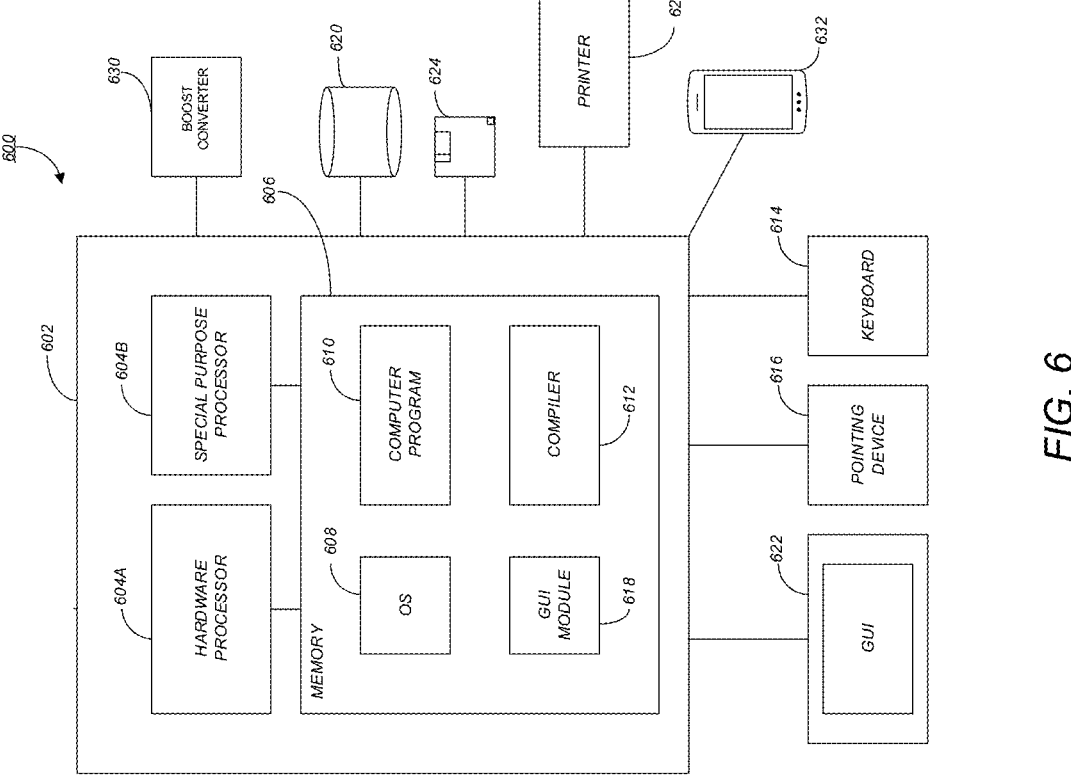
FIG. 6. Hardware environment for performing hybrid adaptive control according to one or more embodiments.

FIG. 6 is an exemplary hardware and software environment 600 (referred to as a computer-implemented system and/or computer-implemented method) used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 (e.g., hybrid adaptive control application) under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 602.

Figure 7:
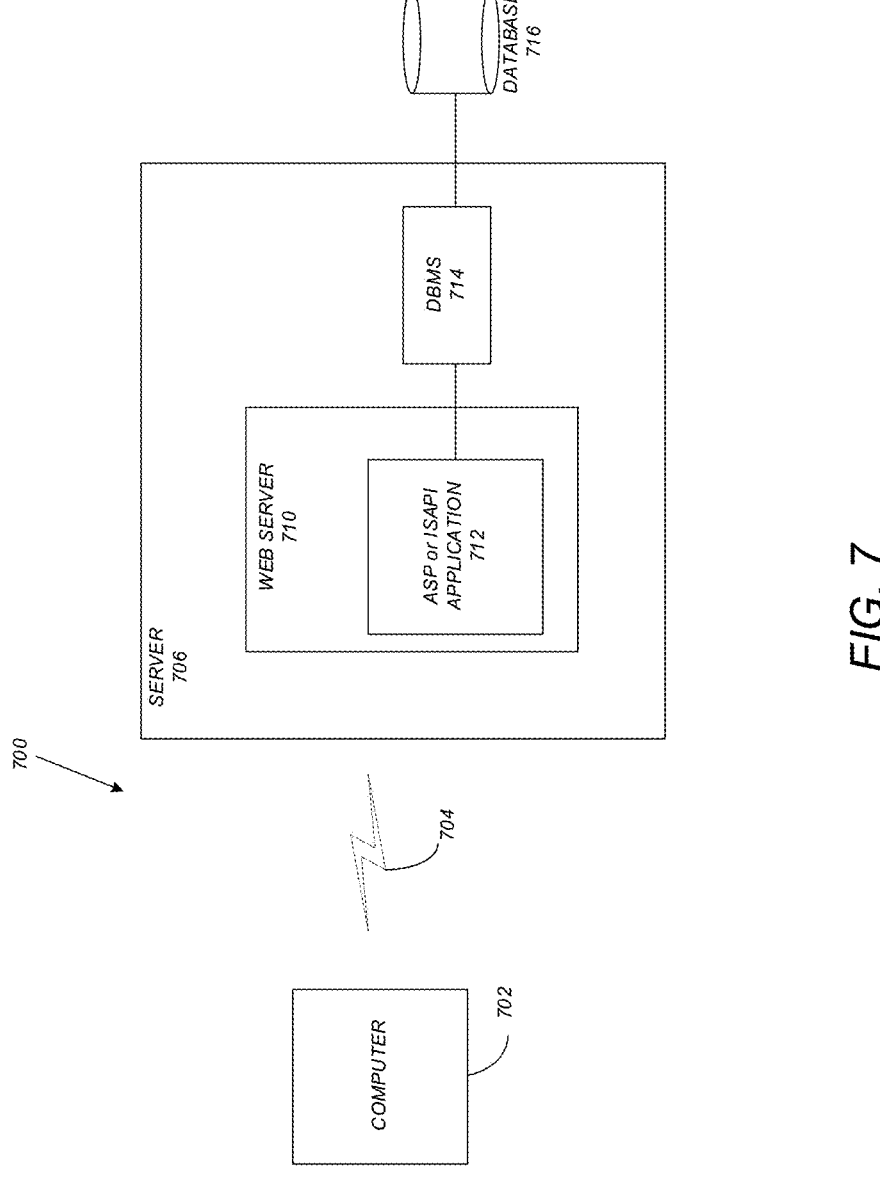
FIG. 7. Network environment for performing hybrid adaptive control according to one or more embodiments.

FIG. 7 schematically illustrates a typical distributed/cloud-based computer system 700 using a network 704 to connect client computers 702 to server computers 706. A typical combination of resources may include a network 704 comprising the Internet, LANs (local area networks), WANs (wide area networks), SNA (systems network architecture) networks, or the like, clients 702 that are personal computers or workstations (as set forth in FIG. 6), and servers 706 that are personal computers, workstations, minicomputers, or mainframes (as set forth in FIG. 6). However, it may be noted that different networks such as a cellular network (e.g., GSM [global system for mobile communications] or otherwise), a satellite based network, or any other type of network may be used to connect clients 702 and servers 706 in accordance with embodiments of the invention.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/ obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding Data-Base), or ODBC (Open DataBase Connectivity).

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 702 and 706. Embodiments of the invention are implemented as a software/hybrid adaptive control application on a client 702 or server computer 706. Further, as described above, the client 702 or server computer 706 may comprise a thin client device or a portable device that has a multi-touch-based display.

Advantages and Improvements

The present disclosure solves the problem of practically asymptotically stabilizing the DC-DC boost converter under parameter uncertainty. The industry-standard PWM control algorithm for the boost converter uses a linearized averaged model of the converter dynamics to determine the control input. As a result, the PWM control scheme guarantees stability only in the region of the state space where the linearization holds.

The present disclosure describes an estimation algorithm that identifies the input voltage and output load of the converter in finite time. Using these estimates, we designed a control algorithm that "unites" global and local control schemes. The global control scheme induces practical asymptotic stability of a desired output voltage and corresponding current, and the local control scheme maintains industry-standard PWM behavior during steady state. Stability properties for the resulting hybrid closed-loop system are established and operation is demonstrated through simulation, showing that by combining global and local control algorithms leveraging hybrid system tools, the hybrid adaptive controller induces practical asymptotic stability of a desired set point from a larger set of initial conditions than the PWM control algorithm.

Although the control architecture was demonstrated using hybrid system, alternative control schemes for the global or local control algorithms in the uniting control framework may be used. The control algorithm may also be implemented in hardware.

Further Information on One or More Embodiments of the Present Invention and Appendices 2.1. Notation We denote the real, nonnegative, positive, and natural numbers as $\mathbb{R}$, $\mathbb{R}_{\geq 0}$, $\mathbb{R}_{>0}$, and $\mathbb{N}$, respectively. Given a set S, $\partial S$ denotes its boundary and $\overline{S}$ its closure. The Euclidean norm is denoted $|\cdot|$. The distance of a point x to a nonempty set S is defined by $|x|_S = \inf_{y \in S} |y - x|$. Given a set-valued mapping $M: \mathbb{R}^m \rightrightarrows \mathbb{R}^n$, the domain of M is the set dom $M = \{x \in \mathbb{R}^m : M(x) \neq \emptyset\}$, and the range of M is the set rge $M = \{y \in \mathbb{R}^n : \exists x \in \mathbb{R}^m \text{ s.t. } y \in M(x)\}$. A function $\beta: \mathbb{R}_{\geq 0} \times \mathbb{R}_{\geq 0} \to \mathbb{R}_{\geq 0}$ is said to be of class $\mathcal{KL}$ if it is nondecreasing in its first argument, nonincreasing in its second argument, $\lim_{r \to 0+} \beta(r, s) = 0$ for each $s \in \mathbb{R}_{\geq 0}$, and $\lim_{s \to \infty} \beta(r, s) = 0$ for each $r \in \mathbb{R}_{\geq 0}$. The (Bouligand) tangent cone [14. Definition 5.12] to the set $S \subset \mathbb{R}^n$ at $\eta \in \mathbb{R}^n$ is denoted $T_S(\eta)$. The $\mu$-sublevel set of the function $V: \text{dom } V \to \mathbb{R}_{\geq 0}$, which is the set of points $\{x \in \text{dom } V : V(x) \leq \mu\}$, is denoted $L_V(\mu)$. The closed unit ball centered at the origin of appropriate dimension (in the Euclidean norm) is denoted $\mathbb{B}$. The set $\mathcal{SP}^{n \times n}$ contains positive semi-definite matrices with dimension n×n.

2.1 Hybrid System

An example hybrid system $\mathcal{H}$ has data (C, F, D, G, κ) and is given by [14,15]

$$\mathcal{H} = \begin{cases} (x, u) \in C & \dot{x} \in F(x, u) \\ (x, u) \in D & x^+ \in G(x, u) \\ \quad y & = \kappa(x, u) \end{cases}$$

where $x \in \mathbb{R}^n$ is the state, $u \in \mathbb{R}^m$ is the input, $F: \mathbb{R}^n \times \mathbb{R}^m \rightrightarrows \mathbb{R}^n$ is a setvalued map defining the flow map of the differential inclusion capturing the continuous dynamics, and $C \subset \mathbb{R}^n \times \mathbb{R}^m$ defines the flow set on which flows are permitted. Similarly, $G: \mathbb{R}^n \times \mathbb{R}^m \rightrightarrows \mathbb{R}^n$ is a set-valued map defining the jump map of the difference inclusion modeling the discrete behavior, and $D \subset \mathbb{R}^n \times \mathbb{R}^m$ is the jump set on which jumps are permitted. The vector $y \in \mathbb{R}^n$ defines the output of the hybrid system.

A solution x to $\mathcal{H}$ is parameterized by $(t, j) \in \mathbb{R}_{\geq 0} \times \mathbb{N}$, where t is the amount of ordinary time that has passed and j is the number of jumps that have occurred. The domain of x, denoted dom $x \subset \mathbb{R}_{\geq 0} \times \mathbb{N}$, is a hybrid time domain, in the sense that for every $(T, J) \in \text{dom } x$, there exists a nondecreasing sequence $$\{t_j\}_{j=0}^{J+1}$$

with $t_0 = 0$ such that $$\text{dom } x \cap ([0, T] \times \{0, 1, \ldots, J\}) = \bigcup_{j=0}^{J} ([t_j, t_{j+1}], \{j\})$$

A solution x to $\mathcal{H}$ is called maximal if it cannot be extended. A solution is called complete if its domain is unbounded. The set of all maximal solutions to $\mathcal{H}$ is denoted $\mathcal{S}_{\mathcal{H}}$, and the set of all maximal solutions to $\mathcal{H}$ with initial condition belonging to a set K is denoted $\mathcal{S}_{\mathcal{H}}$(K). A set K is said to be forward invariant for $\mathcal{H}$ if each solution x∈z,671(K) is complete and satisfies rge x ⊂ K. We will use [14, Proposition 6.10] to prove the existence and completeness of solutions for the proposed algorithm. For self-contained-ness, we recall 14, Proposition 6.10] next.

Definition 2.1. Let $\mathcal{H}$ =(C, F, D, G) satisfy the hybrid basic conditions, i.e., its data (C, F, D, G) is such that (A1) C and D are closed subsets of $\mathbb{R}^n$; (A2) F:$\mathbb{R}^n \rightrightarrows \mathbb{R}^n$ is outer semicontinuous and locally bounded relative to C, C⊂dom F, and F(x) is nonempty and convex for all x∈C;

(A3) G:$\mathbb{R}^n \rightrightarrows \mathbb{R}^n$ is outer semicontinuous and locally bounded relative to D and D⊂dom G.

Take an arbitrary $\zeta$∈C∪D. If $\zeta$E D, or (VC) there exists a neighborhood U of $\zeta$ such that for every x∈U∩C, F(x) ∩$T_C$(x)≠∅ then there exists a nontrivial solution to $\mathcal{H}$ with x(0,0)=$\zeta$. If (VC) holds for every $\zeta$∈C\D, then there exists a nontrivial solution to H from every point in C∪D, and every x∈ $\mathcal{S}_{\mathcal{H}}$ satisfies exactly one of the following conditions:

(a) x is complete;

(b) (finite escape time) dom x is bounded and the interval $I^J$, where J=$\sup_J$dom x, has nonempty interior and t ↦x(t,J) is a maximal solution to $\dot{x}$∈F(x), in fact $\lim_{t>T}|x(t,J)|=\infty$, where T=$\sup_t$dom x;

(c) (solutions jumping outside C∪D)dom x(T,J)∉C∪D, where (T,J)=sup dom x.

Furthermore, if G(D)⊂C∪D, then (c) above does not occur.

2.2 Boost Converter Model

FIG. 1 illustrates a boost converter comprising is a class of switched-mode power supply that utilizes a switch S, inductor L, diode d, and capacitor c to raise the voltage at the output load R compared to the input voltage E. The state of the switch S (open or closed) represents the control input to the boost converter plant. When the switch is closed, current flows through the inductor and generates a magnetic field. When the switch is opened, the inductor magnetic field decays to maintain the current towards the load, causing a polarity reversal within the inductor. The primary voltage source in series with the inductor then charges the capacitor through the diode to a higher voltage than is attainable using the voltage source alone. If the switch is cycled fast enough, the inductor does not fully discharge between cycles and the load voltage remains higher than that of the source.

The boost converter dynamics may be expressed as a (continuous time) plant, $\mathcal{H}_P$, with discrete-valued input denoting the position of the switch S. We model it as $\mathcal{H}$ in (1) but with no jumps. That is, $\mathcal{H}_P$ with state $$x := (v_c, i_L), \ x \in X_P := \tilde{M_0} \cup \tilde{M}_1$$

which are defined below, input q∈{0, 1}, and output x. Following 12], its dynamics reduce to the differential inclusion with constraints $$x \in F_P(x, q)(x, q) \in C_P \text{ where}$$

$$C_P := (\tilde{M}_0 \times \{0\}) \cup (\tilde{M}_1 \times \{1\})$$

$$\tilde{M}_0 := \overline{M_1} \cup \overline{M_3} = \{x \in \mathbb{R}^2 : i_L \geq 0\},$$

$$\tilde{M}_1 := M_2 \{x \in \mathbb{R}^2 : v_c \geq 0\}, \text{ with}$$

$$M_1 = \{x \in \mathbb{R}^2 : i_L > 0\} \cup \{x \in \mathbb{R}^2 : v_c \leq E, i_L = 0\}$$

$$M_2 = \{x \in \mathbb{R}^2 : v_c \geq 0\}$$

$$M_3 = \{x \in \mathbb{R}^2 : v_c > E, i_L = 0\}$$

and $F_P$ is the Krasovskii regularization of the vector fields and the corresponding constraint sets associated with each mode of circuit operation given by, for each x∈$\chi_P$, (see [12 for details)

$$F_P(x, 0) := \begin{cases} \begin{bmatrix} -\dfrac{1}{Rc}v_c + \dfrac{1}{c}i_L \\ -\dfrac{1}{L}v_c + \dfrac{E}{L} \end{bmatrix} & \text{if } x \in \overline{M_1} \backslash \overline{M_3} \\ \left\{-\dfrac{1}{Rc}v_c\right\} \times \left[-\dfrac{1}{L}v_c + \dfrac{E}{L}, 0\right] & \text{if } x \in \overline{M_3} \end{cases}$$

$$F_P(x, 1) := \begin{bmatrix} -\dfrac{1}{Rc}v_c \\ \dfrac{E}{L} \end{bmatrix} \quad \text{if } x \in \tilde{M}_1 .$$

9. Problem and Solution Solved Using the Hybrid Active Control

Since the supply voltage E and load resistance R for the converter may vary during operation, it is desirable to estimate these values so the chosen control algorithm can adapt accordingly. Furthermore, since the stability properties of boost converter PWM control algorithms typically only hold locally near the set-point, we desire to solve the following problems:

Problem 1: Design an algorithm that permits on-line estimation of the boost converter input voltage E and load resistance R.

Problem 2: Design an adaptive control law whose closed-loop system induces practical asymptotic stability of a desired output voltage.

Due to our desire to maintain PWM operation in steady-state, the boost converter is an ideal candidate for the control framework known as "uniting control." This framework utilizes a divide and conquer approach to control design by combining two feedback controllers and a logic-based algorithm that selects which controller to apply. Uniting control strategies permit combining a global controller that renders a set-point stable but may not have good performance near the set point, and a local controller that induces satisfactory performance, but only locally [13].

The uniting control logic is implemented as follows. Given a plant $\mathcal{H}_P$ as in (2) interconnected with two separate control algorithms, $\mathcal{H}_0$, referred to as "global," and $\mathcal{H}_1$, referred to as "local," the choice of control algorithm is governed by a supervisory controller that selects between $\mathcal{H}_1$ and $\mathcal{H}_0$ based on the plant state in relation to a closed set $\mathcal{N}$ and an open set $\mathcal{M} \supset \mathcal{N}$ as follows: —Apply the global controller $\mathcal{H}_1$ until the solution to the plant enters $\mathcal{N}$. When any such point is reached, switch to the local controller $\mathcal{H}_0$.

Apply the local controller $\mathcal{H}_0$ as long as the solution to the plant remains inside $\mathcal{M}$. If the state of the plant leaves $\mathcal{M}$, switch to the global controller $\mathcal{H}_1$.

Given $\mathcal{H}_1$ and $\mathcal{H}_0$, the uniting control sets $\mathcal{N}$ and $\mathcal{M}$ will be designed to satisfy the following assumption.

Assumption 3.1. Given a hybrid system $\mathcal{H}_P$ as in (2), each maximal solution x to $\mathcal{H}_P$ with input q generated by $\mathcal{H}_1$ converges to $\mathcal{N}$ in finite (hybrid) time;

each solution x to $\mathcal{H}_P$ from $\mathcal{N}$ and input q generated by $\mathcal{H}_1$ remains in $\mathcal{M}$ for all (hybrid) time.

Hence, for the boost converter, the global controller drives the converter state into $\mathcal{N}$, from where solutions under the local PWM controller remain inside $\mathcal{N}$ for all future time.

Next, the parameter estimation algorithm and the global and local control algorithms are designed and then combined using the uniting control framework.

4. Hybrid Parameter Estimation and Uniting Control

4.1 Parameter Estimation

Next we address Problem 1 from Section 3. Suppose that the unknown converter parameters R and E take values from $R \in [R_{min}, R_{max}]$ and $E \in [E_{min}, E_{max}]$ where $R_{min}, R_{max}, E_{min}, E_{max} > 0$ are known. Then, for the purpose of estimating R and E, we establish the following lemma that allows us to express the dynamics of maximal solutions to $\mathcal{H}_P$, in a convenient form.

Lemma 4.1. Each maximal solution $t \mapsto x(t)$ to $\mathcal{H}_P$ in (2) with input $t \mapsto q(t)$ satisfie {

$$\dot{x}(t) = f_1(x(t), q(t)) + f_2(x(t), q(t)) \vartheta \tag{4}$$

Since $\mathcal{H}_P$ in (2) is a continuous-time system, its solutions are parameterized using only t. for all $t \in$ dom (x, q), where $\vartheta = (\vartheta_1, \vartheta_2) := (R^{-1}, E)$ and Proof. This proof is in Appendix A.

Estimating the parameters R and E is equivalent to estimating the parameter vector $\vartheta$ in (4). For this purpose, the finite-time parameter estimator in [16,17] is extended to classes of hybrid systems whose solutions satisfy 4). The algorithm is expressed as a hybrid system, denoted $\mathcal{H}_E$, and operates as follows. Let $z_E = (\hat{x}, \hat{\vartheta}, \omega, Q, \eta, \Gamma)$ be a solution to $\mathcal{H}_E$—hence, defined on a hybrid time domain—where $\hat{x}$ is the estimate of x, $\hat{\vartheta}$ is the estimate of $\vartheta$, and $\omega, Q, \eta, \Gamma$ are auxiliary variables. Consider the initial interval of flow $I^0 := \{t : (t, 0) \in$ dom $z_E\}$ in dom $z_E$ with constant $\vartheta$ and initial conditions $\omega(0,0) = 0, Q(0,0) = 0, \eta(0,0) = 0, \Gamma(0,0) = 0$, and $\hat{\vartheta}(0, 0) \in \mathbb{R}^2$ arbitrary. Omitting the (t,j) of solutions, for the sake of making an argument, suppose that over this interval of flow, Q and $\Gamma$ satisfy $$Q = \omega^\tau \omega, \dot{\Gamma} = \omega^\tau \omega \vartheta$$

Then, if there exists a positive time $t_1 \in I^0$ such that $Q(t_1, 0)$ is invertible, resetting $\hat{\vartheta}$ to the value of $Q^{-1}\Gamma$ leads to $$\hat{\vartheta}(t_1, 1) = Q^{-1}(t_1, 0)\Gamma(t_1, 0) \tag{5}$$

$$= \left( \int_0^{t_1} \omega(t, 0)^\top \omega(t, 0) dt \right)^{-1} \left( \int_0^{t_1} \omega(t, 0)^\top \omega(t, 0) dt \vartheta \right) = \vartheta \tag{6}$$

However, since $\vartheta$ is unknown prior to hybrid time $(t_1, 1)$, a trajectory for $\Gamma$ satisfying (5) cannot be generated. Due to this, we rewrite the dynamics of $\Gamma$ as $$\dot{\Gamma} = \omega^\top \left( \omega \vartheta + \omega(\hat{\vartheta} - \hat{\vartheta}) + (x - x) + (\hat{x} - \hat{x}) \right)$$

$$= \omega^\top \left( \omega \hat{\vartheta} + x - \hat{x} - \eta \right)$$

where $\eta = x - \hat{x} - \omega(\vartheta - \hat{\vartheta})$. Note that since $\omega(0,0) = 0$, the initial condition $\eta(0,0) = 0$ implies $\hat{x}(0,0) = x(0,0)$. Differentiating $\eta$ yields $$\dot{\eta} = \dot{x} - \dot{\hat{x}} - \dot{\omega}(\vartheta - \hat{\vartheta}) + \omega \dot{\hat{\vartheta}}$$

Next we define a matrix function $(x, q) \mapsto K(x, q) = K^\tau(x, q) > 0$ that is to be designed. The arguments of K are omitted below for simplicity. Let $\hat{x}, \omega$, and $\hat{\vartheta}$ satisfy $$\dot{\hat{x}} = f_1(x, q) + f_2(x, q) \hat{\vartheta} + K(x - \hat{x}) + \omega \dot{\hat{\vartheta}}$$

$$\dot{\omega} = f_2(x, q) - K\omega.$$

Plugging the expressions above into (7) yields $$\dot{\eta} = f_2(x, q)(\vartheta - \hat{\vartheta}) - K(x - \hat{x}) - \omega \dot{\hat{\vartheta}} - (f_2(x, q) - K\omega)(\vartheta - \hat{\vartheta}) + \omega \dot{\hat{\vartheta}} = \tag{7}$$

$$-K(x - \hat{x}) + K\omega(\vartheta - \hat{\vartheta}) = -K\eta$$

Hence, $\omega, Q, \eta$, and $\Gamma$ are now expressed in terms of known quantities and we can compute $\hat{\vartheta}$ as in (6).

Following [17], the estimation scheme outlined above can be implemented as a hybrid algorithm whose jump map imposes the initial conditions specified above (5) and computes $\hat{\vartheta}$ as in (6). The hybrid system, denoted by $\mathcal{H}_E = (C_E, F_E, D_E, G_E, \hat{\theta})$, has state $$z_E := (\hat{x}, \hat{\vartheta}, \omega, Q, \eta, \Gamma) \in X_E := \mathbb{R}^2 \times \mathbb{R}^2 \times \mathbb{R}^{2 \times 2} \times S\mathcal{P}^{2 \times 2} \times \mathbb{R}^2 \times \mathbb{R}^2,$$

inputs $(x, q) \in C_P$, output $\hat{\theta} \in \mathbb{R}^2_{>0}$, and dynamics $$\dot{z}_E = F_E(x, q, z_E) \ (x, q, z_E) \in C_E \tag{8}$$

$$z_E^+ = G_E(x, z_E) \ (x, q, z_E) \in D_E$$

$$\hat{\theta} = h_E(\hat{\vartheta}) \ \text{where} \ G_E(x, z_E) := (x, Q^{-1}\Gamma, 0, 0, 0, 0),$$

$$F_E(x, q, z_E) := \begin{bmatrix} f_1(x, q) + f_2(x, q)\hat{\vartheta} + K(x - \hat{x}) + \omega h(x, q, z_E) \\ h(x, q, z_E) \\ f_2(x, q) - K\omega \\ \omega^\top \omega \\ -K\eta \\ \omega^\top (\omega\hat{\vartheta} + x - \hat{x} - \eta) \end{bmatrix} \text{with}$$

$$h(x, q, z_E) = \Omega(\omega^\top + f_2(x, q)^\top)(x - \hat{x}), \text{and}$$

$$C_E := \{(x, q, z_E) \in C_P \times X_E : \det(Q) \le \mu\}$$

$$D_E := \{(x, q, z_E) \in C_P \times X_E : \det(Q) \ge \mu\}.$$

The matrix function K and the parameter $\Omega = \Omega^\tau > 0$ modify the convergence rate of $\hat{x}$ and $\hat{\vartheta}$ during flows, and $\mu > 0$ ensures that $Q^{-1}$ is well-defined in the jump map. The dynamics of $\mathcal{H}_E$ in (8) are similar to the estimator proposed in [17]. However, in 17], $f_1$ and $f_2$ are continuous functions of the state and input, compared to piecewise continuous functions in (4).

To ensure completeness of maximal solutions for the control algorithms discussed in the following subsections, we require that $$(\hat{R}, \hat{E}) \in \mathbb{R}^2_{>0}.$$

Hence, the output of $\mathcal{H}_E$ is computed as $$h_E(\hat{\vartheta}) := \begin{bmatrix} \varrho\left(\hat{R}^{-1}, R^{-1}_{max}, R^{-1}_{min}\right)^{-1} \\ \varrho(\hat{E}, E_{min}, E_{max}) \end{bmatrix}$$

where $$\varrho(s, s_{min}, s_{max}) := \begin{cases} s_{min} & \text{if} & s \leq s_{min} \\ s & \text{if} & s_{min} < s < s_{max} \\ s_{max} & \text{if} & s_{max} \leq s \end{cases}.$$

Similarly to [16,17], each maximal solution to $\mathcal{H}_E$ is guaranteed to jump if the following holds.

Assumption 4.2. Given a compact set $\Lambda \subset \chi_P \times \{0,1\}$, there exist a, b>0 such that, for each maximal solution $t \mapsto x(t)$ to $\mathcal{H}_P$ with input $t \mapsto q(t)$ satisfying rge $(x, q) \subset \Lambda$ and each $\tilde{t}>0$ such that $[\tilde{t}, \tilde{t}+\alpha] \subset \text{dom } (x, q)$, $$\int_{\tilde{t}}^{\tilde{t}+a} f_2(x(s), q(s))^\top f_2(x(s), q(s)) ds \geq bI.$$

We establish the following proposition that states conditions that ensure the parameter estimate $\hat{\theta}$ converges in finite time to $\theta$ for the interconnection of the plant $\mathcal{H}_P$ and estimator $\mathcal{H}_E$.

Proposition 4.3. Consider the interconnection of $\mathcal{H}_P$ in (2) and $\mathcal{H}_E$ in (8) with $$K(x, q) = k + \frac{1}{4} f_2(x, q) \Omega f_2^T(x, q)$$

where $$k > \frac{1}{4} I$$

and $\Omega = \Omega^\tau > 0$, with input [2](t, j)$\mapsto$q(t,j)$\in \{0,1\}$. Given a compact set $\Lambda \subset \chi_P \times \{0,1\}$ satisfying Assumption 4.2, there exists $\mu>0$ in (8) such that, for each maximal solution $\phi=(x, q, z_E)$ to the interconnection satisfying rge $(x, q) \subset \Lambda$, there exists a hybrid time $(t', j') \in \text{dom } \phi$ such that $\phi(t, j) \in \Lambda \times \mathcal{A}_E$ for all $(t, j) \in \text{dom } \phi$ satisfying $t+j \geq t'+j'$, where $$\mathcal{A}_E := \left\{ z_E \in \mathcal{X}_E : \hat{x} = x, \hat{\vartheta} = \vartheta, \eta = 0 \right\}$$

Proof. This proof is in Appendix B.

a. Global Control Algorithm

Next we address Problem 2 from section 3 in the context of the uniting control framework described therein, beginning with the global control algorithm. The hybrid control algorithm in [12] represents an ideal candidate for the global controller. Given a desired output voltage $v_c*$, this algorithm renders the set $$\mathcal{A}_P := \left\{ x \in \mathbb{R}^2 : v_c = v_c^*, \ i_L = i_L^* = \frac{v_c^{*2}}{RE} \right\}$$

globally asymptotically stable for the boost converter when the converter parameters c, L, R, E>0 are known.

However, in contrast to [12], the parameters R and E are unknown in this section. Hence, we employ the certainty equivalence principle and substitute the parameter estimates $\hat{R}$ and $\hat{E}$ from $\mathcal{H}_E$ in (8) for R and E, respectively. Then, following the derivation in [12], given a desired voltage $$v_c^*,$$

the setpoint $$x^*(\hat{\theta}) := (v_c^*, \hat{i}_L^*) \text{ with } \hat{i}_L^* := \frac{v_c^{*2}}{\hat{R}\hat{E}}$$

is stabilized using the control Lyapunov function $$V(x, \hat{\theta}) = (x - x^*(\hat{\theta}))^\top P(x - x^*(\hat{\theta})),$$

where $$P = \begin{bmatrix} p_{11} & 0 \\ 0 & p_{22} \end{bmatrix} > 0$$

with [2] Since the interconnection of $\mathcal{H}_P$ and $\mathcal{H}_E$ is a hybrid system, the input and state of $\mathcal{H}_P$ are now parameterized by $$(t, j). \frac{p_{11}}{c} = \frac{p_{22}}{L}.$$

We define a hybrid system $\mathcal{H}_1$ with state $$z_1 := q \in \mathcal{X}_1 := \{0, 1\}, \text{ inputs } x \in \mathcal{X}_P \text{ and } \hat{\theta} \in \mathbb{R}^2_{>0},$$

and dynamics $$\dot{q} = 0 =: F_1(z_1) \quad (x, z_1, \hat{\theta}) \in C_1 \tag{12}$$

$$q^+ = 1 - q =: G_1(z_1) \quad (x, z_1, \hat{\theta}) \in D_1$$

$$\kappa_1(x, z_1, \hat{\theta}) := q$$

where $\kappa_1$ represents the input q of $\mathcal{H}_P$ $$C_1 := \left\{ (x, z_1, \hat{\theta}) \in \mathcal{X}_P \times \mathcal{X}_1 \times \mathbb{R}^2_{>0} : \hat{\gamma}_0(x, \hat{\theta}) \leq \rho, q = 0 \right\}$$
$$\bigcup \left\{ (x, z_1, \hat{\theta}) \in \mathcal{X}_P \times \mathcal{X}_1 \times \mathbb{R}^2_{>0} : \hat{\gamma}_1(x, \hat{\theta}) \leq \rho, q = 1 \right\}$$

-continued $$D_1 := \{(x, z_1, \theta) \in X_P \times X_1 \times \mathbb{R}^2_{\geq 0} : \tilde{\gamma}_0(x, \theta) \geq \rho, q = 0\}$$

$$\bigcup \{(x, z_1, \theta) \in X_P \times X_1 \times \mathbb{R}^2_{\geq 0} : \tilde{\gamma}_1(x, \theta) \geq \rho, q = 1\},$$

and $\rho \in \mathbb{R}_{>0}$ is a design parameter that, as in [12], spatially regularizes the closed-loop global controller by modifying the separation between the functions $\tilde{\gamma}_0$ and $\tilde{\gamma}_1$ to avoid Zeno behavior. The functions $\tilde{\gamma}_0$ and $\tilde{\gamma}_1$ are $$\tilde{\gamma}_0(x, \theta) = \gamma_0(x, \theta) + K_0(v_c - v_c^*)^2$$

$$\tilde{\gamma}_1(x, \theta) = \gamma_1(x, \theta) + K_1(v_c - v_c^*)^2$$

where $\gamma_0(x, \theta) = 2(a_0 v_c^2 + b_0 v_c + c_0 i_L + d_0)$ $\gamma_1(x, \theta) = 2(a_1 v_c^2 + b_1 v_c + c_1 i_L + d_1)$ with $$a_0 = -\frac{p_{11}}{\hat{R}c} \quad a_1 = -\frac{p_{11}}{\hat{R}c}$$

$$b_0 = \frac{p_{11}v_c^*}{\hat{R}c} + \frac{p_{22}\hat{i}_L^*}{L} \quad b_1 = \frac{p_{11}v_c^*}{\hat{R}c}$$

$$c_0 = -\frac{p_{11}v_c^*}{c} + \frac{p_{22}\hat{E}}{L} \quad c_1 = \frac{p_{22}\hat{E}}{L}$$

$$d_0 = -\frac{p_{22}\hat{i}_L^*\hat{E}}{L} \quad d_1 = -\frac{p_{22}\hat{i}_L^*\hat{E}}{L}$$

and $$K_0 = k_0 \frac{2p_{11}}{\hat{R}c}, K_1 = k_1 \frac{2p_{11}}{\hat{R}c},$$

where $k_0, k_1 \in (0,1)$ are design parameters that ensure $K_0, K_1 \in (0, 2p_{11}/(\hat{R}c))$.

Given $(t,j) \mapsto x(t,j)$ and $(t,j) \mapsto \hat{\theta}(t,j)$, each solution q to $\mathcal{H}_1$ maintains a constant switch state until $x(t,j)$ intersects with the $\rho$ level-set of $\tilde{\gamma}_q$, at which point the value of q is toggled.

Note that the jump set $D_1$ below 12) has been modified compared to the model in [12]. In particular, the conditions $\tilde{\gamma}_0(x, \hat{\theta}) = \rho$ and $\tilde{\gamma}_1(x, \hat{\theta}) = \rho$ in 12 are instead $\tilde{\gamma}_0(x, \hat{\theta}) \geq \rho$ and $\tilde{\gamma}_1(x, \hat{\theta}) \geq \rho$, respectively. This change ensures completeness of maximal solutions for the closed-loop uniting control algorithm discussed in section 4.4

To ensure that Assumption 4.2 is satisfied for the closed-loop global controller, we define the set $$\Pi := \{x \in X_P : v_c > 0, i_L > 0\}$$

Then, we establish the following lemma regarding the excitation properties of solutions to the boost converter.

Lemma 4.4. Given a compact set $\Delta \subset \Pi \times \{0,1\}$ with $\Pi$ as in 14, every maximal solution $t \mapsto x(t)$ to $\mathcal{H}_P$ with input t $\mapsto q(t)$ with rge $(x, q) \subset \Delta$ satisfies Assumption 4.2.

Proof. This proof is in Appendix C.

Appendix D establishes that every maximal solution to the closed-loop global controller is complete. Next, we establish the following proposition that states the stability properties of closed-loop global controller.

Proposition 4.5. Consider the interconnection of the plant $\mathcal{H}_P$ in (2) with c, L, R, E>0, global controller $\mathcal{H}_1$ in (12) with $k_0$, $k_1 \in (0,1)$ and $\rho > 0$, and parameter estimator $\mathcal{H}_E$ in (8) with $$K(x, q) = k + \frac{1}{4} f_2(x, q) \Omega f_2^T(x, q),$$

where $$k > \frac{1}{4} I$$

and $\Omega = \Omega^\intercal > 0$. Given a desired set-point voltage $v_c^* > E$ and a compact set $\Delta \subset \Pi \times \chi_1 \times \chi_E$, with $\Pi$ as in [14], that is forward invariant for the interconnection, there exists $\mu > 0$ in (8) such that, for each maximal solution $\phi = (x, z_1, z_E)$ to the interconnection with $\phi(0,0) \in \Delta$, there exists a hybrid time $(t',j') \in \text{dom } \phi$ such that $\phi(t,j) \in \Pi \times \chi_1 \times \mathcal{A}_E$ for all $(t,j) \in \text{dom } \phi$ satisfying $t+j \geq t'+j'$, with $\mathcal{A}_E$ as in (10). Furthermore, there exists $\beta \in \mathcal{KL}$ such that, for each compact set $Y \subset \mathbb{R}^2$ and each $v > 0$, there exists $\rho^* > 0$ guaranteeing the following property: for each $\rho \in (0, \rho^*]$ defining $C_1$ and $D_1$ in (12), the x component of each solution $\phi = (x, z_1, z_E)$ to the interconnection with $\phi(0,0) \in Y \times \chi_1 \times \mathcal{A}_E$ is such that, for all $(t,j) \in \text{dom } \phi$, $$|x(t, j)|_{\mathcal{A}_P} \leq \beta(|x(0,0)|_{\mathcal{A}_P}, t + j) + v$$

Proof. This proof is in Appendix E

In words, Proposition 4.5 states that, for each maximal solution to the closed-loop system resulting with the global controller from $\Delta$, the parameter estimate $\hat{\theta}$converges to $\theta$ in finite time. Then, following convergence of $\hat{\theta}$, solutions satisfy the practical $\mathcal{KL}$ stability condition in [15].

b. Local Control Algorithm

In this section, the local control algorithm for the uniting control framework is described. Recall from Section 3 that we desire to maintain PWM behavior near the setpoint. Assuming the converter operates only in the continuous conduction mode, we design the PWM controller by averaging the converter dynamics as in [18]. The average system for the steady-state converter is $$\dot{x} = A_0(\hat{\theta})x + B_0(\hat{\theta}) + d(x, \theta)(A_1(\hat{\theta}) - A_0(\hat{\theta}))x$$

where d represents the PWM duty cycle, which is to be designed, and $$A_0(\hat{\theta}) := \begin{bmatrix} -\frac{1}{\hat{R}c} & \frac{1}{c} \\ -\frac{1}{L} & 0 \end{bmatrix}, A_1(\hat{\theta}) := \begin{bmatrix} -\frac{1}{\hat{R}c} & 0 \\ 0 & 0 \end{bmatrix}, B_0(\hat{\theta}) := \begin{bmatrix} 0 \\ \frac{\hat{E}}{L} \end{bmatrix}$$

Next, we linearize (16) about $x^*(\hat{\theta})$ (see [3, 19] for details) and denote the region of the state-space where the linearization holds as $\mathcal{L} \subset \mathbb{R}^2$. Expressing the linearized average model in error coordinates yields $$\dot{\tilde{x}} = A_{avg}(\hat{\theta})\tilde{x} + B_{avg}(\hat{\theta})\tilde{d}(x, \theta) \text{ where} \qquad (17)$$

$$\tilde{x} := x - x^*(\hat{\theta}) \text{ and } \tilde{d}(x, \hat{\theta}) := d(x, \hat{\theta}) - d^*(\hat{\theta}), \text{ with}$$

$$d^*(\hat{\theta}) := 1 - \hat{E}/v_c^*$$

being the steady-state duty cycle for the linearized average model, and $$A_{avg}(\hat{\theta}) := \begin{bmatrix} -\dfrac{1}{\hat{R}c} & \dfrac{\hat{E}}{v_c^* c} \\ -\dfrac{\hat{E}}{v_c^* L} & 0 \end{bmatrix}, B_{avg}(\hat{\theta}) := \begin{bmatrix} -\dfrac{v_c^{*2}}{\hat{R}\hat{E}c} \\ \dfrac{v_c^*}{L} \end{bmatrix}$$

Since the pair $(A_{avg}, B_{avg})$ is controllable for all $\hat{R}, \hat{E} > 0$, we apply a full state-feedback controller of the form $$\tilde{d}(x, \hat{\theta}) = -\tilde{K}(\hat{\theta})\tilde{x}$$

yielding the closed-loop dynamics $$\dot{\tilde{x}} = A_{cl}(\hat{\theta})\tilde{x}$$

where, for each $$\hat{\theta} \in \mathbb{R}_{>0}^2,$$

$\tilde{K}$ is chosen so that the matrix $A_{cl}(\hat{\theta}) := A_{avg}(\hat{\theta}) - B_{avg}(\hat{\theta})\tilde{K}(\hat{\theta})$ is Hurwitz. Then, the PWM duty cycle is computed as $$d(x, \hat{\theta}) := \psi(d^*(\hat{\theta}) - \tilde{K}(\hat{\theta})\tilde{x})$$

where $\psi(s) := \min\{\max\{0, s\}, 1\}$ is a saturation function.

Then, we define the hybrid system $\mathcal{H}_0$ with state $z_0 := (q, \tau) \in \chi_0 := \{0,1\} \times [0,1]$, inputs $x \in \chi_P$ and $$\hat{\theta} \in \mathbb{R}_{>0}^2,$$

and dynamics $$\dot{z}_0 = F_0(z_0) \quad (x, z_0, \hat{\theta}) \in C_0$$

$$z_0^+ = G_0(z_0) \quad (x, z_0, \hat{\theta}) \in D_0$$

$$\kappa_0(x, z_0, \hat{\theta}) := q \text{ where}$$

$$F_0(z_0) := \begin{bmatrix} 0 \\ 1/\varepsilon \end{bmatrix}$$

$$G_0(z_0) := \begin{cases} \begin{bmatrix} 0 \\ \tau \end{bmatrix} & \text{if } (x, z_0, \hat{\theta}) = D_0^0 \\ \begin{bmatrix} 1 \\ 0 \end{bmatrix} & \text{if } (x, z_0, \hat{\theta}) = D_0^1 \end{cases}$$

with $C_0 := \chi_P \times \chi_0 \times \mathbb{R}_{>0}^2$ and $D_0 := D_0^0 \cup D_0^1$, where $$D_0^0 := \{(x, z_0, \hat{\theta}) \in \chi_P \times \chi_0 \times \mathbb{R}_{>0}^2 : \tau = d(x, \hat{\theta}), q = 1\}$$

$$D_0^1 := \{(x, z_0, \hat{\theta}) \in \chi_P \times \chi_0 \times \mathbb{R}_{>0}^2 : \tau = 1\}$$

and $\varepsilon > 0$ is a design parameter representing the PWM period.

For each solution $(q, \tau)$ to $\mathcal{H}_0$, the state component $\tau$ represents a timer that counts with a rate of $1/\varepsilon$, and resets to zero each time $\tau = 1$. The state component $q$ is a square wave representing the PWM signal that determines the converter switch state.

To ensure validity of the linearization in (17), and that the converter operates only in the continuous conduction mode under the local controller, we define the set $$\chi_{\mathcal{L}} := \mathcal{L} \cap \prod.$$

Then, since the matrix $A_{cl}(\hat{\theta})$ in (19) is Hurwitz for each $\hat{\theta}$, there exists an open set $$^3 \mathcal{B}_{\mathcal{A}_P} \subset \chi_{\mathcal{L}}$$

containing a neighborhood of $\mathcal{A}_P$ that is forward invariant for [19]. The set $$\mathcal{B}_{\mathcal{A}_P}$$

is the basin of attraction for [19 14, Definition 7.3].

Appendix F establishes that every maximal solution to the closed-loop local controller is complete. Next, we establish the following proposition that states the stability properties of the closed-loop local controller.

Proposition 4.6. Consider the interconnection of the plant $\mathcal{H}_P$ in (2) with c, L, R, E > 0, local controller $\mathcal{H}_0$ in (21) with $\varepsilon > 0$, and parameter estimator $\mathcal{H}_E$ with $$K(x, q) = k + \frac{1}{4} f_2(x, q)\Omega f_2^T(x, q),$$

where $$k > \frac{1}{4} I$$

and $\Omega = \Omega^\tau > 0$. Given a desired set-point voltage $$v_c^* > E$$

and a compact set $\Delta \subset \Pi \times \chi_0 \times \chi_E$, with $\Pi$ as in (14), that is forward invariant for the interconnection, there exists $\mu > 0$ in (8) such that, for each maximal solution $\phi = (x, z_0, z_E)$ to the interconnection with $\phi(0,0) \in \Delta$, there exists a hybrid time $(t',j') \in \text{dom } \phi$ such that $\phi(t,j) \in \Pi \times \chi_0 \times \mathcal{A}_E$ for all $(t,j) \in \text{dom } \phi$ satisfying $t+j \geq t'+j'$, with $\mathcal{A}_E$ as n (10). Furthermore, there exists $\beta \in \mathcal{K}\mathcal{L}$ such that, for each compact set $$Y \subset \mathcal{B}_{\mathcal{A}_P}$$

and each v>0, there exists ε*>0 guaranteeing the following property: for each $\varepsilon \in (0, \varepsilon^*]$ defining $F_0$ in (21), the x component of each solution $\phi=(x, z_0, z_E)$ to the interconnection with $\phi(0,0)\in Y\times\chi_0\times\mathcal{A}_E$ is such that, for all (t,j) $\in$ dom $\phi$, $$|x(t, j)|_{\mathcal{A}_P} \leq \beta(|x(0, 0)|_{\mathcal{A}_P}, t + j) + v$$

Proof. This proof is in Appendix G c. Uniting Control Algorithm

To implement the uniting control framework, the supervisor logic outlined in Section 3 is applied to the interconnection of the boost converter plant $\mathcal{H}_P$ using the global and local control algorithms $\mathcal{H}_1$ and $\mathcal{H}_0$, respectively. Recall that $z_0$ is the state of $\mathcal{H}_0$, $z_1$ is the state of $\mathcal{H}_1$, and the output $\kappa$ of the selected controller is mapped to the input q of $\mathcal{H}_P$. Then, we define the. hybrid system $\mathcal{H}_U$ with state $$z_U = (x, z_0, z_1, p) \in \mathcal{X}_U := \mathcal{X}_P \times \mathcal{X}_0 \times \mathcal{X}_1 \times \{0, 1\} \text{ input } \hat{\theta} \in \mathbb{R}^2_{>0},$$

and dynamics $$\dot{z}_U \in F_U(z_U, \hat{\theta}) \quad (z_U, \hat{\theta}) \in C_U \quad (23)$$

$$z_U^+ = G_U(z_U) \quad (z_U, \hat{\theta}) \in D_U.$$

The logic variable $p\in\{0,1\}$ is set to 0 when the global controller is selected and to 1 when the local controller is selected. The flow map $F_U$ is equal to $(F_P, F_0, 0,0)$ when p=0 and to $(F_P, 0, F_1, 0)$ when p=1. It is written concisely as $$F_U(z_U, \hat{\theta}) := \begin{bmatrix} F_P(x, \kappa_p(x, z_p, \hat{\theta})) \\ (1 - p)F_0(z_0) \\ pF_1(z_1) \\ 0 \end{bmatrix}$$

The flow set $C_U$ is $$C_U := \{(z_U, \hat{\theta}) \in \mathcal{X}_U \times \mathbb{R}^2_{>0} : (x, k_p(x, z_p, \hat{\theta})) \in C_P$$
$$(x, z_0, \hat{\theta}) \in C_0, (x, z_1, \hat{\theta}) \in C_1,$$
$$(x, p) \in (\overline{\mathcal{M}}\times\{0\}) \cup (\overline{\mathbb{R}^n\backslash\mathcal{N}}\times\{1\})\}$$

where the sets $\mathcal{N}$ and $\mathcal{M}$ are to be designed.

The jump map $G_U$ permits jumps by $G_0$ when p=0 and by $G_1$ when p=1, and toggles the value of p based on the converter state x in relation to the sets $\mathcal{N}$ and $\mathcal{M}$. This is expressed as $$G_U(z_U) := \begin{cases} G^0(z_U) & (z_U, \hat{\theta}) \in D^0\backslash D^2 \\ G^1(z_U) & (z_U, \hat{\theta}) \in D^1\backslash D^2 \\ G^2(z_U) & (z_U, \hat{\theta}) \in D^2\backslash(D^0 \cup D^1) \text{ where} \\ \{G^0(z_U), G^2(z_U)\} & (z_U, \hat{\theta}) \in D^0 \cap D^1 \\ \{G^1(z_U), G^2(z_U)\} & (z_U, \hat{\theta}) \in D^1 \cap D^2 \end{cases}$$

-continued $$G^0(z_U): = (x, G_0(z_0), z_1, p)$$
$$G^1(z_U): = (x, z_0, G_1, (z_1), p) \text{ and the jump set is } D_U: =$$
$$G^2(z_U): = (x, z_0, z_1, 1 - p)$$

$$D^0 \cup D^1 \cup D^2 \text{ with}$$

$$D^0: = \{(z_U, \hat{\theta}) \in \mathcal{X}_U \times \mathbb{R}^2_{>0} : (x, z_0, \hat{\theta}) \in D_0, p = 0\}$$

$$D^1: = \{(z_U, \hat{\theta}) \in \mathcal{X}_U \times \mathbb{R}^2_{>0} : (x, z_1, \hat{\theta}) \in D_1, p = 1\}$$

$$D^2: = \{(z_U, \hat{\theta}) \in \mathcal{X}_U \times \mathbb{R}^2_{>0} :$$

$$(x, p) \in (\overline{\mathbb{R}^n\backslash\mathcal{M}}\times\{0\}) \cup (\mathcal{N} \times \{1\})\}$$

The jump maps associated with the sets $D^0\cap D^2$ and $D^1\cap D^2$ are necessary to satisfy outer semicontinuity of G in Definition 2.1.

Finally, we interconnect the uniting control algorithm $\mathcal{H}_U$ in (23) and the estimation algorithm $\mathcal{H}_E$ in (8) to obtain a hybrid system, denoted by $\mathcal{H}$, with state $\xi:=(z_U, z_E)\in\chi:=\chi_U\times\chi_E$ and dynamics $$\dot{\xi} \in F(\xi) \quad \xi \in C \quad (24)$$

$$\xi^+ = G(\xi) \quad \xi \in D$$

with $$F(\xi) := (F_U(z_U, \hat{\theta}), F_E(x, \kappa_p, z_E))$$

$$C := \{\xi \in \mathcal{X} : (z_U, \hat{\theta}) \in C_U, (x, \kappa_p, z_E) \in C_E\}$$

$$G(\xi) := \begin{cases} (G_U(z_U), z_E) & \text{if } (z_U, \hat{\theta}) \in D_U, (x, \kappa_p, z_E) \notin D_E \\ (z_U, G_E(z_E)) & \text{if } (z_U, \hat{\theta}) \notin D_U, (x, \kappa_p, z_E) \in D_E \\ (G_U(z_U), G_E(z_E)) & \text{if } (z_U, \hat{\theta}) \in D_U, (x, \kappa_p, z_E) \in D_E \\ D & := \{\xi \in \mathcal{X} : (z_U, \hat{\theta}) \in D_U \text{ or } (x, \kappa_p, z_E) \in D_E\} \end{cases}$$

where we have omitted the arguments of $\kappa_P$ for readability. Next we will design the uniting control sets $\mathcal{N}$ and $\mathcal{M}$.

5. Section Uniting Control Sets

Any sets $\mathcal{N}$ and $\mathcal{M}$ that satisfy Assumption 3.1 are acceptable for the uniting control framework in (23). We provide one example of how these sets can be designed for the boost converter. We define the closed set $\mathcal{N}$ as $$\mathcal{N}: = x^*(\hat{\theta}) + r_N \mathbb{B}$$

where $r\mathcal{N} \in \mathbb{R}_{>0}$ is chosen such that $$\mathcal{N} \subset \mathcal{B}_{\mathcal{A}_P}.$$

Then, we choose $\rho$ in (12) such that each maximal solution to the closed-loop global controller converges to $\mathcal{N}$. Note that since $\mathcal{N}$ is centered on the set-point x*, it depends on the parameter estimate $\hat{\theta}$. The choice of a ball for $\mathcal{N}$ is arbitrary and was done for simplicity.

The reachable set from $\mathcal{N}$ may be computed, for example, via Poisson analysis as in [20]. However, since this technique is computationally intensive for real-time implementation, we approximate $\mathcal{M}$ using the linearized model (19). A rigorous analysis of this approximation is beyond the scope of the paper. Using the Lyapunov function $$\tilde{V}(\tilde{x}): = \tilde{x}^\top P \tilde{x},$$

where $P = P^\top > 0$ solves $A_{c1}^\top(\hat{\theta})P + PA_{c1}(\hat{\theta}) = -Q$ and $Q = Q^\top > 0$, we choose a parameter $r_0 \in \mathbb{R}_{>0}$ such that $L_{\tilde{V}}(r_0) \supset \mathcal{N}$. Then, solutions to 19) from $\mathcal{N}$ remain inside $\tilde{\mathcal{M}} := L_{\tilde{V}}(r_0)$ To bound the trajectories of the closed-loop local controller, points on the boundary of $\tilde{\mathcal{M}}$ are parameterized in a grid such that the variation in the vector field $F_P$ between adjacent points is small. We compute the finite-time reachable set from each point on the boundary of $\tilde{\mathcal{M}}$ by integrating $F_P$ for $\varepsilon$ seconds for each $q \in \{0,1\}$. Then, $\mathcal{M}$ is defined as $$\mathcal{M} := \text{int}(L_{\tilde{V}}(r\mathcal{M})) \qquad (26)$$

where $r\mathcal{M} \in \mathbb{R}_{>0}$ is chosen such that $\mathcal{M}$ bounds the set reachable in $\varepsilon$ seconds from $\tilde{\mathcal{M}}$ for each switch state $q \in \{0,1\}$, as shown in FIG. 3A. Finally, we choose the matrix function $\tilde{K}$ in 18) and the parameter $\varepsilon > 0$ in (21) so that $\mathcal{M} \subset \chi_L$

6. Section Results

6.1 Completion of Hybrid System

The following results establish that each solution to the hybrid system $\mathcal{H}$ is complete.

Proposition 5.1. The hybrid system $\mathcal{H}$ in (24) satisfies the Hybrid Basic Conditions in Definition 2.1.

Proof. The flow map F satisfies (A2) of Definition 2.1 due to being the stack of $F_P$, $F_0$, $F_1$, $\{0\}$, and $F_E$, where $F_P$, $F_1$, $F_0$, and $F_E$ satisfy (A2) from Propositions D.1 and F.1. The jump map G satisfies (A3) of Definition 2.1 by construction since $G_1$, $G_0$, and $G_E$ satisfy (A3) from Propositions D.1 and F.1. Due to $C_P$, $C_0$, $C_1$, and $C_E$ being closed from Propositions D.1 and F.1, the flow set C is closed and, with the closedness of N, the jump set D is closed and (A1) of Definition 2.1 is satisfied. Then, $\mathcal{H}$ satisfies the hybrid basic conditions.

Proposition 5.2. (Properties of solutions) Given the hybrid system $\mathcal{H}$ as in (24), for each $\zeta \in C \cup D$, every maximal solution $\xi$ to $\mathcal{H}$ with $\xi(0,0) = \zeta$ is complete.

Proof. Proceeding by contradiction, suppose there exists a maximal solution $\xi$ to $\mathcal{H}$ with $\xi(0,0) \in C \cup D$ that is not complete. Let $(T,J) = \text{supdom } \xi$ and note that since $\xi$ is not complete, $T + J < \infty$. From Definition 2.1, either item (b) or item (c) therein must hold.

By Proposition D.2, maximal solutions to the interconnection of $\mathcal{H}_P$, $\mathcal{H}_1$ and $\mathcal{H}_E$ are bounded and complete. Similarly, by Proposition F.2, maximal solutions to the interconnection of $\mathcal{H}_P$, $\mathcal{H}_0$, and $\mathcal{H}_E$ are bounded and complete. Then, due to the fact that the flow map for the solution component p is globally Lipschitz, item (b) in Definition 2.1 does not hold.

Item (c) is ruled out using Definition 2.1. In fact, let $\xi \in D$. If p=0, we distinguish between the following cases:

1 If $(z_U, \hat{\theta}) \in D^2 \backslash D^2$ and $(x, \kappa_0, z_E) \notin D_E$, then $(x, z_0, \hat{\theta}) \in D_0$. Since $G_0(D_0) \subset C_0 \cup D_0$ by Proposition F.2, it follows that $G(\xi) \subset C \cup D$.

2 If $(z_U, \hat{\theta}) \in D^2 \backslash D^0$ and $(x, \kappa_0, z_E) \notin D_E$, then $x \in \mathcal{N}$. Since $G(\xi) = (x, z_0, z_1, 1, z_E)$ and, by the properties of $\mathcal{M}$ and $\mathcal{N}$ in Assumption 3.1. the set $\mathcal{N}$ is strictly contained in $\mathcal{M}$, it follows that $$x \in \overline{\mathbb{R}^2 \backslash N}$$

and $G(\xi) \subset C \cup D$

3 If $(x, \kappa_0, z_E) \in D_E$ and $(z_U, \hat{\theta}) \notin D^0 \cup D^2$, then $G_E(x, z_E) = (x, Q^{-1}\Gamma,0,0,0,0)$, and thus $(x, \kappa_0, G(x, z_E)) \in C_E$. Hence, $G(\xi) \subset C \cup D$.

4 If I. $(z_U, \hat{\theta}) \in D^2 \backslash D^2$ and $(x, \kappa_0, z_E) \in D_E$, II. $(z_U, \hat{\theta}) \in D^2 \backslash D^0$ and $(x, \kappa_0, z_E) \in D_E$, III. $(z_U, \hat{\theta}) \in D^0 \cap D^2$ and $(x, \kappa_0, z_E) \notin D_E$, IV. $(z_U, \hat{\theta}) \in D^0 \cap D^2$ and $(x, \kappa_0, z_E) \in D_E$, by the arguments of items 1, 2, and 3 of this list, it follows that $G(\xi) \subset C \cup D$.

Similarly, If p=1, we distinguish between the following cases: 1. If $(z_U, \hat{\theta}) \in D^1 \backslash D^2$ and $(x, \kappa_1, z_E) \notin D_E$, then $(x, z_1, \hat{\theta}) \in D_1$. Since $G_1(D_1) \subset C_1 \cup D_1$ by Proposition D.2 it follows that $G(\xi) \subset C \cup D$.

If $(z_U, \hat{\theta}) \in D^2 \backslash D^1$ and $(x, \kappa_1, z_E) \notin D_E$, then $x \in \mathcal{N}$. Since $G(\xi) = (x, z_0, z_1, 0, z_E)$ and, by the properties of $\mathcal{M}$ and $\mathcal{N}$ in in Assumption 3.1, the set $\mathcal{N}$ is strictly contained in $\mathcal{M}$, it follows that $x \in \mathcal{M}$ and $G(\xi) \subset C \cup D$ If $(x, \kappa_1, z_E) \in D_E$ and $(z_U, \hat{\theta}) \notin D^1 \cup D^2$, then $G_E(x, z_E) = (x, Q^{-1}\Gamma, 0,0,0,0)$, and thus $(x, \kappa_1, G(x, z_E)) \in C_E$. Hence, $G(\xi) \subset C \cup D$.

If I. $(z_U, \hat{\theta}) \in D^1 \backslash D^2$ and $(x, \kappa_1, z_E) \in D_E$, II. $(Z_U, \hat{\theta}) \in D^2 \backslash D^1$ and $(x, \kappa_1, z_E) \in D_E$, III. $(z_U, \hat{\theta}) \in D^1 \cap D^2$ and $(x, \kappa_1, z_E) \notin D_E$, IV. $(Z_U, \hat{\theta}) \in D^1 \cap D^2$ and $(x, \kappa_1, z_E) \in D_E$, by the arguments of items 1, 2, and 3 of this list, it follows that $G(\xi) \subset C \cup D$. Then, it follows that $G(D) \subset C \cup D$.

By the arguments above, we conclude that cases (b) and (c) of Definition 2.1 do not hold, and thus only case (a) is true. Therefore, by Definition 2.1. every maximal solution to $\mathcal{H}$ is complete. This completes the proof.

Finally, we establish the following theorem that states the stability properties of the interconnection of $\mathcal{H}$ and $\mathcal{H}_g$.

Theorem 5.3. Consider the hybrid system $\mathcal{H}$ in (24) with c, L, R, E>0, $k_0$, $k_1 \in (0,1)$, $\rho > 0, \varepsilon > 0$, and $$K(x, q) = k + \frac{1}{4} f_2(x, q)\Omega f_2^\top(x, q),$$

where $$k > \frac{1}{4}I$$

and $\Omega = \Omega^\top > 0$. Given a desired set-point voltage $$v_c^* > E,$$

uniting control sets $\mathcal{N}$ and $\mathcal{M}$ satisfying Assumption 3.1, and a compact set $\Delta \subset \Pi \times \chi_0 \times \chi_1 \times \{0,1\} \times \chi_E$, with $\Pi$ as in 14, that is forward invariant for $\mathcal{H}$, there exists $\mu > 0$ in (8) such that, for each maximal solution $\phi=(x, z_0, z_1, p, z_E)$ to $\mathcal{H}$ with $\phi(0,0) \in \Delta$, there exists a hybrid time $(t',j') \in \text{dom } \phi$ such that $\phi(t,j) \in \Pi \times \chi_0 \times \chi_1 \times \{0,1\} \times \mathcal{A}_E$ for all $(t,j) \in \text{dom } \phi$ satisfying $t+j \geq t'+j'$, with $\mathcal{A}_E$ as in 100. Furthermore, there exists $\beta \in \mathcal{KL}$ such that, for each compact set $Y \subset \mathbb{R}^2$ and each $v>0$, there exist $\rho^*, \varepsilon^*>0$ guaranteeing the following property: for each $\rho \in (0, \rho^*]$ defining $C_1$ and $D_1$ in (12) and each $\varepsilon \in (0, \varepsilon^*]$ defining $F_0$ in (21), the x component of each solution $\phi$ to $\mathcal{H}$ with $\phi(0,0) \in Y \times \chi_0 \times \chi_1 \times \{0,1\} \times \mathcal{A}_E$ is such that $$|x(t, j)|_{\mathcal{A}_P} \leq \beta(|x(0, 0)|_{\mathcal{A}_P}, t+j) + v$$

for all $(t,j) \in \text{dom } \phi$), and such solutions exhibit no more than two toggles in the value of the solution component p. Proof. For each maximal solution $\phi=(z_U, z_E)$ to $\mathcal{H}$ with $\phi(0,0) \in \Delta$, the existence of a hybrid time $(t',j') \in \text{dom } \phi$ such that $\phi(t,j) \in \Pi \times \chi_0 \times \chi_1 \times \{0,1\} \times \mathcal{A}_E$ for all $(t,j) \in \text{dom } \phi$ satisfying $t+j \geq t'+j'$ follows from Propositions 4.5 and 4.6.

To show that each solution $\phi$ to $\mathcal{H}$ with $\phi(0,0) \in Y \times \chi_0 \times \chi_1 \times \{0,1\} \times \mathcal{A}_E$ exhibits no more than two jumps in the state component p, pick a solution $\phi$ and note that $\phi(0,0) \in C \cup D$. Only the following three cases are possible:

If p=1 and $(z_U(0,0), \hat{\theta}(0,0)) \in D^2 \backslash (C_U U \cup D^1)$, the solution jumps, resetting p to 0, and then evolves in $(C \cup D^0) \backslash D^2$ for all future hybrid time in its domain by construction of $\mathcal{N}$ and $\mathcal{M}$.

If p=1 and $(z_U(0,0), \hat{\theta}(0,0)) \in (C_U \cup D^1) \backslash D^2$, the solution $\phi$ reaches $D^2$ in finite hybrid time by Proposition 4.5. After the jump at $D^2$, the solution $\phi$ evolves in $(C \cup D^0) \backslash D^2$ for all future hybrid time in its domain by construction of $\mathcal{N}$ and $\mathcal{M}$.

If p=0 and $(z_U(0,0), \hat{\theta}(0,0)) \in D^2 \backslash (C_U \cup D^0)$, the solution jumps, resetting p to 1. For such new value, maximal solutions have the property in the first bullet of this list.

If p=0 and $(z_U(0,0), \hat{\theta}(0,0)) \in (C_U \cup D^0) \backslash D^2$, then the following to cases are possible for the solution $\phi$.

a) If $x(0,0) \in \mathcal{N}$, then by construction of $\mathcal{N}$ and $\mathcal{M}$ the solution evolves with p=0, $x \in \mathcal{M}$ for all future hybrid time in its domain.

b) If $x(0,0) \in \mathcal{M} \backslash \mathcal{N}$ then $\phi$ either evolves per item a) of this list, or reach the boundary of $\mathcal{M}$, triggering a jump and resetting p to 1. For such new value, maximal solutions have the property in the first bullet of this list.

Then, each maximal solution $\phi$ with $\phi(0,0) \in Y \times \chi_0 \times \chi_1 \times \{0,1\} \times \mathcal{A}_E$ has at most two toggles in the value of the solution component p

6.2. Simulation Results

The following describes simulation results the hybrid system $\mathcal{H}$. Simulations are performed with $$c = 0.1 \; F, L = 0.2 \; H, P = \begin{bmatrix} c/2 & 0 \\ 0 & L/2 \end{bmatrix},$$

$\varepsilon=0.0001$, $\rho=0.001$, $\rho=0.001$. The set $\mathcal{N}$ in (25) is defined with $r\mathcal{N} =0.05v_c^*$, and a grid of 10 points is used to compute $\mathcal{M}$ in (26) from $\tilde{\mathcal{M}}$. Simulations are performed using the Hybrid Equations Toolbox [21].

6.2.1 Simulating the Closed-Loop System

Simulation results for $\mathcal{H}$ with $\hat{R}(0,0)=R=3$ and $\hat{E}(0,0)=E=5$ are shown in FIGS. 3B and 3C (Code at https://github.com/HybridSystemsLab/UnitingBoost, which is incorporated by reference herein) for two separate initial conditions: x(0,0)=(5,0) and x(0,0)=(3,6). In both cases, the plant state converges to a neighborhood of $\mathcal{A}_P=(7,3.27)$ in accordance with Theorem 5.3.

6.2.2. Simulation Results with Parameter Uncertainty

Next, $\mathcal{H}$ is simulated with uncertainty in the parameters R and E. Initial conditions are x(0,0)=(3,6), $\hat{R}(0,0)=3$, and $\hat{E}(0,0)=5$. The parameters R and E are initially equal to 3.6 and 6, respectively. Then, E changes to 4 at t=3 seconds, and R changes to 2.4 at t=5 seconds. The parameter estimate converges to the true value at 0.5 seconds, as shown in FIG. 3D (Code at https://github.com/HybridSystemsLab/UnitingBoost, which is incorporated by reference herein) The estimate converges again after E changes at t=3, and after R changes at t=5. The plant state converges to a neighborhood of $\mathcal{L}_P$ following each convergence of the parameter estimate to the true value, in accordance with Theorem 5.3.

A Proof of Lemma 4.1

For all $t \in \text{dom } (x, q)$ such that q(t)=0 and $x(t) \in \overline{M_1} \backslash \overline{M_3}$ or q(t)=1 and $x(t) \in \tilde{\mathcal{M}}_1$, the result follows trivially from (3) and the definition of $f_1$ and $f_2$ below (4). For all $t \in \text{dom } (x, q)$ such that q(t)=0 and $x(t) \in \overline{M_3}$, the result follows by contradiction. Suppose that there exists a maximal solution to $\mathcal{H}_P$ that satisfies $i_L(t)<0$ when q(t)=0, $x(t) \in \overline{M_3}$. Such solutions would flow out of $C_P$ and terminate and therefore not be maximal, leading to a contradiction. Hence, we conclude that every maximal solution to $\mathcal{H}_P$ satisfies $i_L(t)=0$ for all t such that q(t)=0, $x(t) \in \overline{M_3}$.

B Proof of Proposition 4.3

To show that, for each maximal solution $\phi=(x, q, z_E)$ to the interconnection satisfying rge $(x, q) \subset \Lambda$, there exists a time $(t',j') \in \text{dom } \phi$ such that $\phi(t, j) \in \Lambda \times \mathcal{A}_E$ for all $(t,j) \in \text{dom } \phi$ satisfying $t+j \geq t'+j'$, we first define the set $$\mathcal{R}_1 := \Lambda \times \mathcal{A}_E$$

Then, the proof of stability of $\mathcal{R}_1$ for the interconnection of $\mathcal{H}_P$ and $\mathcal{H}_E$ similarly to 22, Proposition 4.4]. In particular, since Assumption 4.2 is satisfied, there exist $\rho>0$ such that the Q component of each solution $\phi$ to the interconnection satisfies $$Q(t^*, 0) = \int_0^{t^*} \omega(t, 0)^\top \omega(t, 0)dt + Q(0, 0)$$

$$\geq \int_0^{t^*} \omega(t, 0)^\top \omega(t, 0)dt \geq \varrho I$$

for some $t^* \in I^0 := \{t:(t, 0) \in \text{dom } \phi\}$. Then, using 17, Lemma 2], it follows that $$\det(Q(t^*,0)) \geq \det(\rho I) \geq \mu$$

with $\mu=\rho^P$. Therefore, $\phi(t^*, 0) \in D_E$ and it follows that the set $$\mathcal{R}_0 := \{\phi \in \Lambda \times \chi_E : \omega=0, Q=0, \eta=0, \Gamma=0\}$$

is finite-time attractive for the interconnection.

Next, let $\zeta \in \mathcal{R}_0$ and consider a solution $\phi=(x, q, z_E)$ to the interconnection with $\phi(0,0)=\zeta$. Due to the dynamics of Q, $\phi$ also reaches the jump set in finite-time. In particular $\phi(t_1, 0) \in D_E$. At the jump, according to the jump map, we have from (6) that $\hat{\vartheta}(t_1, 0)=\vartheta$. Furthermore, according to the jump map $G_E$, we have $x(t_1, 1)=\hat{x}(t_1, 1)$ and $\eta(t_1, 1)=0$. Thus, the set $\mathcal{R}_1$ is finite-time attractive from $\mathcal{R}_0$ for the interconnection.

Next, we show that the set $\mathcal{R}_1$ is stable—that is, for each $\varepsilon>0$, there exists $\delta>0$ such that for each maximal solution $\phi$ to the interconnection with $|\phi(0,0)|\mathcal{R}_1$, $\leq\delta$, the following holds:

$$|\phi(t, j)|_{\mathcal{R}_1} \leq \varepsilon \forall (t, j) \in \mathrm{dom}\ \phi$$

Note that there exists $\delta$ since the set $\mathcal{R}_0$ is finite-time attractive for the interconnection, hence solutions components $\omega$, Q, $\eta$, $\Gamma$ do not have finite-time escape behavior. In fact, the inequality (30) can be checked by computing the finite-time reachable set from initial conditions that belong to the $\delta$-ball of the set $\mathcal{R}_1$.

Now, omitting the solution arguments for simplicity, denote $e=x-\hat{x}$ and $\tilde{\vartheta}=\vartheta-\hat{\vartheta}$, and consider the function $$V(\phi) := \frac{1}{2}\left(e^\top e + \vartheta^\top \Omega^{-1}\vartheta + \eta^\top \eta\right),$$

where $\Omega=\Omega_\tau>0$. Then, for almost all $(t,j)\in \mathrm{dom}\ \phi$ such that $j\geq1$, $$\dot{V}(\phi) \leq -e^\top ke - \eta^\top\left(k - \frac{1}{4}I\right)\eta \leq 0$$

where we have used the property $\eta=e-\omega\tilde{\vartheta}$, that holds after the first jump, and $$K = k + \frac{1}{4}f_2\Omega f_2^\top$$

with $$k > \frac{1}{4}I.$$

Moreover, for each $(t,j)\in \mathrm{dom}\ \phi$ such that $(t,j+1)\in \mathrm{dom}\ \phi$ $$V(\phi(t,j+1))-V(\phi(t,j))=-V(\phi(t,j))\leq0$$

Then, under the conditions in the statement, by integration using the inequalities in (31) and (32), we obtain $V(\phi(t,j)) \leq V(\phi)(t_1, 1))\leq V(\phi(t_1, 0))$ for all $(t,j)\in \mathrm{dom}\ \phi$ satisfying $t+j\geq t_1+1$, where $(t_1, 0)\in \mathrm{dom}\ \phi$ is such that $(t_1, 1)\in \mathrm{dom}\ \phi$. Then, using the definition of V, we conclude that $$|\phi(t, j)|_{\mathcal{R}_1} \leq |\phi(t_1, 1)|_{\mathcal{R}_1} \leq |\phi(t_1, 0)|_{\mathcal{R}_1}$$

for all $(t, j)\in \mathrm{dom}\ \phi$ satisfying $t+j\geq t_1+1$. Therefore, the set $\mathcal{R}_1$ is stable for the interconnection.

Next, we recall [22, Proposition 3.21] below.

Proposition B.1. Consider a hybrid system $\mathcal{H}=(C, F, D, G)$ on $\mathbb{R}^2$ and closed sets $$\mathcal{R}_0, \mathcal{R}_1, \ldots, \mathcal{R}_{k^*} \subset \mathbb{R}^n, k^* \in \mathbb{N}.$$

Suppose that 1. the set $\mathcal{R}_0$ is finite-time attractive for $\mathcal{H}$ with settling-time function $$\mathcal{T}_0:\mathcal{N}_0 \to \mathbb{R}_{\geq 0}, \mathcal{N}_0 \subset \mathbb{R}^n$$

open and such that $\overline{C}\cup D \subset \mathcal{N}_0$ and for any $$\phi \in \mathcal{S}_{\mathcal{H}}\ \text{with}\ \phi(0, 0) = \zeta, \sup_{(t,j)\in \mathrm{dom}\ \phi}(t, j) > \mathcal{T}_0(\zeta).$$

1. the set R0 is finite-time attractive for H with settling-time function T0:N0→R≥0, N0 ⊂ Rn open and such that C∪D⊂N0 and for any $\phi\in$SH with $\phi$(0, 0)=$\zeta$, sup(t,j)∈dom $\phi$(t, j)>T0($\zeta$).
2. for each i∈{1,2, . . . , k*}, $\mathcal{R}_i$ is finite-time attractive from $\mathcal{R}_{i-1}$ with the settling-time function $$\mathcal{T}_i:\mathcal{N}_i \to \mathbb{R}_{\geq 0}, \mathcal{N}_i \subset \mathbb{R}^2$$

open and such that $\overline{C}\cup D \subset \mathcal{N}_i$ and for any $$\phi \in \mathcal{S}_{\mathcal{H}(\mathcal{R}_{i-1})}\ \text{with}\ \phi(0, 0) = \zeta, \sup_{(t,j)\in \mathrm{dom}\ \phi}(t, j) > \mathcal{T}_i(\zeta)$$

Then, the set $\mathcal{R}_{k^*}$ is finite-time attractive.

Thus, since the set $\mathcal{R}_0$ is finite-time attractive for the interconnection, by applying Proposition B.1 with k*=1, the set $\mathcal{R}_1$ is finite-time stable for the interconnection. Hence, there exists $(t',j')\in \mathrm{dom}\ \phi$ such that $\phi(t,j)\in \mathcal{R}_1$ for all $(t,j) \in \mathrm{dom}\ \phi$ satisfying $t+j\geq t'+j'$. This completes the proof.

C. Proof of Lemma 4.4

Since the set $\Delta\subset\Pi\times\chi_1$ is compact, there exists $\delta>0$ such that, for each maximal solution $t\mapsto x(t)$ to $\mathcal{H}_P$, with input $t\mapsto q(t)$ satisfying $\mathrm{rge}\ (x, q)\subset\Delta$, $v_c(t)\geq\delta$ for all $t\in \mathrm{dom}\ (x, q)$. Furthermore, from the set $\Pi$ in (14), we have that each such maximal solution satisfies $x(t)\in (\overline{M}_1\backslash\overline{M}_3)\cup\tilde{M}_1$ for all $t\in \mathrm{dom}\ (x, q)$. Then, from the expression of $f_2$ below (4), for all $t\in \mathrm{dom}\ (x, q)$ such that $[t, t+\alpha]\subset \mathrm{dom}\ (x, q)$, $\alpha>0$, and $$b = a\min\left\{\frac{\delta^2}{c^2}, \frac{1}{L^2}\right\},$$

we have $$\int_{\tilde{t}}^{\tilde{t}+a} f_2(x(s), q(s))^\top f_2(x(s), q(s))ds =$$

$$\int_{\tilde{t}}^{\tilde{t}+a}\begin{bmatrix} \frac{v_c^2(s)}{c^2} & 0 \\ 0 & \frac{1}{L^2} \end{bmatrix}ds \geq a\begin{bmatrix} \frac{\delta^2}{c^2} & 0 \\ 0 & \frac{1}{L^2} \end{bmatrix} \geq bI$$

Hence, Assumption 4.2 holds.

D. Well-Posedness of the Closed-Loop Global Control Algorithm

To establish well-posedness of the closed-loop global control algorithm, we express the interconnection of $\mathcal{H}_P$, $\mathcal{H}_1$, and $\mathcal{H}_E$ as a hybrid system with state $\xi_1:=(x, z_1, z_E)\in\chi_P\times\chi_1\times\chi_E$ and dynamics $$\dot{\xi}_1 \in \mathcal{F}_1(\xi_1) \quad \xi_1 \in C_1$$
$$\xi_1^+ = \mathcal{G}_1(\xi_1) \quad \xi_1 \in \mathcal{D}_1$$

with $$\mathcal{F}_1(\xi_1) := (F_P(x, \kappa_1), F_1(z_1), F_E(x, \kappa_1, z_E))$$

$$C_1 := \{\xi_1 \in \mathcal{X}_P \times \mathcal{X}_1 \times \mathcal{X}_E : (x, \kappa_1) \in C_P, (x, z_1, \hat{\theta}) \in C_1(x, \kappa_1, z_E) \in C_E\}$$

$$\mathcal{G}_1(\xi_1) := \begin{cases} (x, G_1(z_1), z_E) & \text{if } (x, z_1, \hat{\theta}) \in D_1, (x, \kappa_1, z_E) \notin D_E \\ (x, z_1, G_E(z_E)) & \text{if } (x, z_1, \hat{\theta}) \notin D_1, (x, \kappa_1, z_E) \in D_E \\ (x, G_1(z_1), G_E(z_E)) & \text{if } (x, z_1, \hat{\theta}) \in D_1, (x, \kappa_1, z_E) \in D_E \end{cases}$$

$$\mathcal{D}_1 := \{\xi_1 \in \mathcal{X}_P \times \mathcal{X}_1 \times \mathcal{X}_E : (x, z_1, \hat{\theta}) \in D_1 \text{ or } (x, \kappa_1, z_E) \in D_E\}$$

where we have omitted the arguments of $\kappa_1$ for readability. Then, the following result establishes that the hybrid system (33) satisfies the hybrid basic conditions.

Proposition D.1. The hybrid system in (33) satisfies the Hybrid Basic Conditions in Definition 2.1.

Proof. Item (A1) of Definition 2.1 follows from the closedness of $\tilde{M}_0$ and $\tilde{M}_1$ and the closedness of $C_1$, $D_1$, $C_E$, and $D_E$. Item (A2) follows from the Krasovskii regularization in (3) and the fact that $F_1$ and $F_E$ are single-valued and continuous and the graph of $\kappa_1$ is closed. Item (A3) follows from the fact that $G_1$ and $G_E$ are continuous.

Next, the following result establishes that each solution to the hybrid system (33) is complete.

Proposition D.2. (Properties of solutions) Consider the hybrid system in (33). For each $\zeta \in C_1 \cup \mathcal{D}_1$, each maximal solution $\xi_1$ to 33 with $\xi_1(0,0)=\zeta$ is complete.

Proof. To show completeness of maximal solutions for the interconnection as in Definition 2.1, we first check the viability condition (VC), which requires verifying that for each $\xi_1 \in C_1 \backslash \mathcal{D}_1$, there exists a neighborhood $\mathcal{U}$ of $\xi_1$ such that $$\mathcal{F}_1(\xi_1) \cap T_{C_1}(\xi_1) \neq \emptyset \forall \xi_1 \in C_1 \backslash \mathcal{D}_1$$

To do so, we first compute the tangent cones $T_{C_1}(\xi_1)$ for the set $C_1$. For $\xi_1 \in C_1 \backslash \mathcal{D}_1$

- $\kappa_1 = 0, i_L > 0 : T_{C_1}(\xi_1) = \mathbb{R}^2 \times \{0\} \times \mathcal{X}_E$:
- $\kappa_1 = 0, i_L = 0 : T_{C_1}(\xi_1) = \mathbb{R} \times \mathbb{R}_{\geq 0} \times \{0\} \times \mathcal{X}_E$:
- $\kappa_1 = 1, v_c > 0 : T_{C_1}(\xi_1) = \mathbb{R}^2 \times \{0\} \times \mathcal{X}_E$:
- $\kappa_1 = 1, v_c = 0 : T_{C_1}(\xi_1) = \mathbb{R}_{\geq 0} \times \mathbb{R} \times \{0\} \times \mathcal{X}_E$:

Using these calculations, we have the following:
1 For $\xi_1 \in C_1 \backslash \mathcal{D}_1$ such that $\kappa_1=0$, $i_L>0$, (34) trivially holds.

2 For $\xi_1 \in C_1 \backslash \mathcal{D}_1$ such that $\kappa_1=0$, $i_L=0$, we have to distinguish two cases based on different set-valued vector fields in (2) depending if $x \in \overline{M_1}\backslash\overline{M_3}$ (i.e. $v_c<E$) or $x \in \overline{M_3}$ (i.e. $v_c \geq E$).

a) If $x \in \overline{M_1}\backslash\overline{M_3}$ and thus $v_c<E$, we have the vector field $$\left\{-\frac{1}{Rc}v_c\right\} \times \left\{-\frac{1}{L}v_c + \frac{E}{L}\right\} \times \{0\} \times \{F_E(x, 0, z_E)\} \in T_{C_1}(\xi_1)$$

$$\text{because} - \frac{1}{L}v_c + \frac{E}{L} > 0$$

b) If $x \in \overline{M_3}$ and thus $v_c \geq E$, we have the set-valued vector field $$\left\{-\frac{1}{Rc}v_c\right\} \times \left[-\frac{1}{L}v_c + \frac{E}{L}, 0\right] \times \{0\} \times \{F_E(x, 0, z_E)\}$$

Since $$\left(-\frac{1}{Rc}v_c, 0, 0, F_E(x, 0, z_E)\right)$$

is an element of the set above and also lies in $$T_{C_1}(\xi_1), \tag{34}$$

holds.

3 For $\xi_1 \in C_1 \backslash \mathcal{D}_1$ such that $\kappa_1=1$, $v_c>0$, 34 trivially holds.

4. For $\xi_1 \in C_1 \backslash \mathcal{D}_1$ such that $\kappa_1=1$, $v_c=0$, we have the vector field $$\{0\} \times \left\{\frac{E}{L}\right\} \times \{0\} \times \{F_E(x, 1, z_E)\} \in T_{C_1}(\xi_1)$$

because $\{0\} \in \mathbb{R}_{\geq 0}$.

In summary, for each $\xi_1 \in C_1 \backslash \mathcal{D}_1$, there exists a neighborhood $\mathcal{U}$ of $\xi_1$ such that (34) holds. Thus, according to Definition 2.1, there exists a nontrivial solution $\xi_1$ to (33) for points in $C_1 \cup \mathcal{D}_1$.

Now, to show that every maximal solution $\xi_1$ to (33) is complete, we prove that cases (b) and (c) in Definition 2.1 cannot hold, and hence, only case (a) can be true.

Case (c) (solutions jumping outside $C_1 \cup \mathcal{D}_1$) cannot hold because below we will show that $\mathcal{G}_1(\mathcal{D}_1) \subset C_1 \cup \mathcal{D}_1$. We distinguish between three cases: I. $(x, z_1, \hat{\theta}) \in D_1$ and q=0, II. $(x, z_1, \hat{\theta}) \in D_1$ and q=1, and III. $(x, \kappa_1, z_E) \in D_E$.

I. Let $\xi_1 \in \mathcal{D}_1$ such that $(x, z_1, \hat{\theta}) \in D_1$ and q=0, and thus $x \in \tilde{M}_0$ (i.e. $i_L \geq 0$) and $\tilde{\gamma}_0(x, \hat{\theta}) \geq \rho$. Since $G_1(z_1)=1$ and $\hat{R}$, $\hat{E}>0$, from the proof of [12, Proposition IV.2] we have that $x \in \tilde{M}_1$, $\tilde{\gamma}_1(x, \hat{\theta}) \leq \rho$, and it follows that $(x, z_1, \hat{\theta}) \in C_1$. Hence, $\mathcal{G}_1(\xi_1) \in C_1$.

II. Let $\xi_1 \in \mathcal{D}_1$ such that $(\xi_1, \hat{\theta}) \in D_1$ and q=1, and thus $x \in \tilde{M}_1$ (i.e. $v_c \geq 0$) and $\tilde{\gamma}_1(x, \hat{\theta}) \geq \rho$. Since $G_1(z_1)=0$ and $\hat{R}$, $\hat{E}>0$, from the proof of 12, Proposition IV.2] we have that $x \in \tilde{M}_0$, $\tilde{\gamma}_0(x, \hat{\theta}) \leq \rho$, and it follows that $(x, z_1, \hat{\theta}) \in C_1$. Hence, $\mathcal{G}_1(\xi_1) \in C_1$.

III. Let $\xi_1 \in \mathcal{D}_1$ such that $(x, \kappa_1, z_E) \in D_E$, and thus det $(Q) \geq \mu$. Since $G_E(x, z_E)=(x, Q^{-1}\Gamma, 0,0,0,0)$, it follows that $G_E(x, \kappa_1, z_E) \in C_E$ and thus $\mathcal{G}_1(\xi_1) \in C_1$.

Case (b) (finite escape time) can be excluded by contradiction. Suppose that there exists a maximal solution $\xi_1$ to (33) with $\xi_1(0,0) \in C_1 \cup D_1$ that is not complete. Let $(T,J) = \text{supdom } \xi_1$ and note that since $\xi_1$ is not complete, $T+J < \infty$. By definition of solution, if $(T,J) \in \text{dom } \xi_1$ then $(T,J) \in C_1 \cup D_1$. Then, we distinguish between two cases: $\xi_1(T,J) \in D_1$ and $\xi_1(T,J) \in C_1 \backslash D_1$ 1 If $\xi_1(T,J) \in D_1$, then $\xi_1$ may be extended by jumping since $G_1(D_1) \in C_1 \cup D_1$ from the first bullet of this list.

2 2) If $\xi_1(T,J) \in C_1 \backslash D_1$, note that the flow map $\mathcal{F}_1$ is the stack of $F_P$ in (2), $F_1$ in (12), and $F_E$ in (8). Since $F_1$ is globally Lipschitz and $F_P$, $F_E$ are locally bounded, solutions will not escape in finite time due to evolution via $\mathcal{F}_1$, and $\xi_1$ can be extended via flow. Therefore, case (b) of Definition 2.1 does not hold.

By the arguments above, we conclude that cases (b) and (c) of Definition 2.1 do not hold, and thus only case (a) is true. Therefore, by Definition 2.1, every maximal solution to the interconnection of $\mathcal{H}_P$, $\mathcal{H}_1$, and $\mathcal{H}_E$ is complete. This completes the proof.

E Proof of Proposition 4.5

Proof. To show that, for each maximal solution $\phi = (x, z_1, z_E)$ to the interconnection with $\phi(0,0) \in \Delta$, there exists a time $(t',j') \in \text{dom } \phi$ such that $\phi(t',j') \in \chi_P \times \chi_1 \times \mathcal{A}_E$, we first rule out discrete solutions for the interconnection. Since $\rho > 0$ in (12) and the flow map $\mathcal{F}_1$ in (33) is locally bounded by Proposition D.2, there exists a uniformly finite (nonzero) separation between the flow and jump sets. Hence, for each maximal solution to the interconnection, there exists an interval of flow with length greater than zero between any two consecutive jumps.

Then, since the set $\Delta$ is forward invariant for the interconnection, we have from Lemma 4.4 that each maximal solution $\phi$ to the interconnection with $\phi(0,0) \in \Delta$ satisfies Assumption 4.2 and, from Proposition 4.3, we conclude that there exists $(t',j') \in \text{dom } \phi$ such that $\phi(t,j) \in \Pi \times \chi_1 \times \mathcal{A}_E$ for all $(t,j) \in \text{dom } \phi$ satisfying $t+j \geq t'+j'$.

Finally, given $Y \subset \mathbb{R}^2$, for each solution $\phi$ to the interconnection with $\phi(0,0) \in Y \times \chi_1 \times \mathcal{A}_E$, the stability result follows similarly to the proof of [12, Theorem IV.7].

F Well-Posedness of the Closed-Loop Local Control Algorithm

To establish well-posedness of the closed-loop local control algorithm, we express the interconnection of $\mathcal{H}_P$, $\mathcal{H}_0$, and $\mathcal{H}_E$ as a hybrid system with state $\xi_0 := (x, z_0, z_E) \in \chi_P \times \chi_0 \times \chi_E$ and dynamics $$\dot{\xi}_0 \in \mathcal{F}_0(\xi_0) \quad \xi_0 \in C_0$$

$$\xi_0^+ = \mathcal{G}_0(\xi_0) \quad \xi_0 \in D_0$$

with $$\mathcal{F}_0(\xi_0) := (F_P(x, \kappa_0), F_0(z_0), F_E(x, \kappa_0, z_E))$$

$$C_0 := \left\{ \xi_0 \in \chi_P \times \chi_0 \times \chi_E : (x, \kappa_0) \in C_P, (x, z_0, \hat{\theta}) \in C_0, (x, \kappa_0, z_E) \in C_E \right\}$$

$$\mathcal{G}_0(\xi_0) := \begin{cases} (x, G_0(z_0), z_E) & \text{if } (x, z_0, \hat{\theta}) \in D_0, (x, \kappa_0, z_E) \notin D_E \\ (x, z_0, G_E(z_E)) & \text{if } (x, z_0, \hat{\theta}) \notin D_0, (x, \kappa_0, z_E) \in D_E \\ (x, G_0(z_0), G_E(z_E)) & \text{if } (x, z_0, \hat{\theta}) \in D_0, (x, \kappa_0, z_E) \in D_E \end{cases}$$

$$D_0 := \left\{ \xi_0 \in \chi_P \times \chi_0 \times \chi_E : (x, z_0, \hat{\theta}) \in D_0 \text{ or } (x, \kappa_0, z_E) \in D_E \right\}$$

where we have omitted the arguments of $\kappa_0$ for readability.

Then, the following result establishes that the hybrid system (35) satisfies the hybrid basic conditions.

Proposition F.1. The hybrid system in (35) that results from the interconnection of $\mathcal{H}_P$ and $\mathcal{H}_0$ satisfies the Hybrid Basic Conditions in Definition 2.1.

Proof. Item (A1) of Definition 2.1 follows from the closedness of $\tilde{M}_0$ and $\tilde{M}_1$ and the closedness of $C_0$ and $D_0$. Item (A2) follows from the Krasovskii regularization in (3) and the fact that $F_0$ and $F_E$ are single-valued and continuous and the graph of $\kappa_0$ is closed. Item (A3) follows from the fact that $G_0$ and $G_E$ are continuous.

Next, the following result establishes that each solution to the hybrid system (35) is complete.

Proposition F.2. (Properties of solutions) Consider the hybrid system in (35) that results from the interconnection of $\mathcal{H}_P$ and $\mathcal{H}_0$. For each $\xi \in C_0 \cup D_0$, every maximal solution $\xi_{i_0}$ to the interconnection with $\xi_0(0,0) = \xi$ is complete. Proof. To show completeness of maximal solutions for the interconnection as in Definition 2.1, we first check the viability condition (VC), which requires verifying that for each $\xi_0 \in C_0 \backslash D_0$, there exists a neighborhood $U$ of $\xi_0$ such that $$\mathcal{F}_0(\xi_0) \cap T_{C_0}(\xi_0) \neq \emptyset \forall \xi_0 \in C_0 \backslash D_0$$

To do so, we first compute the tangent cones $T C_0(\xi_0)$ for the set $C_0$. For $\xi_0 \in C_0 \backslash D_0$

- $k_0 = 0, i_L > 0, \tau > 0: T_{C_0}(\xi_0) = \mathbb{R}^2 \times \mathbb{R} \times \{0\} \times \chi_E$
- $k_0 = 0, i_L > 0, \tau = 0: T_{C_0}(\xi_0) = \mathbb{R}^2 \times \mathbb{R}_{\geq 0} \times \{0\} \times \chi_E$
- $k_0 = 0, i_L = 0, \tau > 0: T_{C_0}(\xi_0) = \mathbb{R} \times \mathbb{R}_{\geq 0} \times \mathbb{R} \times \{0\} \times \chi_E$
- $k_0 = 0, i_L = 0, \tau = 0: T_{C_0}(\xi_0) = \mathbb{R} \times \mathbb{R}_{\geq 0} \times \mathbb{R}_{\geq 0} \times \{0\} \times \chi_E$
- $k_0 = 1, v_c > 0, \tau > 0: T_{C_0}(\xi_0) = \mathbb{R}^2 \times \mathbb{R} \times \{0\} \times \chi_E$
- $k_0 = 1, v_c > 0, \tau = 0: T_{C_0}(\xi_0) = \mathbb{R}^2 \times \mathbb{R}_{\geq 0} \times \{0\} \times \chi_E$
- $k_0 = 1, v_c = 0, \tau > 0: T_{C_0}(\xi_0) = \mathbb{R}_{\geq 0} \times \mathbb{R} \times \mathbb{R} \times \{0\} \times \chi_E$
- $k_0 = 1, v_c = 0, \tau = 0: T_{C_0}(\xi_0) = \mathbb{R}_{\geq 0} \times \mathbb{R} \times \mathbb{R}_{\geq 0} \times \{0\} \times \chi_E$ Using these calculations, we have the following:

1 For $\xi_0 \in C_0 \backslash D_0$ such that $\kappa_0 = 0, i_L > 0, \tau > 0$, (36) trivially holds.

2 For $\xi_0 \in C_0 \backslash D_0$ such that $\kappa_0 = 0, i_L > 0, \tau = 0$, we have the vector field $$F_P(x, 0) \times \left\{ \frac{1}{\varepsilon} \right\} \times \{0\} \times \{F_E(x, 0, z_E)\} \in T_{C_0}(\xi_0)$$

because $\varepsilon > 0$

3 For $\xi_0 \in C_0 \backslash D_0$ such that $\kappa_0 = 0, i_L = 0, \tau > 0$, we distinguish between two cases based on different set-valued vector fields in (2) depending if $x \in \overline{M_1} \backslash \overline{M_3}$ (i.e. $v_c < E$) or $x \in \overline{M_3}$ (i.e. $v_c \geq E$). a) If $x \in \overline{M_1} \backslash \overline{M_3}$ and thus $v_c < E$, we have the vector field $$\left\{ -\frac{1}{Rc} v_c \right\} \times \left\{ -\frac{1}{L} v_c + \frac{E}{L} \right\} \times \left\{ \frac{1}{\varepsilon} \right\} \times \{0\} \times \{F_E(x, 0, z_E)\} \in T_{C_0}(\xi_0)$$

because $-\frac{1}{L} v_c + \frac{E}{L} > 0$.

b) If $x \in \overline{M_3}$ and thus $v_c \geq E$, we have the set-valued vector field

US 12,633,829 B2

51 52

$$\left\{-\frac{1}{Rc}v_c\right\}\times\left[-\frac{1}{L}v_c+\frac{E}{L},0\right]\times\left\{\frac{1}{\varepsilon}\right\}\times\{0\}\times\{F_E(x,0,z_E)\}.$$

Since $$\left(-\frac{1}{Rc}v_c,0,\frac{1}{\varepsilon},0,F_E(x,0,z_E)\right)$$

is an element of the set above and also lies in $T\mathcal{C}_0(\xi_0)$, (36) holds.

4 For $\xi_0 \in \mathcal{C}_0\backslash\mathcal{D}_0$ such that $\kappa_0=_0$, $i_L=0$, $\tau=0$, (36) holds by the arguments in items 2 and 3 of this list.

5 For $\xi_0 \in \mathcal{C}_0\backslash\mathcal{D}_0$ such that $\kappa_0=1$, $v_c>0$, $\tau>0$, (36) trivially holds.

6 For $\xi_0 \in \mathcal{C}_0\backslash\mathcal{D}_0$ such that $\kappa_0=1$, $v_c>0$, $\tau=0$, we have the vector field $$F_P(x,1)\times\left\{\frac{1}{\varepsilon}\right\}\times\{0\}\times\{F_E(x,1,z_E)\}\in T_{C_0}(\xi_0)$$

because $\varepsilon>0$.

7 For $\xi_0 \in \mathcal{C}_0\backslash\mathcal{D}_0$ such that $\kappa_0=1$, $v_c=0$, $\tau>0$, we have the vector field $$\{0\}\times\left\{\frac{E}{L}\right\}\times\left\{\frac{1}{\varepsilon}\right\}\times\{0\}\times\{F_E(x,1,z_E)\}\in T_{C_0}(\xi_0)$$

because $\{0\}\in\mathbb{R}_{\geq0}$.

8 For $\xi_0\in\mathcal{C}_0\backslash\mathcal{D}_0$ such that $\kappa_0=1$, $v_c=0$, $\tau=0$, 36 holds by the arguments in items 6 and 7 of this list.

In summary, for each $\xi_0\in\mathcal{C}_0\backslash\mathcal{D}_0$, there exists a neighborhood $\mathcal{U}$ of $\xi_0$ such that (36) holds. Thus, according to Definition 2.1, there exists a nontrivial solution $\xi_0$ to 35 for points in $\mathcal{C}_0\cup\mathcal{D}_0$.

Now, to show that every maximal solution $\xi_0$ to (35) is complete, we prove that cases (b) and (c) in Definition 2.1 cannot hold, and hence, only case (a) can be true.—Case (c) (solutions jumping outside $\mathcal{C}_0\cup\mathcal{D}_0$) cannot hold because below we will show that $\mathcal{G}_0(\mathcal{D}_0)\subset\mathcal{C}_0\cup\mathcal{D}_0$. Let $\xi_0\in\mathcal{D}_0$. We distinguish between two cases: I. $(x,z_0,\hat{\theta})\in D_0$ and $\tau=d(x,\hat{\theta})$, II. $(x,z_0,\hat{\theta})\in D_0$ and $\tau=1$, and III. $(x,\kappa_0,z_E)\in D_E$ I. If $\xi_0\in\mathcal{D}_0$ such that $(x,z_0,\hat{\theta})\in D_0$ and $\tau=d(x,\hat{\theta})$, then $\xi_0$ may be extended by jumping since $G_0(z_0)=(0,\tau)$ and thus $(x,G_0(z_0),\hat{\theta})\in\mathcal{C}_0$. Hence, $\mathcal{G}_0(\xi_0)\in\mathcal{C}_0$.

II. If $\xi_0\in\mathcal{D}_0$ such that $(x,z_0,\hat{\theta})\in D_0$ and $\tau=1$, then $\xi_0$ may be extended by jumping since $G_0(z_0)=(1,0)$ and thus $(x,G_0(z_0),\hat{\theta})\in C_0$. Hence, $\mathcal{G}_0(\xi_0)\in\mathcal{C}_0$.

III. Let $\xi_0\in\mathcal{D}_0$ such that $(x,\kappa_0,z_E)\in D_E$, and thus det $(Q)\geq\mu$. Since $G_E(x,z_E)=(x,Q_{-1}\Gamma,0,0,0,0)$, it follows that $G_E(x,\kappa_0,z_E)\in C_E$ and thus $\mathcal{G}_0(\xi_0)\in\mathcal{C}_0$.

Case (b) (finite escape time) can be excluded by contradiction. Suppose that there exists a maximal solution $\xi_0$ to 35) with $\xi_0(0,0)\in\mathcal{C}_0\cup\mathcal{D}_0$ that is not complete. Let $(T,J)=\text{supdom }\xi_0$ and note that since $\xi_0$ is not complete, $T+J<\infty$. By definition of solution, if $(T,J)\in\text{dom }\xi_0$ then $(T,J)\in\mathcal{C}_0\cup\mathcal{D}_0$. Then, we distinguish between two cases: $\xi_0(T,J)\in\mathcal{D}_0$ and $\xi_0(T,J)\in\mathcal{C}_0\backslash\mathcal{D}_0$ 1 If $\xi_0(T,J)\in\mathcal{D}_0$, then $\xi_0$ may be extended by jumping since $\mathcal{G}_0(\mathcal{D}_0)\in\mathcal{C}_0\cup\mathcal{D}_0$ from the first bullet of this list.

2 If $\xi_0(T,J)\in\mathcal{C}_0\backslash\mathcal{D}_0$, note that the flow map $\mathcal{F}_0$ is the stack of $F_P$ in (2), $F_0$ in (21) and $F_E$ in (8). Since $F_0$ is globally Lipschitz and $F_P$, $F_E$ are locally bounded, solutions will not escape in finitetime due to evolution via $\mathcal{F}_0$, and $\xi_0$ can be extended via flow. Therefore, case (b) of Definition 2.1 does not hold.

By the arguments above, we conclude that cases (b) and (c) of Definition 2.1 do not hold, and thus only case (a) is true. Therefore, by Definition 2.1. every maximal solution to the interconnection of $\mathcal{H}_P$, $\mathcal{H}_0$, and $\mathcal{H}_E$ is complete. This completes the proof.

G Proof of Proposition 4.6

Proof. To show that, for each maximal solution $\phi=(x,z_0,z_E)$ to the interconnection with $\phi(0,0)\in\Delta$, there exists a time $(t',j')\in\text{dom }\phi$ such that $\phi(t',j')\in\Pi\times\chi_1\times\mathcal{A}_E$, we first rule out discrete solutions for the interconnection. Since $\varepsilon>0$ in (21) and the flow map $\mathcal{F}_0$ in (35) is locally bounded by Proposition F.2, there exists a uniformly finite (nonzero) separation between the flow and jump sets. Hence, for each maximal solution to the interconnection, there exists an interval of flow with length greater than zero between any two consecutive jumps.

Then, since the set $\Delta$ is forward invariant for the interconnection, we have from Lemma 4.4 that every maximal solution $\phi$ to the interconnection with $\phi(0,0)\in\Delta$ satisfies Assumption 4.2 and, from Proposition 4.3, we conclude that there exists $(t',j')\in\text{dom }\phi$ 5 such that $\phi(t,j)\in\Pi\times\chi_0\times\mathcal{A}_E$ for all $(t,j)\in\text{dom }\phi$ satisfying $t+j\geq t'+j'$.

Finally, given $Y\subset\mathcal{B}\mathcal{A}_P$, for each solution $\phi$ to the interconnection with $\phi(0,0)\in Y\times\chi_0\times\mathcal{A}_E$, the stability result is based on [18, Theorem 2]. We recall [18, Theorem 2] and the associated assumptions below for self containedness. Consider the time-varying hybrid system of the form $$\left.\begin{aligned}\dot{x}&=f_\varepsilon(x,\tau)\\\dot{\tau}&=1/\varepsilon\end{aligned}\right\}(x,\tau)\in C\times\mathbb{R}_{\geq0}$$

$$\left.\begin{aligned}x^+&=\mathcal{G}(x)\\\tau^+&=\mathcal{H}(x,\tau)\end{aligned}\right\}(x,\tau)\in\mathcal{D}\times\mathbb{R}_{\geq0}$$

where $\varepsilon$ is a small positive parameter, $C\subset\mathbb{R}^n$, $\mathcal{D}\subset\mathbb{R}^n$, $f_\varepsilon$: $C\times\mathbb{R}_{\geq0}\to\mathbb{R}^n$, $\mathcal{G}:\mathcal{D}\rightrightarrows\mathbb{R}^n$, and $\mathcal{H}:\mathcal{D}\times\mathbb{R}_{\geq0}\rightrightarrows\mathbb{R}_{\geq0}$. The following regularity conditions are imposed on the function $f_\varepsilon$.

Assumption G.1. The hybrid system (37) satisfies the hybrid basic conditions; for every $K\subset\mathbb{R}^n$ and $\delta>0$, there exists $M(K)$, $\varepsilon(K,\delta)>0$ such that $$|f_0(x,\tau)|\leq M$$

$$|f_\varepsilon(x,\tau)-f_0(x,\tau)|\leq\delta$$

where $f_0=f_\varepsilon|_{\varepsilon=0}$. Next, we introduce the notion of the average of the hybrid system (37). The following periodicity condition is imposed.

Assumption G.2. (Periodicity) For each $x\in C$, the function $f_0(x,\bullet)$: $\mathbb{R}_{\geq0}\to\mathbb{R}$ is periodic. That is, there exists a real number $T>0$ such that $$f_0(x,\tau+T)=f_0(x,\tau)\forall(x,\tau)\in C\times\mathbb{R}_{\geq0}$$

For each $(x, \tau) \in \mathcal{C} \times \mathbb{R}_{\geq 0}$, we define $$\mathcal{F}(x) := \frac{1}{T} \int_0^T f_0(x, s) ds$$

$$\sigma(x, \tau) := \int_0^\tau |f_0(x, s) - \mathcal{F}(x)| ds.$$

Note that the function $\sigma$ is periodic with period T and $\sigma(x, kT)=0$ for each non-negative integer k. Using F as defined in (38), we define the average system for the time-varying system (37) as $$\dot{x} = \mathcal{F}(x) \quad x \in C$$

$$x^+ = \mathcal{G}(x) \quad x \in \mathcal{D}$$

Then, the following regularity conditions are imposed on the functions $\mathcal{F}$ and $\sigma$.

Assumption G.3. (Regularity) The functions $\mathcal{F}: C \to \mathbb{R}^n$ in (39) and $\sigma: C \times \mathbb{R}_{>0} \to \mathbb{R}^n$ in (38 are continuous and, for each compact set $K \subset \mathbb{R}^n$, there exists $L(K)>0$ such that, for all $(x, t), (w, s) \in (K \cap \mathcal{C}) \times \mathbb{R}_{\geq 0}$, $$|\sigma(x,\tau)| \leq L$$

$$|\sigma(x,\tau)-\sigma(w,s)| \leq L(|x-w|+|t-s|)$$

Finally, we restate [18, Theorem 2] below.

Theorem G.4. Suppose the system (37) satisfies Assumptions G.1-G.3. and the compact set $\mathcal{A}^*$ is asymptotically stable with basin of attraction $\mathcal{B}$ for the system (39). Under these conditions, for each proper indicator $\omega$ for $\mathcal{A}^*$ on $\mathcal{B}$, there exists $\beta \in \mathcal{K}\mathcal{L}$ such that, for each compact set $K \subset \mathcal{B}$ and each $k>0$, there exists $\epsilon^*>0$ guaranteeing the following property: for each $\epsilon \in (0, \epsilon^*]$, each solution x to the time-varying hybrid system (37) with $x(0,0) \in \mathcal{B}$ satisfies $$\omega(x(t,j)) \leq \beta(\omega(x(0,0)),t+j)+k$$

for all $(t, j) \in \text{dom } x$.

Proof. See the proof of 18, Theorem 2].

Next, we apply the above results to the interconnection of $\mathcal{H}_P$, $\mathcal{H}_0$, and $\mathcal{H}_E$. Since the boost converter operates only in the continuous conduction mode for the local control algorithm, there are only two modes of operation for the converter system corresponding to the state of the switch $q \in \{0,1\}$, and the dynamics of the PWM implementation described in Section 4.3 may be expressed as $$\dot{x}=A_0x+B_0+\kappa_0(x,z_0,\hat{\theta})(A_1-A_0)x$$

with $\kappa_0$ as in (21) and $$A_0 := \begin{bmatrix} -\dfrac{1}{Rc} & \dfrac{1}{c} \\ -\dfrac{1}{L} & 0 \end{bmatrix}, \, A_1 := \begin{bmatrix} -\dfrac{1}{Rc} & 0 \\ 0 & 0 \end{bmatrix}, \, B_0 = B_1 := \begin{bmatrix} 0 \\ \dfrac{E}{L} \end{bmatrix}$$

Then, from 21 and 40, we may express the converter system in the form of (37) where $$f(x,\tau):=\tilde{f}_0(x)+g_0(x)\kappa_0(x,z_0,\hat{\theta})$$

with $$\tilde{f}_0(x)=A_0x+B \quad g_0(x)=(A_1-A_0)x$$

The closed-loop system with the PWM implementation takes the form of (37) where $f_\epsilon(\bullet,\bullet)=f_0(\bullet,\bullet)=f(\bullet,\bullet)$. Note that

(37) satisfies the hybrid basic conditions by Proposition F.1, and f locally Lipschitz, therefore Assumption G.1 holds. Additionally, since $\kappa_0$ in (21) is periodic in $\tau$, Assumption G.2 holds with T=1 Next, we compute $\mathcal{F}$ in (38) as $$\mathcal{F}(x) = \int_0^1 \left( \tilde{f}_0(x) + g_0\kappa_0(x, \tau, \hat{\theta}) \right) ds$$

$$= \int_0^{d(x,\hat{\theta})} \left( \tilde{f}_0(x) + g_0(x) \right) ds + \int_{d(x,\hat{\theta})}^1 g_0(x) ds \cdot$$

$$= \tilde{f}_0(x) + g_0(x)d(x, \hat{\theta})$$

The function $\sigma$ in 38 may be expressed for $\tau < d(x, \hat{\theta})$ as $$\sigma(x, \tau) = \int_0^\tau \left| \tilde{f}_0(x) + g_0(x) - \tilde{f}_0(x) - g_0(x)d(x, \hat{\theta}) \right| ds$$

$$= \int_0^\tau \left| g_0(x)(1 - d(x, \hat{\theta})) \right| ds$$

$$= g_0(x)(\tau - d(x, \hat{\theta})\tau)$$

and for $\tau \geq d(x, \hat{\theta})$ as $$\sigma(x, \tau) = \int_0^{d(x,\hat{\theta})} \left| \tilde{f}_0(x) + g_0(x) - \tilde{f}_0(x) - g_0(x)d(x, \hat{\theta}) \right| ds + $$

$$\int_{d(x,\hat{\theta})}^\tau \left| \tilde{f}_0(x) - \tilde{f}_0(x) - g_0(x)d(x, \hat{\theta}) \right| ds$$

$$= \int_0^{d(x,\hat{\theta})} \left| g_0(x)(1 - d(x, \hat{\theta})) \right| ds + \int_{d(x,\hat{\theta})}^\tau \left| -g_0(x)d(x, \hat{\theta}) \right| ds$$

$$= g_0(x)(d(x, \hat{\theta}) - d(x, \hat{\theta})\tau)$$

Then, for each $\tau \in [0,1)$, we have that $$\sigma(x,\tau)=g_0(x)(\min\{\tau,d(x,\hat{\theta})\}-d(x,\hat{\theta})\tau)$$

The function $\sigma$ is locally Lipschitz since $g_0$ and d are locally Lipschitz. Then, since $\sigma$ is periodic, Assumptions G.3 holds.

Finally, the average model (39) is written for the boost converter system with $\mathcal{F}$ as in 41), $\mathcal{G}(x)=x$, and $\mathcal{H}$ is arbitrary. The function d in 20 stabilizes (19) with basin of attraction $$\mathcal{B}_{\mathcal{A}_P} \subset \mathcal{X}_{\mathcal{L}}.$$

Then, given $$Y \subset \mathcal{B}_{\mathcal{A}_P},$$

by Theorem G.4 each solution $\phi$ to the interconnection with $\phi(0,0) \in Y \times \chi_1 \times \mathcal{A}_E$ satisfies (22).

REFERENCES

The following references are incorporated by reference herein.

[1] D. M. Bellur and M. K. Kazimierczuk, "DC-DC converters for electric vehicle applications," in 2007 Electrical Insulation Conference and Electrical Manufacturing Expo, 2007, pp. 286-293.

[2] A. Sciarretta et. al., "A control benchmark on the energy management of a plug-in hybrid electric vehicle," Control Engineering Practice, vol. 29, pp. 287-298,2014.

[3] J. Kassakian, M. Schlecht, and G. Verghese, Principles of Power Electronics, ser. Addison-Wesley series in electrical engineering. AddisonWesley, 1991.

[4] F. Vasca and L. Iannelli, Dynamics and Control of Switched Electronic Systems. Berlin, Germany: Advances in Industrial Control Series, Springer Verlag, 2012.

[5] M. Senesky, G. Eirea, and T. J. Koo, "Hybrid Modelling and Control of Power Electronics," in Hybrid Systems: Computation and Control, O. Maler and A. Pnueli, Eds. Berlin, Heidelberg: Springer Berlin Heidelberg, 2003, pp. 450-465.

[6]J. Buisson, P.-Y. Richard, and H. Cormerais, "On the Stabilisation of Switching Electrical Power Converters," in Hybrid Systems: Computation and Control, M. Morari and L. Thiele, Eds. Berlin, Heidelberg: Springer Berlin Heidelberg, 2005, pp. 184-197.

[7] T. Geyer, G. Papafotiou, and M. Morari, "On the Optimal Control of Switch-Mode DC-DC Converters," in Hybrid Systems: Computation and Control, R. Alur and G. J. Pappas, Eds. Berlin, Heidelberg: Springer Berlin Heidelberg, 2004, pp. 342-356.

[8] M. K. Camlibel, W. P. M. H. Heemels, A. J. van der Schaft, and J. M. Schumacher, "Switched networks and complementarity," IEEE Transactions on Circuits and Systems I: Fundamental Theory and Applications, vol. 50, no. 8, pp. 1036-1046, 2003.

[9]W. P. M. H. Heemels, M. K. amlibel, A. J. van der Schaft, and J. M. Schumacher, "Modelling, Well-Posedness, and Stability of Switched Electrical Networks," in Hybrid Systems: Computation and Control, O. Maler and A. Pnueli, Eds. Berlin, Heidelberg: Springer Berlin Heidelberg, 2003, pp. 249-266.

[10] R. Frasca, M. K. Camlibel, I. C. Goknar, L. Iannelli, and F. Vasca, "Linear passive networks with ideal switches: Consistent initial conditions and state discontinuities," IEEE Transactions on Circuits and Systems I: Regular Papers, vol. 57, no. 12, pp. 3138-3151, 2010.

[11] F. Vasca, L. Iannelli, M. K. Camlibel, and R. Frasca, "A new perspective for modeling power electronics converters: Complementarity framework," IEEE Transactions on Power Electronics, vol. 24, no. 2, pp. 456-468, 2009.

[12] T. A. F. Theunisse, J. Chai, R. G. Sanfelice, and M. Heemels, "Robust global stabilization of the DC-DC boost converter via hybrid control," IEEE Transactions on Circuits and Systems I, vol. 62, pp. 1052-1061, April 2015.

[13] A. R. Teel and N. Kapoor, "Uniting local and global controllers," in 1997 European Control Conference (ECC), 1997, pp. 3868-3873.

[14] R. Goebel, R. G. Sanfelice, and A. R. Teel, Hybrid Dynamical Systems: Modeling, Stability, and Robustness. New Jersey: Princeton University Press, 2012.

[15] R. Sanfelice, Hybrid Feedback Control. New Jersey: Princeton University Press, 2021.

[16] V. Adetola and M. Guay, "Finite-time parameter estimation in adaptive control of nonlinear systems," IEEE Transactions on Automatic Control, vol. 53, no. 3, pp. 807-811,2008.

[17] M. Hartman, N. Bauer, and A. R. Teel, "Robust finite-time parameter estimation using a hybrid systems framework," IEEE Transactions on Automatic Control, vol. 57, no. 11, pp. 2956-2962, 2012.

[18] A. R. Teel and D. Nešić, "Pwm hybrid control systems: averaging tools for analysis and design," in 2010 IEEE International Conference on Control Applications, 2010, pp. 1128-1133. [19]G. Escobar, R. Ortega, H. Sira-Ramirez, J. Vilain, and I. Zein, "An experimental comparison of several nonlinear controllers for power converters," IEEE Control Systems Magazine, vol. 19, no. 1, pp. 66-82, 1999.

[20] S. Almer, U. Jonsson, C. Kao, and J. Mari, "Stability analysis of a class of PWM systems," IEEE Transactions on Automatic Control, vol. 52, no. 6, pp. 1072-1078, 2007.

[21] R. G. Sanfelice, D. A. Copp, and P. Nanez, "A toolbox for simulation of hybrid systems in Matlab/Simulink: Hybrid Equations (HyEQ) Toolbox," in Proceedings of Hybrid Systems: Computation and Control Conference, 2013, p. 101-106.

[22]Y. Li and R. G. Sanfelice, "Finite time stability of sets for hybrid dynamical systems," Automatica, vol. 100, pp. 200-211, 022019.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The present disclosure includes Appendix A, the entire contents of which is incorporated herein for all purposes and is considered part of this disclosure. Further information on one or more embodiments can be found in Appendix A.

What is claimed is:

1. A boost converter, comprising:

a boost converter circuit comprising a switch comprising a switch state (open or closed), a capacitor, an inductor, and a diode;

a hybrid adaptive controller connected to the switch for applying a hybrid algorithm controlling the switch state when the hybrid algorithm is executed by the hybrid adaptive controller; wherein the hybrid adaptive controller further comprises:

a global controller:

determining a first switch state command (open or close) as a function of estimates of an input voltage and a load resistance received from a parameter estimator, a measurement of an output voltage across the capacitor, and a measurement of an inductor current passing through the inductor, and outputting the first switch state command to the switch to set the switch state causing the output voltage to converge to a desired output voltage, thereby raising the input voltage, inputted to the boost converter circuit, to the desired output voltage across the capacitor when a load comprising the load resistance is connected across the capacitor;

a local controller:

determining a second switch state command as a function of the estimates of the input voltage and the load resistance received from the parameter estimator, and the measurement of the output voltage and the measurement of the inductor current, and outputting the second switch state command to the switch to set the switch state maintaining the output voltage at or within a set range of the desired output voltage and maintaining the inductor current at or within a set range of a desired current, when the load is connected; and a supervisor determining whether to execute the global controller outputting the first switch state command, or the local controller outputting the second switch state command, depending on the measurement of the output voltage and the measurement of the inductor current.

2. The boost converter of claim 1, wherein the hybrid adaptive controller further comprises the parameter estimator.

3. The boost converter of claim 1, wherein the supervisor uses the output voltage and the inductor current as feedback to select:

the global controller outputting the first switch state command until the output voltage has converged to within a first voltage range of the desired output voltage and the inductor current has converged to within a first current range of the desired current, or the local controller to output the second switch state command so long as the desired output voltage is maintained within a second voltage range and the inductor current is maintained within a second current range.

4. The boost converter of claim 3, wherein:

the first voltage range and the first current range each comprise a first set of values N to which maximal solutions of the output voltage and the inductor current, respectively, converge in finite time in response to the first switch state command, and the second voltage range and the second current range each comprise a second set of values M to which the output voltage and the inductor current, respectively, remain in steady state in response to the second switch state command.

5. The boost converter of claim 4, wherein:

the hybrid algorithm comprises a parameter estimating algorithm initialized with at least one of an initial current or an initial voltage set to zero, so that the first set of values N have converged to the desired output voltage and/or desired current, for any value and polarity of the desired output voltage or the desired current.

6. The boost converter of claim 4, wherein the first set of values N comprises positive values of the output voltage across the capacitor and/or positive values of the current passing through the inductor.

7. The boost converter of claim 1, wherein:

the global controller induces asymptotic stability of the output voltage at the desired output voltage and the inductor current at the desired current, and the local controller maintains the output voltage at the desired output voltage and the inductor current at the desired current.

8. The boost converter of claim 1, wherein the hybrid adaptive controller comprises one or more processors and one or more applications or programs executed by the one or more processors execute the hybrid algorithm, wherein the hybrid algorithm comprises:

a parameter estimating algorithm, expressed using an estimator hybrid system, outputting the estimates of the load resistance and the input voltage in response to a parameter input comprising an initial input voltage;

a global control algorithm, expressed as a global controller hybrid system, outputting the first switch state command as a function of the output voltage and the inductor current;

a local control algorithm, expressed as a local controller hybrid system, outputting the second switch state command as a function of the output voltage and the inductor current; and a supervisor algorithm, expressed as a supervisor hybrid system, outputting:

a first state instructing the hybrid adaptive controller to output the first switch state command to the switch until the output voltage is within a first voltage range and the inductor current is within a first current range, at which point outputting a second state, or a second state instructing the hybrid adaptive controller to output the second switch state command so long as the output voltage is within a second voltage range and the inductor current is within a second current range.

9. The boost converter of claim 8, wherein the first state and the second state comprise logic states 0 or 1.

10. The boost converter of claim 8, wherein the one or more applications or programs obtain or create a representation of the estimator hybrid system, the global controller hybrid system, the local controller hybrid system, and the supervisor hybrid system and determine the switch state commands by processing, in the estimator hybrid system, the global controller hybrid system, the local controller hybrid system, and the supervisor hybrid system, state variables representing the switch state commands as a function of the output voltage and/or desired current.

11. The boost converter of claim 10, wherein the processing of the state variables comprises modifying the state variables via discrete jumps and continuous evolution in the estimator hybrid system, the global controller hybrid system, the local controller hybrid system, and the supervisor hybrid system.

12. The boost converter of claim 10, wherein the estimator hybrid system, the global controller hybrid system, the local controller hybrid system, and the supervisor hybrid system determine the switch state commands from the estimates of the load resistance and the input voltage, and the measurements of the output voltage and the inductor current, using ohm's law relationships between the inductor current, the output voltage, the input voltage, and the load resistance.

13. The boost converter of claim 8, wherein the local controller hybrid system implements a timer.

14. The boost converter of claim 1, wherein at least one of the global controller, local controller, or the supervisor comprise one or more circuits comprising one or more application specific integrated circuits or one or more field programmable gate arrays.

15. The boost converter of claim 1, wherein the parameter estimator is expressed using an estimator hybrid system.

16. The boost converter of claim 1, wherein at least one of the global controller, local controller, or the supervisor comprise one or more circuits comprising one or more application specific integrated circuits or one or more field programmable gate arrays.

17. The boost converter of claim 1, further comprising a computer implemented system coupled to the switch, the computer implemented system comprising one or more processors; one or more memories; and one or more programs stored in the one or more memories, wherein the one or more programs executed by the one or more processors implement the hybrid adaptive controller.

18. A computer implemented method for controlling a boost converter, comprising:

obtaining a boost converter circuit comprising a switch comprising a switch state (open or closed), a capacitor, an inductor, and a diode;

applying a hybrid algorithm controlling the switch state, comprising:

using a global controller:

determining a first switch state command (open or close) as a function of estimates of an input voltage and a load resistance received from a parameter estimator, a measurement of an output voltage across the capacitor, and a measurement of an inductor current passing through the inductor, and outputting the first switch state command to the switch to set the switch state causing the output voltage to converge to a desired output voltage, thereby raising the input voltage, inputted to the boost converter circuit, to the desired output voltage across the capacitor when a load comprising the load resistance is connected across the capacitor;

using a local controller:

determining a second switch state command as a function of the estimates of the input voltage and the load resistance received from the parameter estimator, and the measurement of the output voltage and the measurement of the inductor current, and outputting the second switch state command to the switch to set the switch state maintaining the output voltage at or within a set range of the desired output voltage and maintaining the inductor current at or within a set range of a desired current, when the load is connected; and determining, in a supervisor, whether to execute the global controller outputting the first switch state command, or the local controller outputting the second switch state command, depending on the measurement of the output voltage and the measurement of the inductor current.

19. A computer implemented system for controlling a boost converter circuit, comprising:

one or more processors, or a non-transitory computer readable medium configured for:

receiving at least one of a desired output voltage or an inductor current for application to an output load using the boost converter circuit comprising a switch comprising a switch state (open or closed), a capacitor, an inductor, and a diode;

determining a first switch state command (open or closed) as a function of estimates of an input voltage and a load resistance received from a parameter estimator, a measurement of an output voltage across the capacitor, and a measurement of the inductor current passing through the inductor, wherein the first switch state command sets the switch state causing the output voltage to converge to the desired output voltage, thereby raising the input voltage, inputted to the boost converter circuit, to the desired output voltage across the capacitor when a load comprising the load resistance is connected across the capacitor; and determining a second switch state command as a function of the estimates of the input voltage and the load resistance received from the parameter estimator, and the measurement of the output voltage and the measurement of the inductor current, wherein the second switch state command sets the switch state maintaining the output voltage at or within a set range of the desired output voltage and/or maintains the inductor current at or within a set range of a desired current, when the load is connected; and determining whether to output the first switch state command or the second switch state command to control the switch, depending on the measurement of the output voltage and the measurement of the inductor current.

20. The system of claim 19, comprising the one or more processors and one or more applications or programs executed by the one or more processors for executing a hybrid algorithm performing the determining the first switch state command, the determining the second switch state command, and the determining whether to output the first switch state command or the second switch state command and outputting the first switch state command and the second switch state command.

21. The system of claim 19, wherein the computer implemented system comprises one or more circuits comprising one or more application specific integrated circuits or one or more field programmable gate arrays.

22. The system of claim 19, wherein the computer implemented system comprises the one or more processors and further comprises one or more memories; and one or more programs stored in the one or more memories, wherein the one or more programs executed by the one or more processors perform the receiving and the determining.

\* \* \* \* \*